United States Patent
Amano et al.

(10) Patent No.: US 9,641,868 B2
(45) Date of Patent: *May 2, 2017

(54) MOVING IMAGE DECODING APPARATUS, MOVING IMAGE CODING APPARATUS, MOVING IMAGE DECODING CIRCUIT, AND MOVING IMAGE DECODING METHOD

(71) Applicant: Panasonic Intellectual Property Management Co., Ltd., Osaka (JP)

(72) Inventors: Hiroshi Amano, Osaka (JP); Takeshi Tanaka, Osaka (JP); Takashi Hashimoto, Hyogo (JP); Yoshiteru Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

This patent is subject to a terminal disclaimer.

(21) Appl. No.: 14/629,747

(22) Filed: Feb. 24, 2015

(65) Prior Publication Data

US 2015/0172723 A1 Jun. 18, 2015

Related U.S. Application Data

(62) Division of application No. 13/255,267, filed as application No. PCT/JP2011/001234 on Mar. 2, 2011, now Pat. No. 8,995,530.

(30) Foreign Application Priority Data

Mar. 9, 2010 (JP) .................................. 2010-052370

(51) Int. Cl.
*H04N 19/82* (2014.01)
*H04N 19/51* (2014.01)
(Continued)

(52) U.S. Cl.
CPC ........... *H04N 19/82* (2014.11); *H04N 19/117* (2014.11); *H04N 19/43* (2014.11); *H04N 19/44* (2014.11); *H04N 19/513* (2014.11); *H04N 19/61* (2014.11)

(58) Field of Classification Search
CPC ...... H04N 19/117; H04N 19/43; H04N 19/44; H04N 19/513; H04N 19/61; H04N 19/82;
(Continued)

(56) References Cited

U.S. PATENT DOCUMENTS

| 6,754,371 B1 | 6/2004 | Kondo et al. |
| 7,095,787 B2 | 8/2006 | Kadono et al. |

(Continued)

FOREIGN PATENT DOCUMENTS

| CN | 1984345 | 6/2007 |
| JP | 6-260889 | 9/1994 |

(Continued)

OTHER PUBLICATIONS

International Search Report issued Apr. 19, 2011 in International (PCT) Application No. PCT/JP2011/001234.

(Continued)

*Primary Examiner* — Nathnael Aynalem
(74) *Attorney, Agent, or Firm* — Wenderoth, Lind & Ponack, L.L.P.

(57) ABSTRACT

A moving image decoding apparatus which enables reduction in the memory bandwidth and the memory access latency for the motion compensation filter coefficients for use in inter-picture prediction involving motion compensation using variable coefficients includes: a decoding unit (101) which decodes, from a coded stream, a plurality of motion compensation filter coefficients; a memory (109) for holding the motion compensation filter coefficients included in the coded stream; a filter coefficient storage unit (103) for (Continued)

holding at least one of the motion compensation filter coefficients which is required for the motion compensation; a motion compensation unit (107) which performs motion compensation using the required motion compensation filter coefficient held in the filter coefficient storage unit; and a filter coefficient transfer control unit (102) which writes, in the memory, the motion compensation filter coefficients decoded by the decoding unit, and transfers the required motion compensation filter coefficient from the memory to the filter coefficient storage unit, only when the required coefficient is not yet stored therein.

25 Claims, 34 Drawing Sheets

(51) Int. Cl.
*H04N 19/61* (2014.01)
*H04N 19/117* (2014.01)
*H04N 19/44* (2014.01)
*H04N 19/43* (2014.01)
*H04N 19/513* (2014.01)

(58) Field of Classification Search
CPC ...... H04N 19/159; H04N 19/50; H04N 19/51; H04N 19/52; H04N 19/523; H04N 19/58; H04N 19/583; H04N 19/85; H04N 19/86
USPC ........................................ 375/240.01–240.29
See application file for complete search history.

(56) References Cited

U.S. PATENT DOCUMENTS

| | | | |
|---|---|---|---|
| 7,742,531 B2 | 6/2010 | Xue et al. |
| 7,782,962 B2 | 8/2010 | Xue et al. |
| 7,792,195 B2 | 9/2010 | Xue et al. |
| 7,899,123 B2 | 3/2011 | Xue et al. |
| 8,254,468 B2 | 8/2012 | Xue et al. |
| 8,345,770 B2 | 1/2013 | Xue et al. |
| 8,369,421 B2 | 2/2013 | Kadono et al. |
| 8,411,749 B1 | 4/2013 | Jacob et al. |
| 8,488,683 B2 | 7/2013 | Xue et al. |
| 2004/0062310 A1 | 4/2004 | Xue et al. |
| 2004/0076237 A1 | 4/2004 | Kadono et al. |
| 2004/0076333 A1 | 4/2004 | Zhang et al. |
| 2005/0254581 A1 | 11/2005 | Iguchi et al. |
| 2006/0239360 A1 | 10/2006 | Kadono et al. |
| 2007/0092002 A1 | 4/2007 | Xue et al. |
| 2007/0098066 A1 | 5/2007 | Xue et al. |
| 2007/0104269 A1 | 5/2007 | Xue et al. |
| 2008/0049843 A1 | 2/2008 | Kadono et al. |
| 2008/0056353 A1 | 3/2008 | Xue et al. |
| 2008/0056602 A1 | 3/2008 | Xue et al. |
| 2008/0056603 A1 | 3/2008 | Xue et al. |
| 2008/0063084 A1 | 3/2008 | Xue et al. |
| 2008/0069245 A1 | 3/2008 | Kadono et al. |
| 2008/0130761 A1 | 6/2008 | Kadono et al. |
| 2009/0274216 A1 | 11/2009 | Kato et al. |
| 2010/0220788 A1 | 9/2010 | Wittmann et al. |
| 2011/0103488 A1 | 5/2011 | Xue et al. |
| 2011/0235711 A1 | 9/2011 | Kondo et al. |
| 2013/0094582 A1 | 4/2013 | Wittmann et al. |
| 2013/0195207 A1 | 8/2013 | Xue et al. |

FOREIGN PATENT DOCUMENTS

| | | |
|---|---|---|
| JP | 9-298753 | 11/1997 |
| JP | 2003-523654 | 8/2003 |
| JP | 2004-147328 | 5/2004 |
| JP | 2004-165785 | 6/2004 |
| JP | 2005-354673 | 12/2005 |
| JP | 2009-296154 | 12/2009 |
| WO | 01/43069 | 6/2001 |
| WO | 2008/069073 | 6/2008 |
| WO | 2009/047917 | 4/2009 |
| WO | 2009/126911 | 10/2009 |
| WO | 2010/038858 | 4/2010 |

OTHER PUBLICATIONS

T. Wedi, "Adaptive Interpolation Filter for Motion Compensated Hybrid Video Coding", Proc. Picture Coding Symposium (PCS2001), Seoul, Korea, Apr. 2001.

Y. Vatis at el., "Two-dimensional non-separable Adaptive Wiener Interpolation Filter for H.264AVC", ITU—Telecommunications Standardization Sector Study Group 16 Question 6, Video Coding Experts Group (VCEG), document VCEG-Z17, Apr. 16, 2005.

K. Zhang et al., "Single-Pass Encoding Using Multiple Adaptive Interpolation Filters", ITU—Telecommunications Standardization Sector Study Group 16 Question 6, Video Coding Experts Group (VCEG), document VCEG-AK26, Apr. 15-18, 2009.

Office Action with Search Report issued Aug. 1, 2014 in Chinese Application No. 201180001378.8, with English language translation of Search Report.

FIG. 3

| Filter coefficient ID | Storage state |
|---|---|
| 0 | Held |
| 1 | Not held |
| 2 | Not held |
| 3 | Held |
| ... | ... |
| N - 1 | Not held |
| N | Not held |

FIG. 7A

| Filter coefficient ID | The number of times of reference already made in stream |
|---|---|
| 0 | 987 |
| 1 | 23 |
| 2 | 12 |
| 3 | 567 |
| ... | ... |
| N - 1 | 134 |
| N | 12 |

FIG. 7B

| Filter coefficient ID | Last reference order (how many times before) |
|---|---|
| 0 | 22 |
| 1 | 135 |
| 2 | 77 |
| 3 | 57 |
| ... | ... |
| N - 1 | 1 |
| N | 866 |

FIG. 10

| Filter coefficient ID | The number of times of reference to be made in stream |
|---|---|
| 0 | 55 |
| 1 | 12 |
| 2 | 0 |
| 3 | 2 |
| ... | ... |
| N - 1 | 11 |
| N | 5 |

FIG. 11

| Filter coefficient ID | Next reference order for block in stream (how many times ahead) |
|---|---|
| 0 | 30 |
| 1 | 10 |
| 2 | 2 |
| 3 | 1 |
| ... | ... |
| N - 1 | 5 |
| N | 7 |

FIG. 19

| Filter coefficient ID | Storage state |
|---|---|
| 0 \| | Not stored |
| 70 - 79 | Stored |
| 80 - 100 | Not stored |

MOVING IMAGE DECODING APPARATUS, MOVING IMAGE CODING APPARATUS, MOVING IMAGE DECODING CIRCUIT, AND MOVING IMAGE DECODING METHOD

TECHNICAL FIELD

The present invention relates to image decoding apparatuses, image coding apparatuses, image decoding circuits, and image decoding methods, and particularly to an image decoding apparatus, an image coding apparatus, an image decoding circuit, and an image decoding method using filter coefficients that are used in inter-picture prediction involving motion compensation using variable coefficients in order to decode a coded video stream.

BACKGROUND ART

Recently, there have been widely-used standards for video compression techniques. Examples of such standards include H.261 and H.263 by the ITU-T (International Telecommunication Union Telecommunication Standardization Sector), MPEG (Moving Picture Experts Group)-1, MPEG-2, MPEG-4, etc. by the ISO/IEC (International Organization for Standardization/International Electrotechnical Commission), and H.264/MPEG-4 AVC (Advanced Video Coding) by the JVT (Joint Video Team) as a joint team of the ITU-T and the MPEG. Furthermore, the next generation video compression technique is now being studied by the ITU-T, the ISO/IEC, etc.

In general, one of the important elements of a video compression technique is inter-picture prediction involving motion compensation intended to compress the amount of information by reducing temporal redundancies between plural consecutive pictures that make up a video. Here, the inter-picture prediction involving motion compensation is a coding method involving (i) detecting the amount and direction of a motion in a reference picture located forward or backward of a current picture that is to be coded in units of a macroblock or a sub-macroblock (hereinafter also referred to as a "macroblock or the like"), (ii) generating a prediction image, and (iii) coding a difference value between the prediction image and the current picture. It is to be noted that the information indicating how much and to what direction a macroblock or the like in the current picture to be coded is moved in the reference picture located forward or backward of the current picture is referred to as a motion vector. In addition, a picture to be referred to at this time is referred to as a reference picture.

In the decoding of a video stream coded using motion-compensation inter-picture prediction, decoded pictures are held in a frame memory and used as reference pictures in the decoding of the following pictures to be decoded.

In addition, prediction images of macroblocks coded using motion-compensation inter-picture prediction are generated as described below. First, a motion vector in the coded video stream is decoded. A reference pixel area indicated by the motion vector is obtained from a frame memory holding reference pictures. A prediction image is generated by, as necessary, filtering the reference pixel area. In order to generate a prediction image having a sub-pixel accuracy, integer pixels are filtered.

For example, a prediction image having a ½ pixel accuracy is generated using a 6-tap FIR filter (filter coefficients: 1, −5, 20, 20, −5, and 1) that has fixed filter coefficients defined in the H.264 standard. Next, a prediction image having a ¼ pixel accuracy is generated using a 2-tap average-value filter (filter coefficients: ½ and ½) that has fixed filter coefficients defined in the standard. At this time, filter coefficients that have same values (fixed values) irrespective of image characteristics are used to generate prediction images having a sub-pixel accuracy.

On the other hand, a motion compensation technique (hereinafter, also referred to as "motion compensation using variable coefficients") has been proposed (for example, see NPLs 1, 2, and 3). The motion compensation technique is intended to adaptively change filter coefficients for generating prediction images having a sub-pixel accuracy according to the image characteristics in order to achieve a higher coding efficiency. This motion compensation using variable coefficients has been proposed by the ITU-T, ISO/IEC, etc. as the next generation video compression technique, more specifically as the next generation motion-compensation inter-picture prediction technique.

For example, NPL 1 has proposed a technique for adaptively changing filter coefficients that are used to generate prediction images having a sub-pixel accuracy according to image characteristics, instead of using conventional filter coefficients having fixed values. In addition, for example, NPL 2 has proposed a technique for performing filtering when generating prediction images using, for each of values in the decimal part of each of motion vectors, a different filter coefficient defined in a coded stream. In addition, NPL 3 has proposed a technique for switching filter coefficients that are used for macroblock-based filtering in inter-picture prediction involving motion compensation, focusing on a fact that the optimum filter coefficient varies depending on the places even within a picture.

CITATION LIST

Patent Literature

[PTL 1]
Japanese Unexamined Patent Application Publication No. 2005-354673

Non Patent Literature

[NPL 1]
"ADAPTIVE INTERPOLATION FILTER FOR MOTION COMPENSATION HYBRID VIDEO coding", Thomas Wedi, Proc. Picture Coding Symposium (PCS2001), Seoul, Korea, April 2001
[NPL 2]
"Two DIMENSIONAL no-separable Adaptive Wiener Interpolation Filter for H.264/AVC", Y. Vatisetal, ITU-Telecommunications Standardization Sector, STUDY GROUP 16, Question 6, Video Coding Experts Group (VCEG), document VCEG-Z17, 16 Apr. 2005
[NPL 3]
"Single-Pass Encoding Using Multiple Adaptive Interpolation Filters", Kai Zhangetal, ITU-Telecommunications Standardization Sector STUDY GROUP 16, Question 6, Video Coding Experts Group (VCEG), document VCEG-AK26, 15 to 18 Apr. 2009

SUMMARY OF INVENTION

Technical Problem

However, the inter-picture prediction involving motion compensation proposed as the next generation video compression technique requires frequently selecting filtering coefficients from among numerous candidate filtering coefficients and using the selected filtering coefficients in the filtering for generating prediction images. For this reason, in general, it is predicted that an extremely large memory capacity, memory bandwidth, and memory access latency are required for a memory for holding such filter coefficients.

The motion-compensation decoding of a video stream coded using motion-compensation inter-picture prediction requires storing decoded pictures in a frame memory and reading out reference pixel areas from the frame memory. For this reason, in the case of using the motion-compensation inter-picture prediction proposed as the next generation video compression technique, in general, it is predicted that an extremely large memory bandwidth and memory access latency are required for the frame memory because of the need of the storage of decoded pictures and reading-out of reference pixel areas and access for, for example, the display of the decoded pictures.

To prevent this, various techniques have been proposed so far as methods for reducing the memory capacity, memory bandwidth, and/or memory access latency required for a frame memory (for example, PTL 1). For example, PTL 1 transfers a plurality of reference pixel areas from a frame memory to a local memory all together when performing motion-compensation inter-picture prediction in the case where the collective transfer of the reference pixel areas increases the coding efficiency. This eliminates the necessity that each of reference areas which is commonly used for a plurality of blocks should be transferred each time one of the blocks is processed. Thus, it is possible to reduce the number of times of access to the frame memory. In this way, it is possible to reduce the memory bandwidth, memory access latency, and the number of processing cycles for the frame memory.

However, PTL 1 merely discloses a configuration for reducing the memory bandwidth and memory access latency for the frame memory storing reference images. In other words, PTL 1 does not disclose descriptions of memory access for filter coefficients that are used in the inter-picture prediction involving motion compensation using variable coefficients proposed as the next generation video compression technique. Accordingly, with the configuration disclosed in PTL 1, it is impossible to reduce the memory bandwidth and memory access latency for the filter coefficients in the case of performing the inter-picture prediction involving motion compensation using variable coefficients.

In view of the aforementioned situations, the present invention has been conceived with an aim to provide a moving image decoding apparatus, a moving image coding apparatus, a moving image decoding circuit, and a moving image decoding method which enable reduction in the memory bandwidth and memory access latency for motion compensation filter coefficients (filter coefficients of a motion compensation filter) which are used to perform inter-picture prediction involving motion compensation using variable coefficients.

Solution to Problem

In order to solve the aforementioned conventional problem, a moving image coding apparatus according to the present invention performs motion-compensation decoding involving motion compensation of a stream of motion-compensation coded moving images, and includes: a decoding unit configured to decode, from the stream, a plurality of motion compensation filter coefficients (filter coefficients of a motion compensation filter) for use in the motion-compensation decoding; a memory for holding the motion compensation filter coefficients included in the stream decoded by the decoding unit; a filter coefficient storage unit for holding at least one of the motion compensation filter coefficients required for the motion compensation; a motion compensation unit configured to perform the motion compensation using the at least one motion compensation filter coefficient held in the filter coefficient storage unit; and a transfer control unit configured to write, to the memory, the motion compensation filter coefficients decoded by the decoding unit, and, only when the filter coefficient storage unit does not hold the at least one motion compensation filter coefficient, transfer the at least one motion compensation filter coefficient from the memory to the filter coefficient storage unit.

With this structure, it is possible to implement a moving image decoding apparatus capable of reducing the memory bandwidth and reducing the memory access latency for motion compensation filter coefficients used to perform inter-picture prediction involving motion compensation using variable coefficients.

In order to solve the aforementioned conventional problem, a moving image coding apparatus according to the present invention performs motion-compensation coding using a current image to be coded and a reference image and includes: a generation unit configured to generate a plurality of motion compensation filter coefficients for use in the motion-compensation coding; a memory for holding the motion compensation filter coefficients generated by the generation unit; a filter coefficient storage unit for holding at least one of the motion compensation filter coefficients held in the memory, the at least one motion compensation filter coefficient being required for the motion compensation; a motion estimation unit configured to generate a prediction image by performing motion compensation between the current image to be coded and the reference image, using the at least one motion compensation filter coefficient held in the filter coefficient storage unit; and a transfer unit configured to write, to the memory, the motion compensation filter coefficients generated by the generation unit, and transfer the at least one motion compensation filter coefficient from the memory to the filter coefficient storage unit, only when the filter coefficient storage unit does not hold the at least one motion compensation filter coefficient.

With this structure, it is possible to implement a moving image coding apparatus capable of reducing the memory bandwidth and reducing the memory access latency for motion compensation filter coefficients used to perform inter-picture prediction involving motion compensation using variable coefficients.

It is to be noted that the present invention can be implemented not only as an apparatus but also as an integrated circuit including the processing units of the apparatus and as a method including the steps corresponding to the processing units of the apparatus.

Advantageous Effects of Invention

According to the present invention, it is possible to implement an image decoding apparatus, an image coding apparatus, an image decoding circuit, and an image decoding method for enabling reduction in the memory bandwidth and reduction in the memory access latency for motion compensation filter coefficients used to perform inter-picture prediction involving motion compensation using variable coefficients.

BRIEF DESCRIPTION OF DRAWINGS

FIG. 3 is an example of information held in a management table for storage states of filter coefficients.

FIG. 7A is an example of information held in a management table for reference history of filter coefficients according to the present invention.

FIG. 7B is an example of information held in a management table for reference history of filter coefficients according to the present invention.

FIG. 10 is an example of information held in a management table for statistical information of filter coefficients.

FIG. 11 is an example of information held in a management table for statistical information of filter coefficients.

FIG. 19 is an example of information held in a management table for storage states of filter coefficients.

DESCRIPTION OF EMBODIMENTS

Hereinafter, embodiments of the present invention will be described with reference to the drawings.

Embodiment 1

Figure 1:
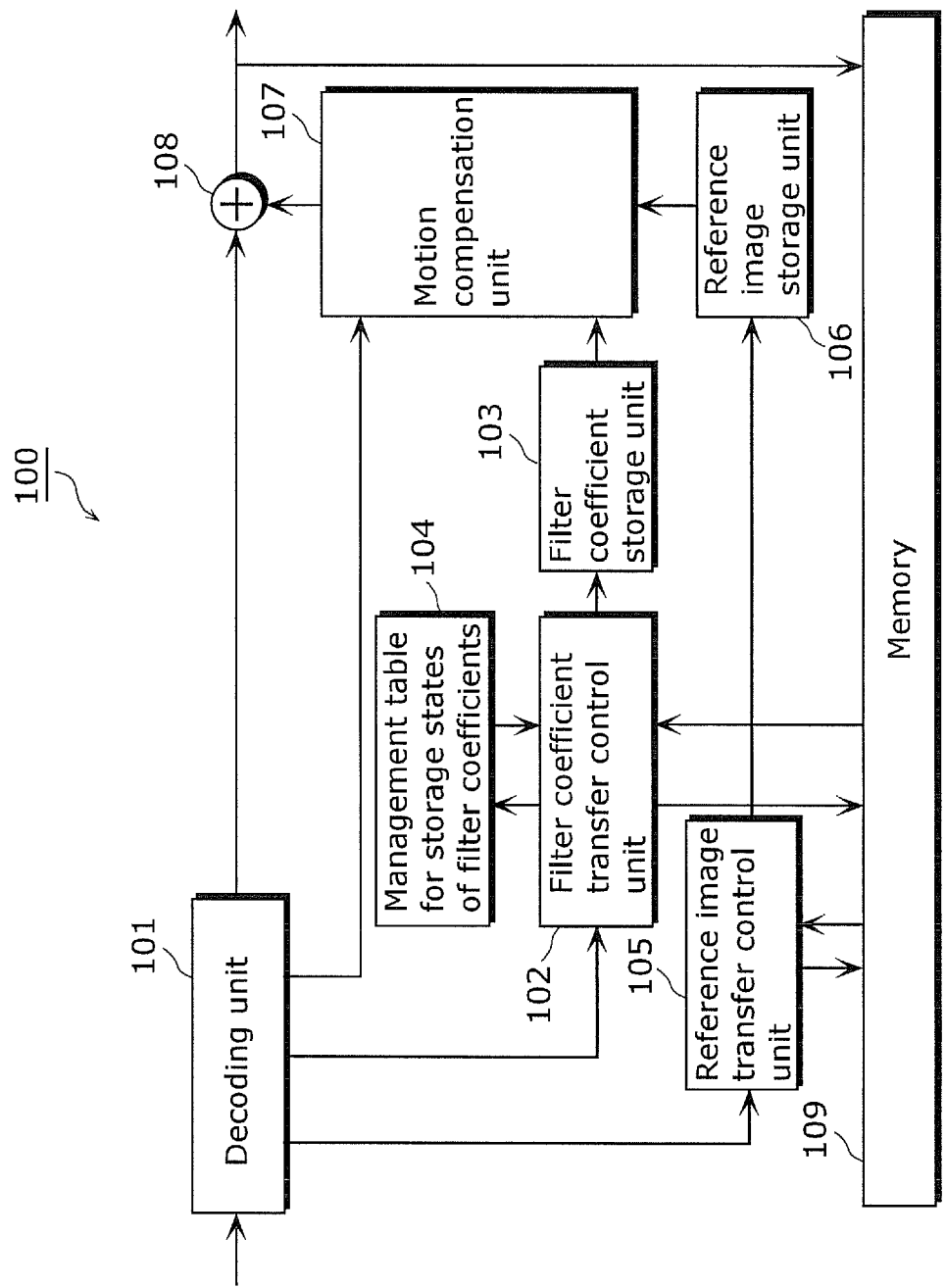
FIG. 1 is a block diagram showing a structure of a decoding apparatus according to Embodiment 1 of the present invention.
Figure 2A:
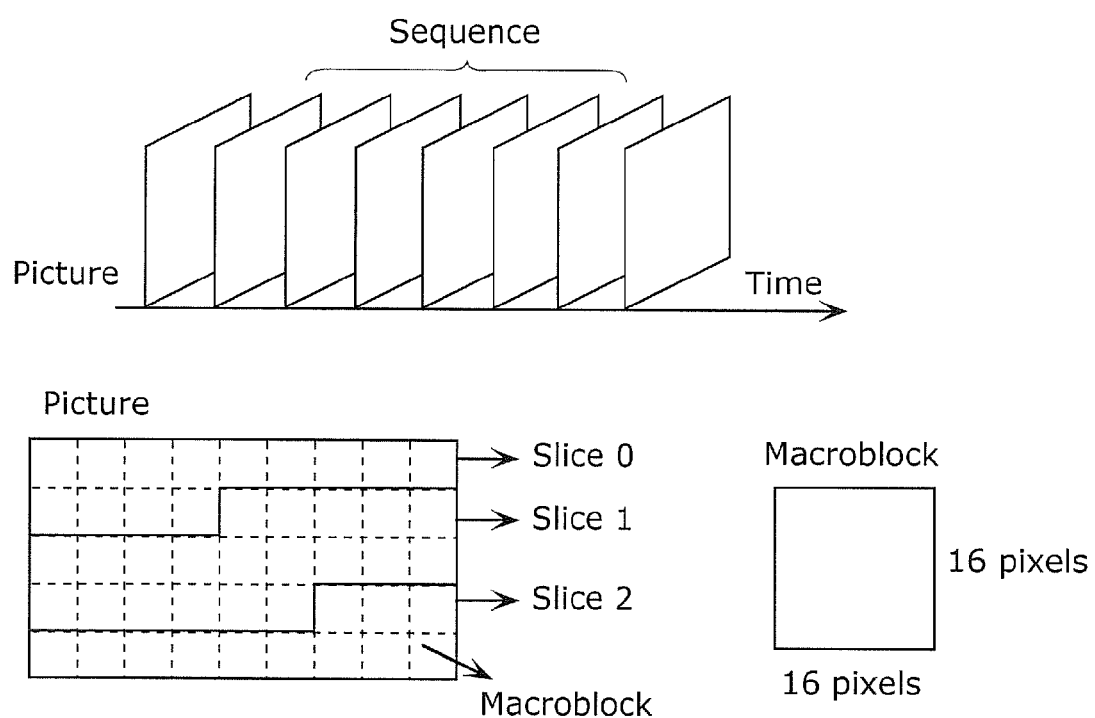
FIG. 2A is an illustration showing schematic structures of a coded stream generated according to a standard of a video compression technique.
Figure 2B:
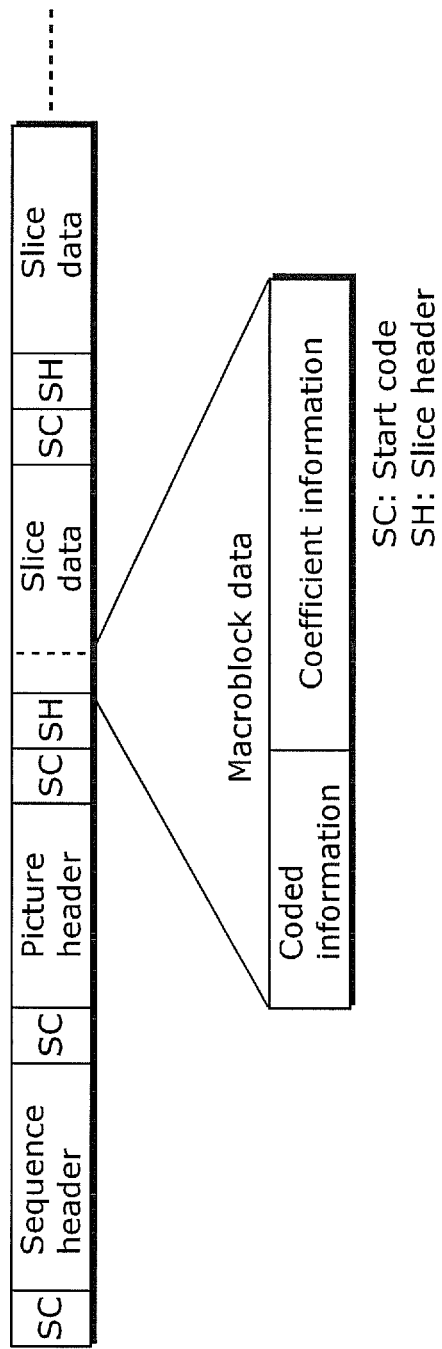
FIG. 2B is an illustration showing schematic structures of the coded stream generated according to the standard of the video compression technique.
Figure 2C:
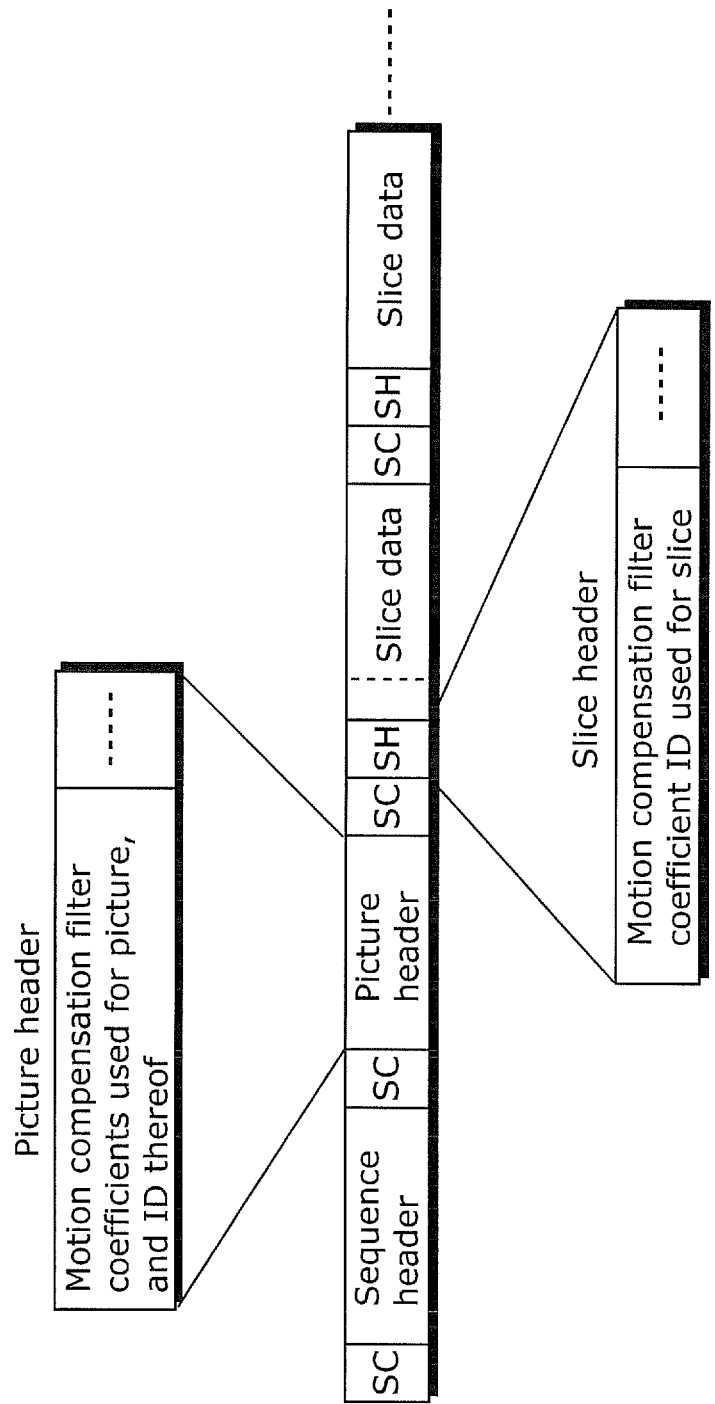
FIG. 2C is an illustration showing an example of a coded stream according to the present invention.

FIG. 1 is a structural diagram of a decoding apparatus according to Embodiment 1 of the present invention. Each of FIG. 2A and FIG. 2B is an illustration showing schematic structures of a coded stream generated according to a standard of a video compression technique. FIG. 2C is an illustration showing an example of a coded stream according to the present invention. FIG. 3 is an example of information held in a management table for storage states of filter coefficients.

A decoding apparatus 100 as shown in FIG. 1 is a moving image decoding apparatus which performs motion-compensation decoding of a coded stream generated by performing motion compensation of moving images. The decoding apparatus 100 includes a decoding unit 101, a filter coefficient transfer control unit 102, a filter coefficient storage unit 103, a management table for storage states of filter coefficients 104, a reference image transfer control unit 105, a reference image storage unit 106, a motion compensation unit 107, an adder 108, and a memory 109.

The decoding unit 101 decodes, from the coded stream, at least a plurality of motion compensation filter coefficients for use in the motion-compensation decoding. More specifically, the decoding unit 101 has a function of decoding a coded stream generated according to a standard of a moving image compression technique, and outputting at least header information and a prediction error signal.

Here, the coded stream according to the standard of the moving image compression technique is explained with reference to FIGS. 2A and 2B. As shown in FIG. 2A, a sequence of images (video) in the coded stream has a hierarchical structure. A sequence of plural pictures (or a GOP that is a Group Of Pictures) is given here as an example. Each of the pictures that make up the sequence is divided into slices, and is further divided into macroblocks each composed of 16×16 pixels. It is to be noted that a picture may not be divided into slices. The decoding apparatus 100 performs decoding in units of a slice or a macroblock.

As shown in FIG. 2B, these units are coded hierarchically in the coded stream. The coded stream is configured to include a sequence header for controlling a sequence, a picture header for controlling a picture, a slice header for controlling a slice, and macroblock data. The macroblock data is classified into (i) coded information of a marcroblock type, an intra-picture prediction (intra prediction) mode, motion vector information, quantized parameters, and (ii) coefficient information corresponding to each pixel data. In the H.264 standard, a sequence header is referred to as Sequence Parameter Set (SPS) and a picture header is referred to as Picture Parameter Set (PPS).

For example, a structure as shown in FIG. 2C is also possible. In other words, it is assumed that a GOP or a picture header of each of the pictures in the sequence includes all of (i) motion compensation filter coefficients for all of the pictures and (ii) pieces of information (hereinafter referred to as "motion compensation filter coefficient ID) each identifying the motion compensation filter coefficient for use in motion compensation of a current corresponding one of the slices or the macroblocks to be decoded. Furthermore, it is assumed that a slice header in a picture includes only pieces of motion compensation filter coefficient ID. Here, the motion compensation filter coefficient ID corresponds identification information in the CLAIMS according to the present application.

The motion compensation filter coefficients and the pieces of motion compensation filter coefficient ID may be provided in units of a GOP or a sequence, instead of in units of a picture. Alternatively, motion compensation filter coefficients and the pieces of motion compensation filter coefficient ID may be included in units of a slice, and the pieces of motion compensation filter coefficient ID may be included in units of a macroblock. In other words, the aforementioned units may be arbitrarily combined, or another combination of other units may be used as such a unit instead.

The filter coefficient transfer control unit 102 corresponds to a transfer control unit in the CLAIMS of the present application. The filter coefficient transfer control unit 102 writes, to the memory 109, a plurality of motion compensation filter coefficients decoded by the decoding unit 101, and transfers at least one of the motion compensation filter coefficients from the memory 109 to the filter coefficient storage unit 103, only when the filter coefficient storage unit 103 does not hold the at least one motion compensation filter coefficient required for use in the current motion compensation process. More specifically, the filter coefficient transfer control unit 102 has a function of writing, to the memory 109, the motion compensation filter coefficients for use in the motion compensation processes. The motion compensation filter coefficients are defined in the coded stream. In addition, the filter coefficient transfer control unit 102 has a function of referring to information held in the management table for storage states of filter coefficients 104, based on the motion compensation filter coefficient ID that is information indicating the motion compensation filter coefficient for use in a current motion compensation process performed by the decoding unit 101. The filter coefficient transfer control unit 102 checks whether or not the motion compensation filter coefficient indicated by the motion compensation filter coefficient ID is held in the filter coefficient storage unit 103, based on the information in the management table for storage states of filter coefficients 104.

For example, when the filter coefficient transfer control unit 102 finds out that the motion compensation filter coefficient indicated by the motion compensation filter coefficient ID is not held in the filter coefficient storage unit 103, the filter coefficient transfer control unit 102 reads out, from the memory 109, the motion compensation filter coefficient indicated by the motion compensation filter coefficient ID, and writes the read-out motion compensation filter coefficient in the filter coefficient storage unit 103 (transfers it thereto). On the other hand, when the filter coefficient transfer control unit 102 finds out that the motion compensation filter coefficient indicated by the motion compensation filter coefficient ID is held (stored) in the filter coefficient storage unit 103, the filter coefficient transfer control unit 102 does not read out, from the memory 109, the motion compensation filter coefficient (does not transfer it thereto).

It is to be noted that the filter coefficient transfer control unit 102 may issue a write instruction to the decoding unit 101 so that the decoding unit 101 writes the motion compensation filter coefficient to the memory 109. Likewise, the filter coefficient transfer control unit 102 may issue a read instruction to the filter coefficient storage unit 103 so that the filter coefficient storage unit 103 reads out, from the memory 109, the motion compensation filter coefficient indicated by the motion compensation filter coefficient ID, and holds the read out motion compensation filter coefficient.

The filter coefficient storage unit 103 is for holding the required motion compensation filter coefficients for use in the motion compensation among the plurality of motion compensation filter coefficients held in the memory 109. More specifically, the filter coefficient storage unit 103 has a function of holding at least two kinds of motion compensation filter coefficients transferred from the memory 109, and a function of setting, in the motion compensation unit 107, the motion compensation filter coefficients indicated by the ID of the motion compensation filter coefficients.

The management table for storage states of filter coefficients 104 corresponds to a storage state management unit in the CLAIMS of the present application. The management table for storage states of filter coefficients 104 manages information indicating whether or not the filter coefficient storage unit 103 holds the motion compensation filter coefficients indicated by the motion compensation filter coefficient ID. More specifically, the management table for storage states of filter coefficients 104 has a function of receiving, as inputs, the pieces of motion compensation filter coefficient ID, and outputs, to the filter coefficient storage unit 103, the information indicating whether or not the filter coefficient storage unit 103 holds each of the motion compensation filter coefficients indicated by the motion compensation filter coefficient ID. The management table for storage states of filter coefficients 104 holds, for example, information as shown in FIG. 3. More specifically, the management table for storage states of filter coefficients 104 holds all the pieces of the motion compensation filter coefficient ID included in the header information such as sequence headers and picture headers in the coded stream to be decoded by the decoding unit 101. Furthermore, the management table for storage states of filter coefficients 104 holds, as the storage states, information indicating whether or not the filter coefficient storage unit 103 holds the motion compensation filter coefficients indicated by the respective pieces of motion compensation filter coefficient ID.

The reference image transfer control unit 105 has a function of reading out, from the memory 109, reference pixels required for the motion compensation, based on the header information including motion vectors and reference picture information output by the decoding unit 101, and writing the reference image to the reference image storage units 106.

It is to be noted that the reference image transfer control unit 105 may issue a read instruction to the reference image storage unit 106 based on the header information including the motion vectors and reference picture information output by the decoding unit 101, so that the reference image storage unit 106 reads out, from the memory 109, the reference pixels required for the motion compensation and holds the read-out reference pixels.

The reference image storage unit 106 has a function of holding the reference pixels transferred from the memory 109.

The motion compensation unit 107 performs motion compensation using at least the motion compensation filter coefficients held in the filter coefficient storage unit 103. More specifically, the motion compensation unit 107 has a function of obtaining (i) header information including motion vectors and the ID of motion compensation filter coefficients output by the decoding unit 101, (ii) reference pixels required for motion compensation indicated by the motion vectors held in the reference image storage unit 106, and (iii) motion compensation filter coefficients indicated by the motion compensation filter coefficient ID held in the filter coefficient storage unit 103. The motion compensation unit 107 has a function of generating a prediction image by performing motion compensation using these pieces of information and outputting these pieces of information to the adder 108.

The adder 108 has a function of adding the prediction error signal output by the decoding unit 101 and the prediction image output by the motion compensation unit 107, and outputs the outcome as the decoded image, and a function of transferring the decoded image to the memory 109.

The memory 109 is for holding at least the plurality of motion compensation filter coefficients included in the bit stream decoded by the decoding unit 101. More specifically, the memory 109 has a function of holding the motion compensation filter coefficients and reference pictures that are referred to by the motion compensation unit 107. It is to be noted that the memory 109 may hold only the motion compensation filter coefficients. In such a case, it is only necessary that the decoding apparatus 100 additionally includes a frame memory for holding the reference pictures that are referred to by the motion compensation unit 107.

The decoding apparatus 100 is structured as described above.

Figure 4:
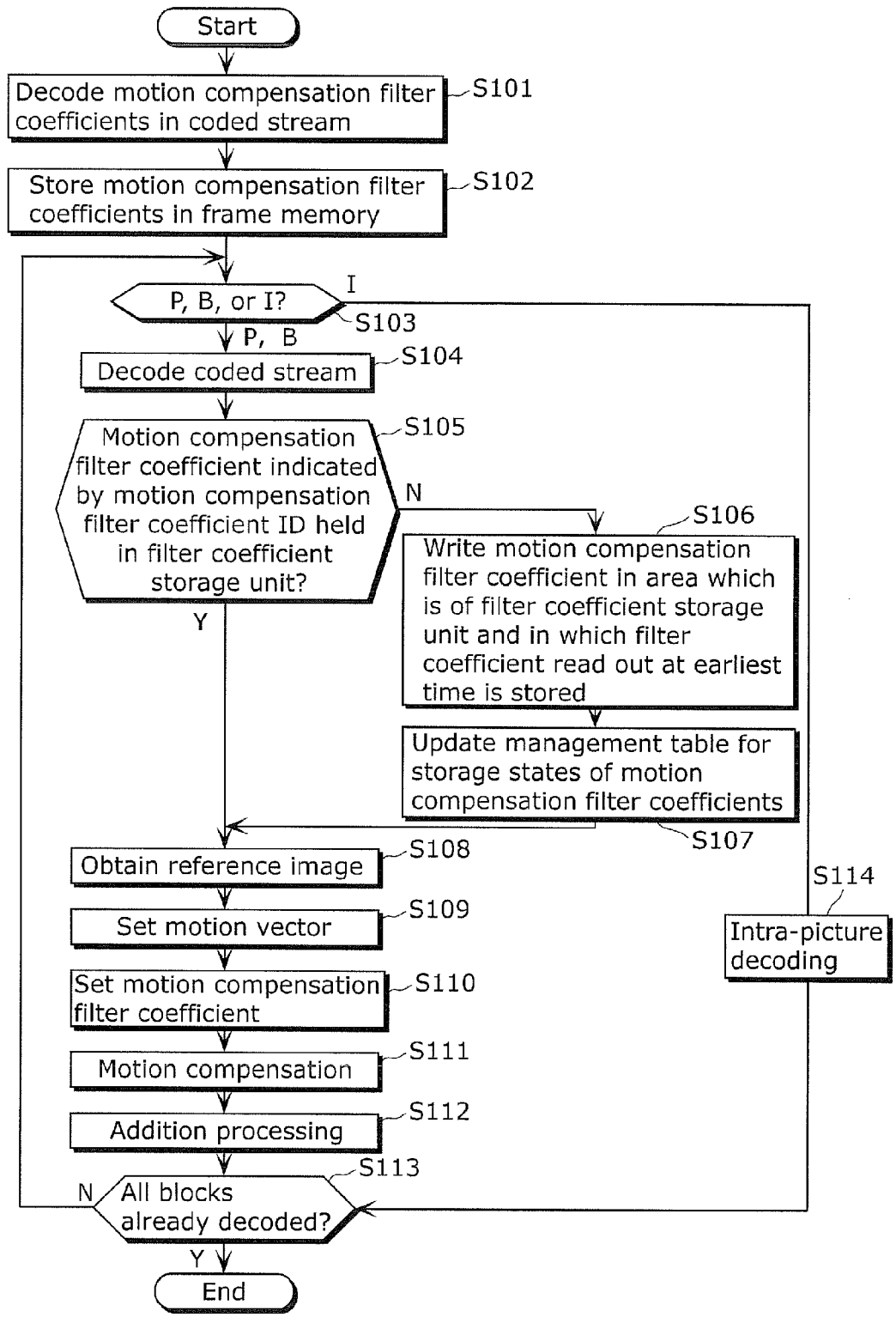
FIG. 4 is a flowchart of decoding operations performed by a decoding apparatus according to Embodiment 1 of the present invention.

Next, a description is given of decoding operations performed by the decoding apparatus 100. FIG. 4 is a flowchart of the decoding operations performed by the decoding apparatus according to Embodiment 1 of the present invention.

As shown in FIG. 4, in the decoding apparatus 100, the decoding unit 101 decodes coded header information in an input coded stream (S101), and outputs, as decoded header information, at least motion compensation filter coefficients. Next, the filter coefficient transfer control unit 102 writes, to the memory 109, all the motion compensation filter coefficients decoded, in Step S101, by the decoding unit 101 (S102).

Next, the decoding unit 101 determines whether a current image to be decoded has a picture type of P, B or I (S103). When the current image has a picture type of P or B (the case of P or B in S103), the decoding unit 101 determines that motion compensation is required, decodes coded header information in the coded stream and a prediction residual signal (S104), and outputs, as decoded header information, at least the motion compensation filter coefficient ID, the motion vector information, and the prediction residual signal. On the other hand, when the current image has a picture type of I (the case of I in S103), the decoding unit 101 determines that motion compensation is not required, proceeds to S114 and performs intra-picture decoding, and then proceeds to S113.

Next, the filter coefficient transfer control unit 102 checks whether or not the filter coefficient storage unit 103 holds the motion compensation filter coefficients indicated by the pieces of motion compensation filter coefficient ID decoded in S104, with reference to the management table for storage states of filter coefficients (S105).

When the filter coefficient storage unit 103 does not hold the motion compensation filter coefficients indicated by the motion compensation filter coefficient ID (the case of No in S105), the filter coefficient transfer control unit 102 reads out, from the memory 109, the motion compensation filter coefficients indicated by the motion compensation filter coefficients ID. Next, the filter coefficient transfer control unit 102 writes the motion compensation filter coefficients in an area which is of the filter coefficient storage unit 103 and holds the motion compensation filter coefficient read out from the memory 109 at earliest time (S106). Next, the filter coefficient transfer control unit 102 updates the management table for storage states of filter coefficients 104 (S107). More specifically, the filter coefficient transfer control unit 102 updates, to "held", the storage state which is of the read out motion compensation filter coefficient and is indicated in the management table for storage states of filter coefficients 104, and updates the storage state of the erased motion compensation filter coefficient to "not held".

On the other hand, when the filter coefficient storage unit 103 holds the motion compensation filter coefficient indicated by the motion compensation filter coefficient ID (the case of Yes in S105), the filter coefficient transfer control unit 102 proceeds to S108 without reading out the motion compensation filter coefficient from the memory 109.

Next, the reference image transfer control unit 105 obtains a reference image (S108). More specifically, the reference image transfer control unit 105 reads out, from the memory 109, the reference image for use in the motion compensation, based on the header information including the motion vector and the reference picture information output by the decoding unit 101 in S104. Next, the reference image transfer control unit 105 writes the read-out reference image in the reference image storage unit 106.

Next, the motion compensation unit 107 sets the motion vector output by the decoding unit 101 in S104 (S109). Next, the motion compensation unit 107 determines the motion compensation filter coefficient for use in the motion compensation based on the motion compensation filter coefficient ID and the motion vector output by the decoding unit 101 in S104, and reads out the motion compensation filter coefficient from the filter coefficient storage unit 103 (S110). Next, the motion compensation unit 107 reads out the reference image held in the reference image storage unit 106, generates a prediction image by performing motion compensation, and outputs the prediction image to the adder 108 (S111).

Next, the adder 108 adds the prediction image output by the motion compensation unit 107 in S111 and the prediction residual signal output by the decoding unit 101 in S104, and outputs the outcome (S112).

Next, the decoding unit 101 determines whether or not all of the motion compensation blocks that need to be motion-compensation using the motion compensation filter coefficients decoded in S101 (S113) are already decoded. When the answer is YES (Y in S113), the decoding unit 101 completes the decoding. On the other hand, when there remains any motion compensation block that is not yet decoded (N in S113), the decoding unit 101 returns to S103 and repeats the following processing.

In this way, the decoding apparatus 100 performs the decoding operations.

It is to be noted that, when the decoding apparatus 100 decodes the images (pictures) included in a sequence or a GOP, the decoding apparatus 100 writes, in S102, all of the motion compensation filter coefficients decoded by the decoding unit 101 in Step S101 to the memory 109 without writing all of the motion compensation filter coefficients in the management table for storage states of filter coefficients 104. By repeating the processes from S103 to S113, some of the motion compensation filter coefficients are is held in the filter coefficient storage unit 103.

According to Embodiment 1, when it is found, with reference to the management table for storage states of filter coefficients 104, that the filter coefficient storage unit 103 stores the at least one motion compensation filter coefficient indicated by motion compensation filter coefficient ID, the at least one motion compensation filter coefficient is not read out from the memory 109. For this reason, it is possible to reduce the number of times of access to the memory 109. For this reason, it is possible to reduce the memory bandwidth and the memory access latency related to the motion compensation filter coefficient.

In the above case, when the filter coefficient storage unit 103 does not hold the motion compensation filter coefficient indicated by the motion compensation filter coefficient ID, the filter coefficient transfer control unit 102 reads out the motion compensation filter coefficient indicated by the motion compensation filter coefficient ID from the memory 109. The above description is given of a case of writing the motion compensation filter coefficient to an area which is of the filter coefficient storage unit 103 and stores the motion compensation filter coefficient read out from the frame memory at the earliest time. However, the area to which the motion compensation filter coefficient is written is not limited thereto. For example, the motion compensation filter coefficient may be written to an area which stores the motion compensation filter coefficient read out from the memory most recently, or may be written to an area which stores a filter coefficient and is selected at random. Any area selection method is possible as long as the method enables reduction in the access to the memory 109 and reduction in the capacity of the filter coefficient storage unit 103.

The above description is given of a case where the motion compensation filter coefficient ID is header information different from a motion vector, but the motion compensation filter coefficient ID is not limited thereto. For example, the motion vector may be the motion compensation filter coefficient ID. Alternatively, information including the motion vector not only the header information different from the motion vector may be the motion compensation filter coefficient ID.

The above description is given of a case where the motion vector is set in the motion compensation unit 107, but the decimal part of the motion vector may be set.

Figure 5:
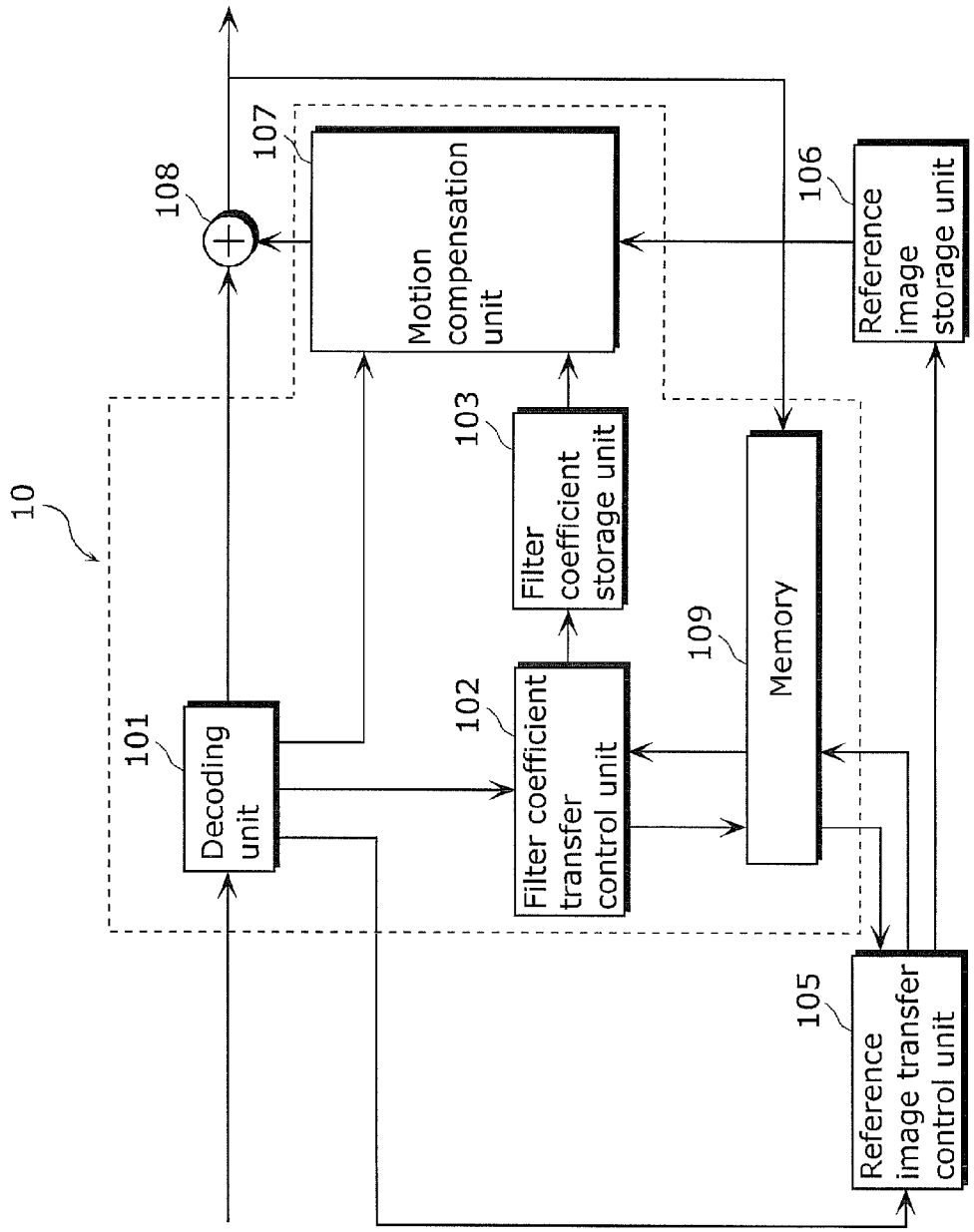
FIG. 5 is a block diagram showing essential structural elements of the decoding apparatus according to Embodiment 1 of the present invention.

In the above description, the decoding apparatus 100 includes the decoding unit 101, the filter coefficient transfer control unit 102, the filter coefficient storage unit 103, the management table for storage states of filter coefficients 104, the reference image transfer control unit 105, the reference image storage unit 106, the motion compensation unit 107, the adder 108, and the memory 109. However, the structure of the decoding apparatus 100 is not limited thereto. As shown in FIG. 5, it is only necessary for the decoding apparatus 100 to include a decoding apparatus unit 10 as its essential element. Specifically, it is only necessary for the decoding apparatus 100 to include the decoding apparatus unit 10 including the decoding unit 101, the filter coefficient transfer control unit 102, the filter coefficient storage unit 103, the memory 109, and the motion compensation unit 107.

More specifically, the decoding apparatus unit 10 may be a moving image decoding apparatus which performs motion-compensation decoding of a coded stream generated by performing motion compensation of a moving image and may include: a decoding unit 101 which decodes, from the coded stream, a plurality of motion compensation filter coefficients for use in the motion-compensation decoding; a memory 109 for holding the motion compensation filter coefficients included in the coded stream decoded by the decoding unit 101; a filter coefficient storage unit 103 for holding at least one motion compensation filter coefficient required for the motion compensation from among the plurality of motion compensation filter coefficients held in the memory; a motion compensation unit 107 which performs motion compensation using the at least one motion compensation filter coefficient held in the filter coefficient storage unit 103; and a filter coefficient transfer control unit 102 which writes, to the memory 109, the plurality of motion compensation filter coefficients decoded by the decoding unit 101, and transfers the at least one required motion compensation filter coefficient from the memory 109 to the filter coefficient storage unit 103 only when the filter coefficient storage unit 103 does not hold the at least one required motion compensation filter coefficient.

In the decoding apparatus 100 including the decoding apparatus unit 10 as its essential element, the filter coefficient transfer control unit 102 transfers, to the filter coefficient storage unit, at least one of the motion compensation filter coefficients stored in the memory 109 and for use in the motion-compensation decoding, and the filter coefficient storage unit stores the transferred motion compensation filter coefficient. In this way, it is possible to reduce the number of times of direct access to the memory 109.

Embodiment 2

Figure 6:
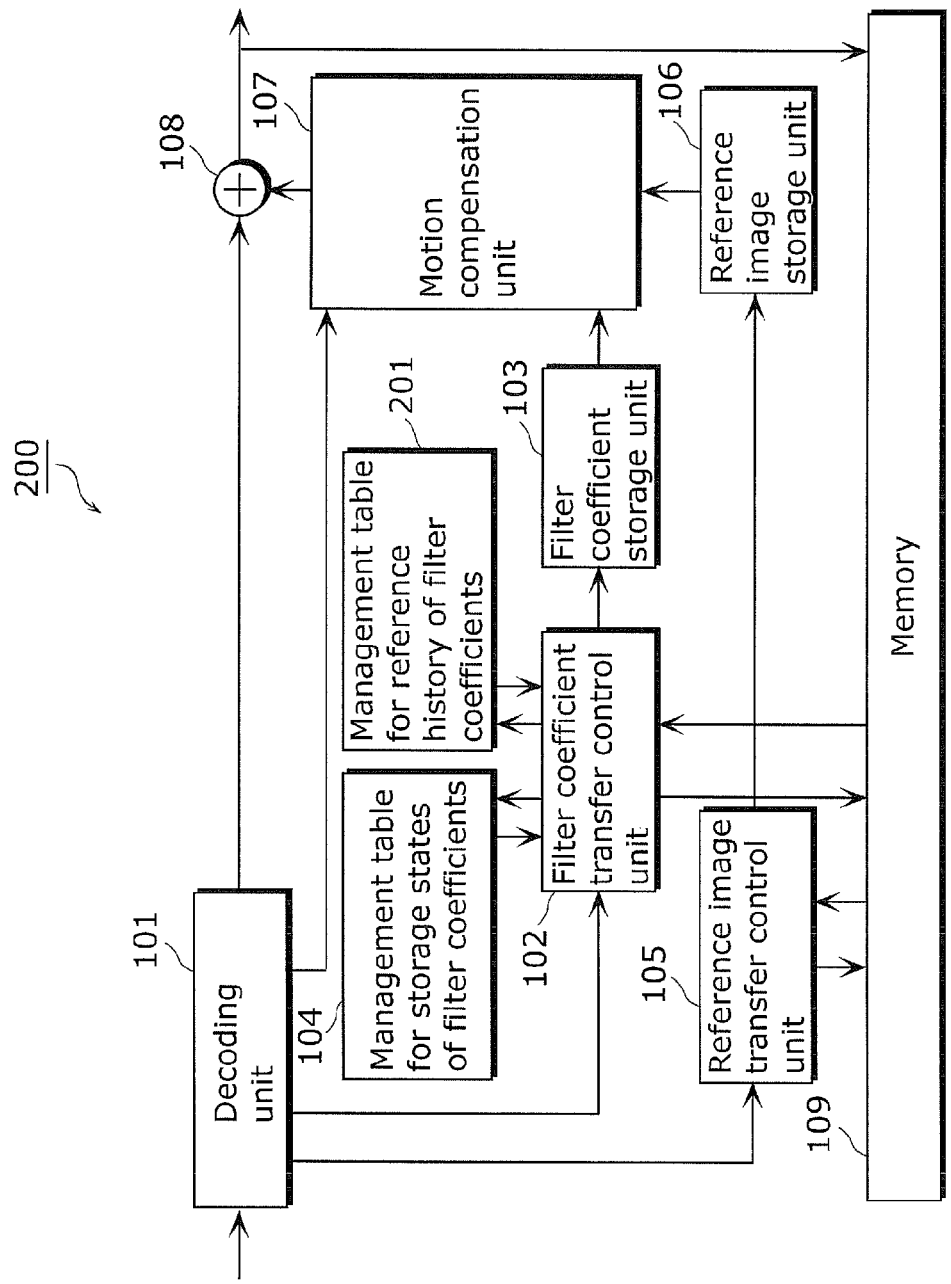
FIG. 6 is a block diagram showing structural elements of a decoding apparatus according to Embodiment 2 of the present invention.

FIG. 6 is a structural diagram of a decoding apparatus according to Embodiment 2 of the present invention. Each of FIG. 7A and FIG. 7B is an example of information held in the management table for reference history of filter coefficients. In FIG. 6, the same structural elements as those in FIG. 1 are assigned with the same reference signs, and the same descriptions thereof are not repeated.

A decoding apparatus 200 as shown in FIG. 6 includes a decoding unit 101, a filter coefficient transfer control unit 102, a filter coefficient storage unit 103, a management table for storage states of filter coefficients 104, a reference image transfer control unit 105, a reference image storage unit 106, a motion compensation unit 107, an adder 108, a memory 109, and a management table for reference history of filter coefficients 201. Unlike the decoding apparatus 100 according to Embodiment 1, the decoding apparatus 200 as shown in FIG. 6 includes the management table for reference history of filter coefficients 201.

The management table for reference history of filter coefficients 201 corresponds to a reference management unit in the CLAIMS of the present application. The management table for reference history of filter coefficients 201 manages, for each of the motion compensation filter coefficients included in the coded stream, use history information indicating the number of times of reference from the start of the decoding. More specifically, the management table for reference history of filter coefficients 201 has a function of receiving, as inputs, the pieces of motion compensation filter coefficient ID, and providing, as an output, the number of times of reference to the motion compensation filter coefficient indicated by a corresponding one of the pieces of motion compensation filter coefficient ID from the start of the decoding. The management table for reference history of filter coefficients 201 holds, for example, information as shown in FIG. 7A. More specifically, the management table for reference history of filter coefficients 201 holds, as the filter coefficient ID, the motion compensation filter coefficient ID included in, for example, the header information of the coded stream to be decoded by the decoding unit 101. Furthermore, the management table for reference history of filter coefficients 201 holds, as the number of times of reference by which each of the motion compensation filter coefficients identified by a corresponding one of the motion compensation filter coefficient ID has been referred to in the stream so far.

It is to be noted that the management table for reference history of filter coefficients 201 may have a function of receiving, as an input, the motion compensation filter coefficient ID, and providing, as an output, a reference order indicating how many times before the motion compensation filter coefficient indicated by the motion compensation filter coefficient ID was referred to in the sequential motion compensation processing currently being performed by the motion compensation unit 107. In this case, the management table for reference history of filter coefficients 201 holds, for example, information as shown in FIG. 7B. More specifically, the management table for reference history of filter coefficients 201 holds, as the filter coefficient ID, the motion compensation filter coefficient ID included in, for example, the header information of the coded stream to be decoded by the decoding unit 101. Furthermore, the management table for reference history of filter coefficients 201 holds, as the reference order, information (a value) indicating how many times before the motion compensation filter coefficient indicated by the motion compensation filter coefficient ID was referred to last in the sequential motion compensation processing that is currently being performed by the motion compensation unit 107.

Figure 8:
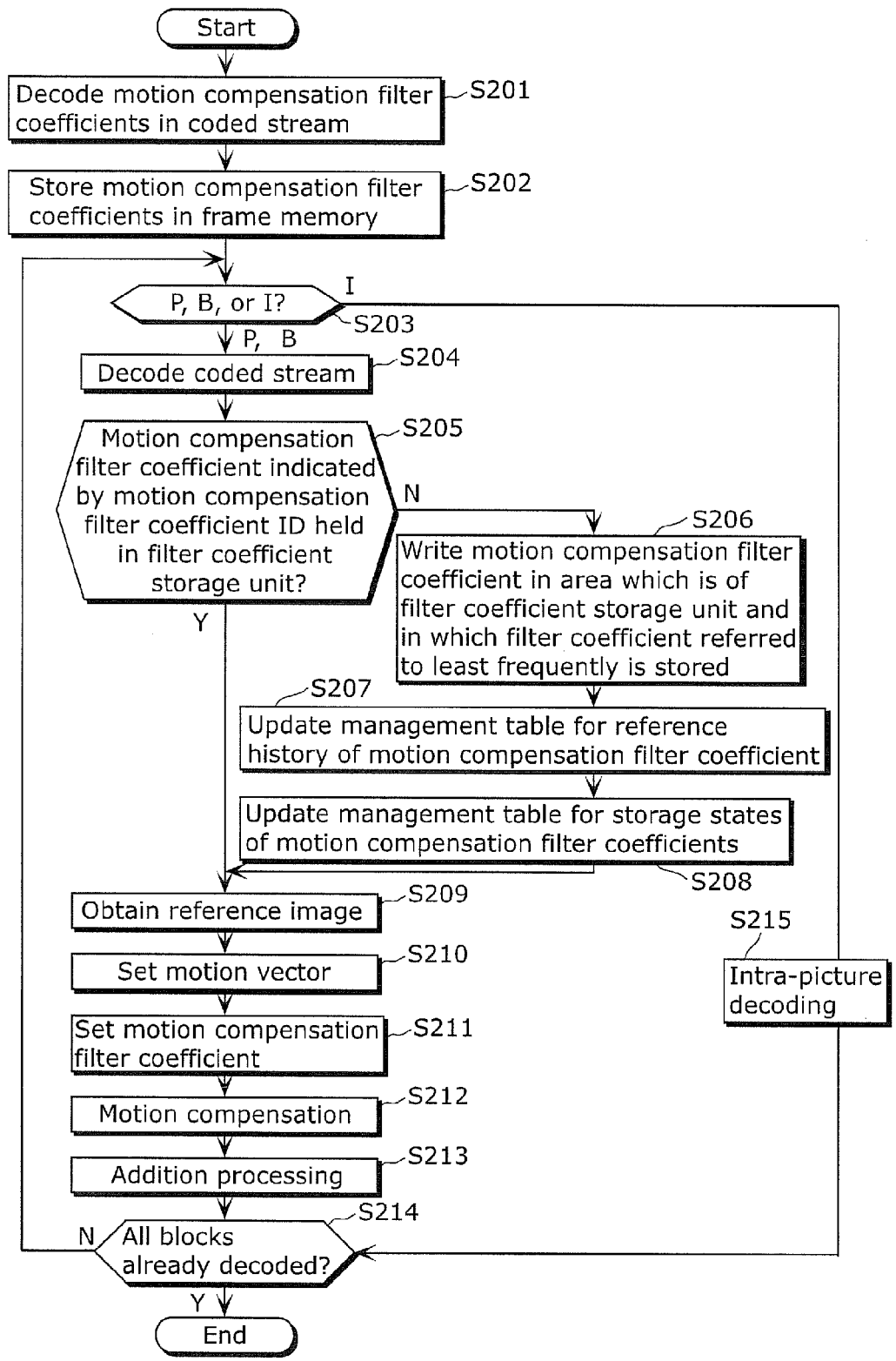
FIG. 8 is a flowchart of decoding operations performed by a decoding apparatus according to Embodiment 2 of the present invention.

Next, a description is given of decoding operations performed by the decoding apparatus 200 configured as mentioned above. FIG. 8 is a flowchart of the decoding operations performed by the decoding apparatus according to Embodiment 2 of the present invention.

As shown in FIG. 8, in the decoding apparatus 200, the decoding unit 101 decodes coded header information in an input coded stream (S201), and outputs, as decoded header information, at least motion compensation filter coefficients. Next, the filter coefficient transfer control unit 102 writes, to the memory 109, all the motion compensation filter coefficients decoded by the decoding unit 101 (S202).

Next, the decoding unit 101 determines whether a current image to be decoded has a picture type of P, B or I (S203). When the current image has a picture type of P or B (the case of P or B in S203), the decoding unit 101 determines that motion compensation is required, decodes the coded header information in the coded stream and a prediction residual signal (S204), and outputs, as the decoded header information, at least the motion compensation filter coefficient ID, the motion vector information, and the prediction residual signal. On the other hand, when the current image has a picture type of I (the case of I in S203), the decoding unit 101 determines that motion compensation is not required, proceeds to S215 and performs intra-picture decoding, and then proceeds to S214.

Next, the filter coefficient transfer control unit 102 checks whether or not the filter coefficient storage unit 103 holds the motion compensation filter coefficient indicated by the motion compensation filter coefficient ID decoded in S204, with reference to the management table for storage states of filter coefficients 104 (S205).

When the filter coefficient storage unit 103 does not hold the motion compensation filter coefficient indicated by the motion compensation filter coefficient ID (the case of No in S205), the filter coefficient transfer control unit 102 reads out, from the memory 109, the motion compensation filter coefficient indicated by the motion compensation filter coefficient ID. In addition, the filter coefficient transfer control unit 102 writes the motion compensation filter coefficient to an area which is of the filter coefficient storage unit 103 and stores the motion compensation filter coefficient referred to least frequently so far (S206). Here, the filter coefficient transfer control unit 102 identifies the motion compensation filter coefficient referred to least frequently with reference to the management table for reference history of filter coefficients 201.

Next, the filter coefficient transfer control unit 102 increments the number of times of reference of the motion compensation filter coefficient referred to in the management table for reference history of filter coefficients (S207).

In addition, the filter coefficient transfer control unit 102 updates the management table for storage states of filter coefficients 104 (S208). More specifically, the filter coefficient transfer control unit 102 updates, to "held", the storage state which is of the read out motion compensation filter coefficient and is indicated in the management table for storage states of filter coefficients 104, and updates the storage state of the erased motion compensation filter coefficient to "not held".

On the other hand, when the filter coefficient storage unit 103 holds the motion compensation filter coefficient indicated by the motion compensation filter coefficient ID (the case of Yes in S205), the filter coefficient transfer control unit 102 proceeds to S209 without reading out the motion compensation filter coefficient from the memory 109.

Next, the reference image transfer control unit 105 obtains a reference image (S209). More specifically, the reference image transfer control unit 105 reads out, from the memory 109, the reference image for use in the motion compensation, based on the header information including the motion vector and the reference picture information output by the decoding unit 101 in S204. Next, the reference image transfer control unit 105 writes the read-out reference image in the reference image storage unit 106.

Next, the motion compensation unit 107 sets the motion vector output by the decoding unit 101 in S204 (S210). Next, the motion compensation unit 107 determines the motion compensation filter coefficient for use in the motion compensation based on the motion compensation filter coefficient ID and the motion vector output by the decoding unit 101 in S204, and reads out the motion compensation filter coefficient from the filter coefficient storage unit 103 (S211). Next, the motion compensation unit 107 reads out the reference image held in the reference image storage unit 106, generates a prediction image by performing motion compensation, and outputs the prediction image to the adder 108 (S212).

Next, the adder 108 adds the prediction image output by the motion compensation unit 107 in S212 and the prediction residual signal output by the decoding unit 101 in S204, and outputs the outcome (S213).

Next, the decoding unit 101 determines whether or not all of the motion compensation blocks need to be motion-compensation using the motion compensation filter coefficients decoded in S201 (S214). When the answer is YES (Y in S214), the decoding unit 101 completes the decoding. On the other hand, when there remains any motion compensation block that is not yet decoded (N in S214), the decoding unit 101 returns to S203 and repeats the following processing.

In this way, the decoding apparatus 200 performs the decoding operations.

As described above, according to Embodiment 2, the motion compensation filter coefficient referred to least frequently is identified with reference to the management table for reference history of filter coefficients 201. In addition, the filter coefficient transfer control unit 102 writes the motion compensation filter coefficient to an area which is of the filter coefficient storage unit 103 and stores the motion compensation filter coefficient referred to least frequently so far. Accordingly, the motion compensation filter coefficient unlikely to be referred to is not held in the filter coefficient storage unit 103. Thus, it is possible to hold the motion compensation filter coefficient highly likely to be referred to frequently in the filter coefficient storage unit 103. As a result, it is possible to reduce the number of times of access to the memory 109. For this reason, it is possible to reduce the memory bandwidth and the memory access latency related to the motion compensation filter coefficient.

In the above description, when the filter coefficient storage unit 103 does not hold the motion compensation filter coefficient indicated by the motion compensation filter coefficient ID, the motion compensation filter coefficient referred to least frequently is identified with reference to the management table for reference history of filter coefficients 201. In the above description, the filter coefficient transfer control unit 102 reads out, from the memory, the motion compensation filter coefficient indicated by the motion compensation filter coefficient ID, and writes the read-out motion compensation filter coefficient to an area which is of the filter coefficient storage unit 103 and stores the motion compensation filter coefficient referred to least frequently. However, the area to which the motion compensation filter coefficient is written is not limited thereto. For example, the motion compensation filter coefficient may be written to: an area that stores the motion compensation filter coefficient used least frequently recently (a predetermined past period); an area that stores the motion compensation filter coefficient used most frequently recently; or an area that stores the motion compensation filter coefficient referred to most frequently so far. Any area selection method is possible as long as the method enables reduction in the access to the memory 109 and reduction in the capacity of the filter coefficient storage unit 103.

The above description is given of a case where the motion compensation filter coefficient ID is header information different from a motion vector, but the motion compensation filter coefficient ID is not limited thereto. For example, the motion vector may be the motion compensation filter coefficient ID, or information including the motion vector not only the header information different from the motion vector may be the motion compensation filter coefficient ID.

The above description is given of a case where the motion vector is set in the motion compensation unit 107, but the decimal part of the motion vector may be set.

Embodiment 3

Figure 9:
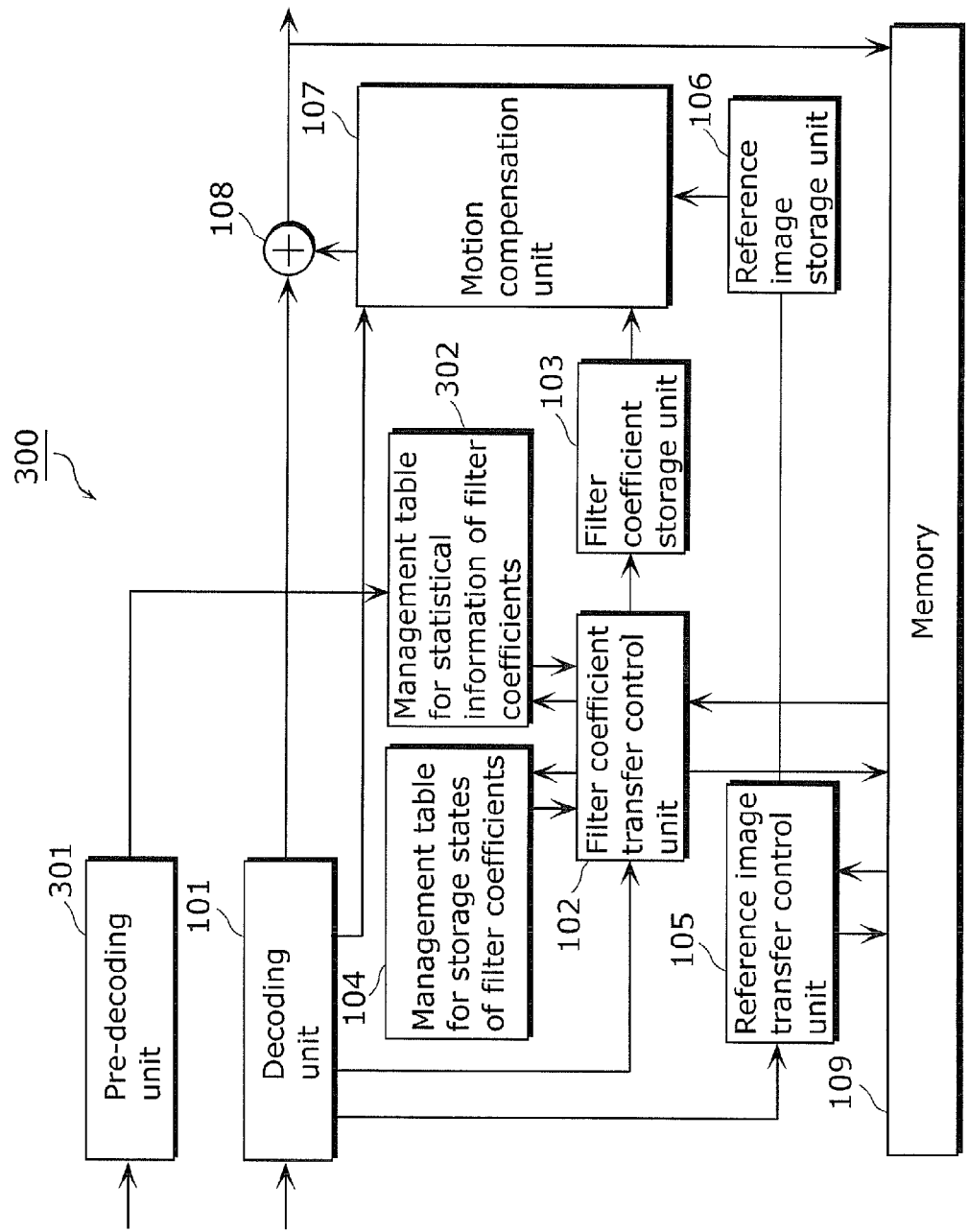
FIG. 9 is a block diagram showing structural elements of a decoding apparatus according to Embodiment 3 of the present invention.

FIG. 9 is a block diagram showing a structure of a decoding apparatus according to Embodiment 3 of the present invention. Each of FIG. 10 and FIG. 11 is an example of information held in a management table for statistical information of filter coefficients. In FIG. 9, the same structural elements as those in FIG. 1 are assigned with the same reference signs, and the same descriptions thereof are not repeated.

A decoding apparatus 300 as shown in FIG. 9 includes a decoding unit 101, a filter coefficient transfer control unit 102, a filter coefficient storage unit 103, a management table for storage states of filter coefficients 104, a reference image transfer control unit 105, a reference image storage unit 106, a motion compensation unit 107, an adder 108, a memory 109, a pre-decoding unit 301, and a management table for statistical information of filter coefficients 302. Unlike the decoding apparatus 100 according to Embodiment 1, the decoding apparatus 300 as shown in FIG. 9 includes the management table for statistical information of filter coefficients 302.

The pre-decoding unit 301 decodes, from a coded stream, at least one of the motion compensation filter coefficients included in a coded stream, prior to the decoding by the decoding unit 101. More specifically, the pre-decoding unit 301 decodes at least one or all of the coded stream generated according to the standard of the video compression technique, prior to the decoding by the decoding unit 101 by at least one bit in the coded stream. Here, the pre-decoding unit 301 has a function of outputting at least the motion compensation filter coefficient ID.

It is to be noted that the decoding apparatus 300 may additionally include a CABAC decoding unit which decodes arithmetic codes such as CABAC (Context-based Adaptive Binary Arithmetic Coding), and the pre-decoding unit 301 may be included in the CABAC decoding unit. In addition, the pre-decoding unit 301 may be provided at a pre-stage of the decoding unit 101. In other words, it is only necessary for the pre-decoding unit 301 to decode the motion compensation filter coefficient ID and output it to the management table for statistical information of filter coefficients 302 without decoding an image, prior to the decoding by the decoding unit 101 by at least one bit in the coded stream.

The management table for statistical information of filter coefficients 302 corresponds to a statistical information management unit in the CLAIMS of the present application. The management table for statistical information of filter coefficients 302 manages the use state of each of the motion compensation filter coefficients decoded by the pre-decoding unit 301 and to be decoded by the decoding unit 101. More specifically, the management table for statistical information of filter coefficients 302 has a function of receiving, as an input, the motion compensation filter coefficient ID output by the pre-decoding unit 301, and providing, as an output, the number of times of use of the motion compensation filter indicated by each of the motion compensation filter coefficient ID included in the coded stream to be decoded by the decoding unit 101.

The management table for statistical information of filter coefficients 302 holds, for example, information as shown in FIG. 10. More specifically, the management table for statistical information of filter coefficients 302 holds, as the filter coefficient ID, the motion compensation filter coefficient included in the header information of the coded stream decoded by the pre-decoding unit 301. In addition, the management table for statistical information of filter coefficients 302 holds, as the number of times of future reference to motion compensation filter coefficients in the stream, the number of times of future reference to motion compensation filter coefficients up to a reference to the motion compensation filter coefficient that is identified by the motion compensation filter coefficient ID and is referred to in the decoding by the decoding unit 101. In addition, the management table for statistical information of filter coefficients 302 holds, for example, information as shown in FIG. 11. More specifically, the management table for statistical information of filter coefficients 302 holds, as the filter coefficient ID, the motion compensation filter coefficient ID included in the header information of the coded stream decoded by the pre-decoding unit 301. In addition, the management table for statistical information of filter coefficients 302 may hold, as information indicating at which block (how many times ahead) in the stream the motion compensation filter coefficient identified by the motion compensation filter coefficient ID is to be referred to in the decoding by the decoding unit 101.

The decoding apparatus 300 is structured as described above. More specifically, by managing the occurrence frequency of the motion compensation filter coefficient ID to be used for decoding by the decoding unit 101 using the management table for statistical information of filter coefficients 302, it is possible to check, in advance, the occurrence probability of the motion compensation filter coefficient ID to be used for the decoding by the decoding unit 101. Accordingly, it is possible to store the motion compensation filter coefficient having a high occurrence probability into the filter coefficient storage unit 103, and to discard the motion compensation filter coefficient having a low occurrence probability from the filter coefficient storage unit 103. This makes it possible to enable reduction in the number of times of access to the memory 109, and to enable reduction in the memory bandwidth for the filter coefficient storage unit 103.

Here, taking an example, a description is given of the difference in the effect of the information indicating the next reference order of the motion compensation filter coefficient for a block in the stream as shown in FIG. 10 and the information indicating the number of times of reference to be made to the motion compensation filter coefficient in the stream as shown in FIG. 11.

Figure 12:
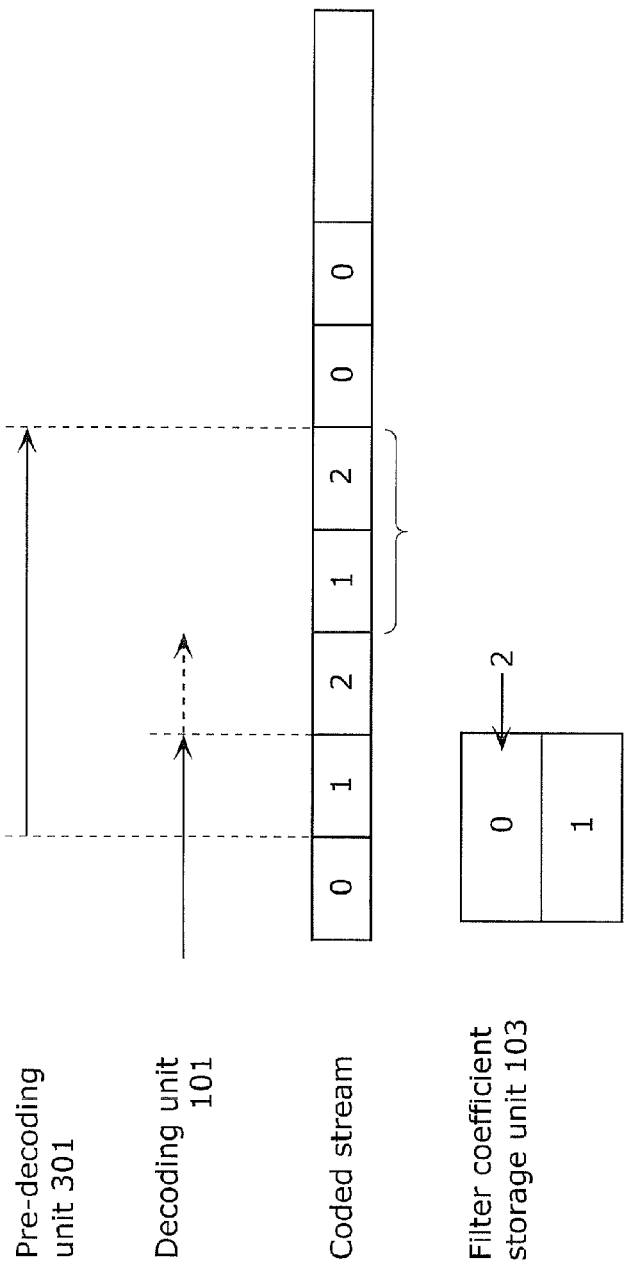
FIG. 12A is an illustration showing how motion compensation filter coefficients in a filter coefficient storage unit are updated based on the management table for statistical information of filter coefficients.
FIG. 12B is a table showing how the motion compensation filter coefficients in the filter coefficient storage unit are updated based on the management table for statistical information of filter coefficients.
Figure 13:
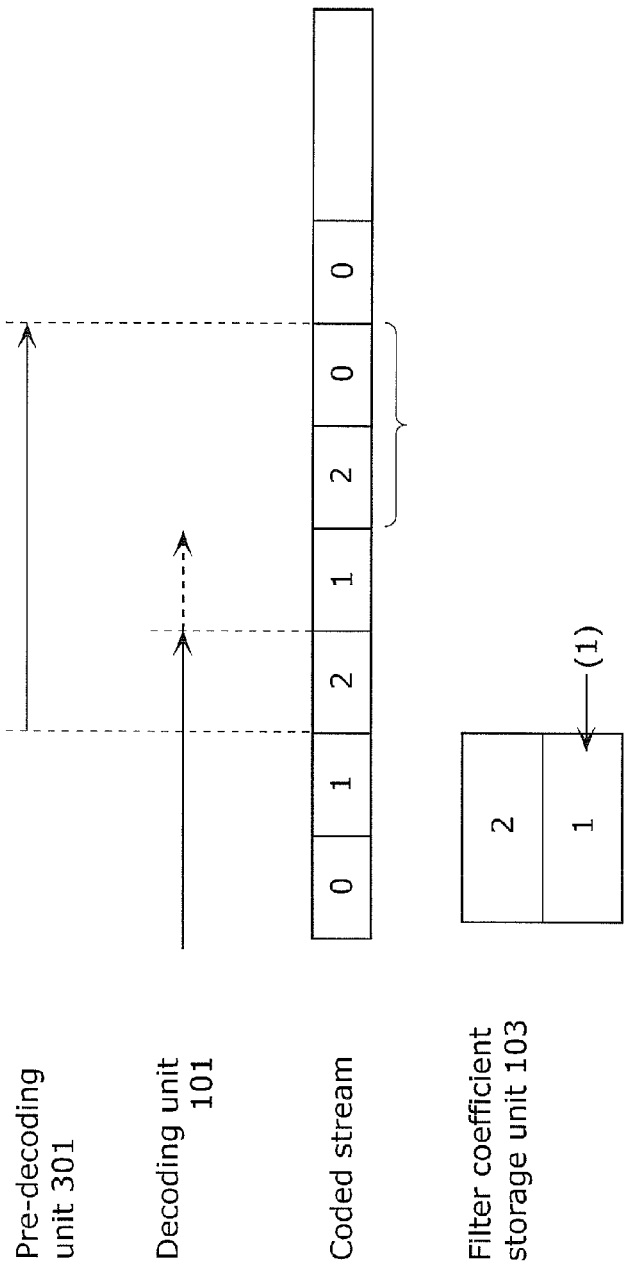
FIG. 13A is an illustration showing how motion compensation filter coefficients in the filter coefficient storage unit are updated based on the management table for statistical information of filter coefficients.
FIG. 13B is a table showing how the motion compensation filter coefficients in the filter coefficient storage unit are updated based on the management table for statistical information of filter coefficients.

Each of FIGS. 12A and 12B and FIGS. 13A and 13B is an illustration or a table showing how motion compensation filter coefficients in the filter coefficient storage unit are updated based on the management table for statistical information of filter coefficients. Here, FIGS. 13A and 13B are consecutive in time to FIGS. 12A and 12B, respectively. Compared to FIGS. 12A and 12B, FIGS. 13A and 13B shows how a macroblock which is next to the macroblock decoded in FIGS. 12A and 12B is decoded by the decoding unit 101. Here, the pre-decoding unit 301 performs decoding of the coded stream, prior to the decoding by the decoding unit 101 by two macroblocks. In addition, the filter coefficient storage unit 103 is assumed to hold only two motion compensation filter coefficients.

As shown in FIG. 12A, the pre-decoding unit 301 performs decoding of the coded stream prior to the decoding by the decoding unit 101 by, for example, three macroblocks, and the information as shown in FIG. 12B is held in the management table for statistical information of filter coefficients 302. For example, the management table for statistical information of filter coefficients 302 holds the pieces of filter coefficients ID (0, 1, and 2) decoded so far in the decoding of the coded stream by the pre-decoding unit 301, and holds the pieces of information (∞, 2, and 1) each indicating at which block (how many times ahead) in the stream the corresponding one of the filter coefficient is referred to. Here, in FIG. 12B, ∞ shows that there is no filter coefficient ID 0 at the macroblock decoded by the pre-decoding unit 301 prior to the macroblock decoded by the decoding unit 101 by two blocks. On the other hand, the filter coefficient ID 1 is referred to by the decoding unit 101 in the future decoding (of the block to be decoded next). Likewise, the filter coefficient ID 2 is referred to by the decoding unit 101 in the future decoding (of the block to be decoded next to the next).

For this, the filter coefficient transfer control unit 102 changes the area in which the motion compensation filter coefficient corresponding to the filter coefficient ID 0 is stored from among the motion compensation filter coefficients corresponding to the pieces of filter coefficient ID (0, 1) held in the filter coefficient storage unit 103, with reference to the management table for statistical information of filter coefficients 302 and the management table for storage states of filter coefficients 104. In other words, the filter coefficient transfer control unit 102 changes the motion compensation filter coefficient corresponding to the filter coefficient ID 0 held in the filter coefficient storage unit 103 to the motion compensation filter coefficient corresponding to the filter coefficient ID 2.

The case as shown in FIGS. 13A and 13B is similar to the above case. Specifically, the filter coefficient transfer control unit 102 determines, as the motion compensation filter coefficient that should be changed, one of the motion compensation filter coefficients corresponding to the pieces of filter coefficient ID (2, 1) held in the filter coefficient storage unit 103, with reference to the management table for statistical information of filter coefficients 302 and the management table for storage states of filter coefficients 104. Here, it is possible to determine to change the area that stores the motion compensation filter coefficient corresponding to the filter coefficient ID 2 with reference to the management table for statistical information of filter coefficients 302. In addition, the filter coefficient transfer control unit 102 can find out that the filter coefficient storage unit 103 holds the motion compensation filter coefficient corresponding to the filter coefficient ID 1 with reference to the management table for storage states of filter coefficients 104. The filter coefficient transfer control unit 102 determines that there is no need to make any modification for the filter coefficient storage unit 103, and thus does nothing for the filter coefficient storage unit 103.

In this way, it is possible to reduce the number of times of access to the memory 109 by checking, in advance, the occurrence probability of the motion compensation filter coefficient ID to be used for the decoding by the decoding unit 101.

Figure 14:
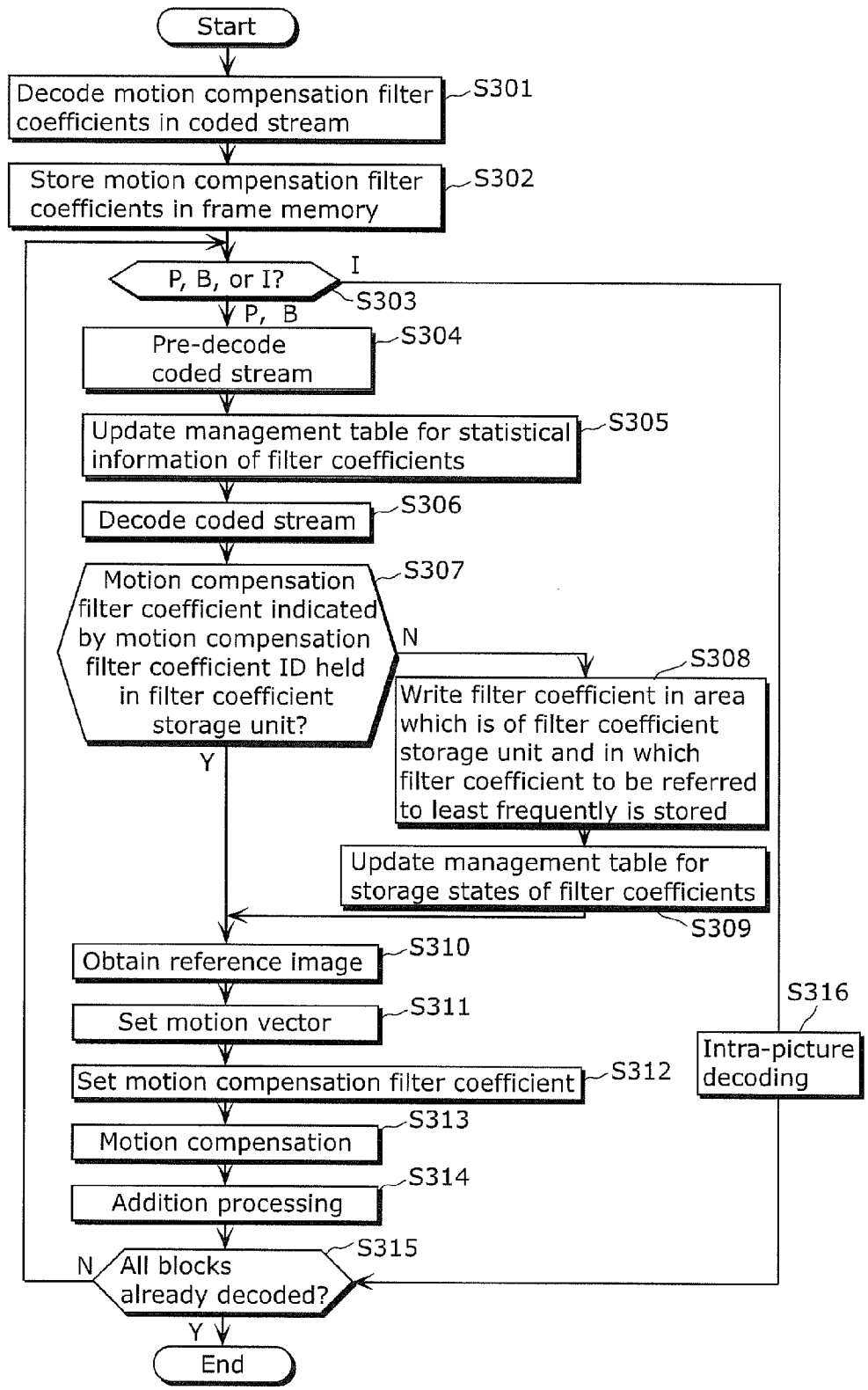
FIG. 14 is a flowchart of decoding operations performed by a decoding apparatus according to Embodiment 3 of the present invention.

Next, a description is given of decoding operations performed by the decoding apparatus 300 configured as mentioned above. FIG. 14 is a flowchart of the decoding operations performed by the decoding apparatus according to Embodiment 3 of the present invention.

As shown in FIG. 14, in the decoding apparatus 300, the decoding unit 101 decodes coded header information in an input coded stream (S301), and outputs, as decoded header information, at least motion compensation filter coefficients. Next, the filter coefficient transfer control unit 102 writes, to the memory 109, all the motion compensation filter coefficients decoded, in Step S301, by the decoding unit 101 (S302). Next, the decoding unit 101 determines whether a current image to be decoded has a picture type of P, B or I (S303). When the decoding unit 101 determines that the current image to be decoded has a picture type of P or B (P or B in S303), the pre-decoding unit 301 determines that motion compensation is required for the current image, performs decoding of the coded stream prior to the decoding by the decoding unit 101, and updates the management table for statistical information of filter coefficients 302 (S305). More specifically, prior to the decoding by the decoding unit 101, the pre-decoding unit 301 performs decoding of the coded stream, and writes, in the management table for statistical information of filter coefficients 302, the occurrence frequency of the motion compensation filter coefficient ID in the part that is of the coded stream and is not yet decoded by the decoding unit 101.

Next, the decoding unit 101 decodes the header information in the coded stream and the prediction residual signal, and outputs, as the header information, at least the motion compensation filter coefficient ID, the motion vector information, and the prediction residual signal (S306).

Here, when the current image has a picture type of I (the case of I in S303), the decoding unit 101 proceeds to S316, performs intra-picture decoding, and proceeds to S315.

Next, the filter coefficient transfer control unit 102 checks whether or not the filter coefficient storage unit 103 holds the motion compensation filter coefficient indicated by the motion compensation filter coefficient ID decoded by the decoding unit 101 in S306, with reference to the management table for storage states of filter coefficients 104 (S307).

When the filter coefficient storage unit 103 does not hold the motion compensation filter coefficient indicated by the motion compensation filter coefficient ID (the case of No in S307), the filter coefficient transfer control unit 102 reads out, from the memory 109, the motion compensation filter coefficients indicated by the motion compensation filter coefficient ID. In addition, the filter coefficient transfer control unit 102 writes the motion compensation filter coefficient to, for example, an area which is of the filter coefficient storage unit 103 and stores the motion compensation filter coefficient to be referred to least frequently (S308). Here, the filter coefficient transfer control unit 102 identifies the motion compensation filter coefficient to be referred to least frequently in the decoding by the decoding unit 101, with reference to the management table for statistical information of filter coefficients 302.

Next, the filter coefficient transfer control unit 102 updates the management table for storage states of filter coefficients 104 (S309). More specifically, the filter coefficient transfer control unit 102 updates, to "held", the storage state which is of the read out motion compensation filter coefficient and is indicated in the management table for storage states of filter coefficients 104, and updates the storage state of the erased motion compensation filter coefficient to "not held".

On the other hand, when the filter coefficient storage unit 103 holds the motion compensation filter coefficient indicated by the motion compensation filter coefficient ID (the case of Yes in S307), the filter coefficient transfer control unit 102 proceeds to S310 without reading out the motion compensation filter coefficient from the memory 109 (without transferring it to the memory 109).

The processes from S310 to S315 are the same as the processes from S209 to S214, and thus the same descriptions thereof are not repeated.

In this way, the decoding apparatus 300 performs the decoding operations.

As described above, according to Embodiment 3, the pre-decoding unit 301 performs decoding of the stream prior to the decoding by the decoding unit 101, and the occurrence frequency of the motion compensation filter coefficient ID to be used for the decoding by the decoding unit 101 is managed using the management table for statistical information of filter coefficients 302. In this way, it is possible to check, in advance, the occurrence probability of the motion compensation filter coefficient ID used for the decoding by the decoding unit 101. Accordingly, by storing the motion compensation filter coefficient having a high occurrence probability in the filter coefficient storage unit 103, it is possible to reduce the number of times of access to the memory 109 and reduce the memory bandwidth and memory access latency related to the motion compensation filter coefficient.

It is to be noted that, when the filter coefficient storage unit 103 does not hold the motion compensation filter coefficient indicated by the motion compensation filter coefficient ID, the motion compensation filter coefficient to be referred to least frequently is identified with reference to the management table for statistical information of filter coefficients 302. In the above description, the filter coefficient transfer control unit 102 reads out, from the memory 109, the motion compensation filter coefficient indicated by the motion compensation filter coefficient ID, and writes the read-out motion compensation filter coefficient to an area which is of the filter coefficient storage unit 103 and stores the motion compensation filter coefficient to be referred to least frequently. However, the area to which the motion compensation filter coefficient is written is not limited thereto. For example, the motion compensation filter coefficient is written to an area that stores the motion compensation filter coefficient that is not to be used for a while or that is to be referred to not frequently for a predetermined future period. Any area selection method is possible as long as the method enables reduction in the access to the memory 109 and reduction in the capacity of the filter coefficient storage unit 103 in the same manner.

The above description is given of a case where the motion compensation filter coefficient ID is header information different from a motion vector, but the motion compensation filter coefficient ID is not limited thereto. For example, the motion vector may be the motion compensation filter coefficient ID. Alternatively, information including the motion vector not only the header information different from the motion vector may be the motion compensation filter coefficient ID.

The above description is given of a case where the motion vector is set in the motion compensation unit 107, but the decimal part of the motion vector may be set.

Figure 15:
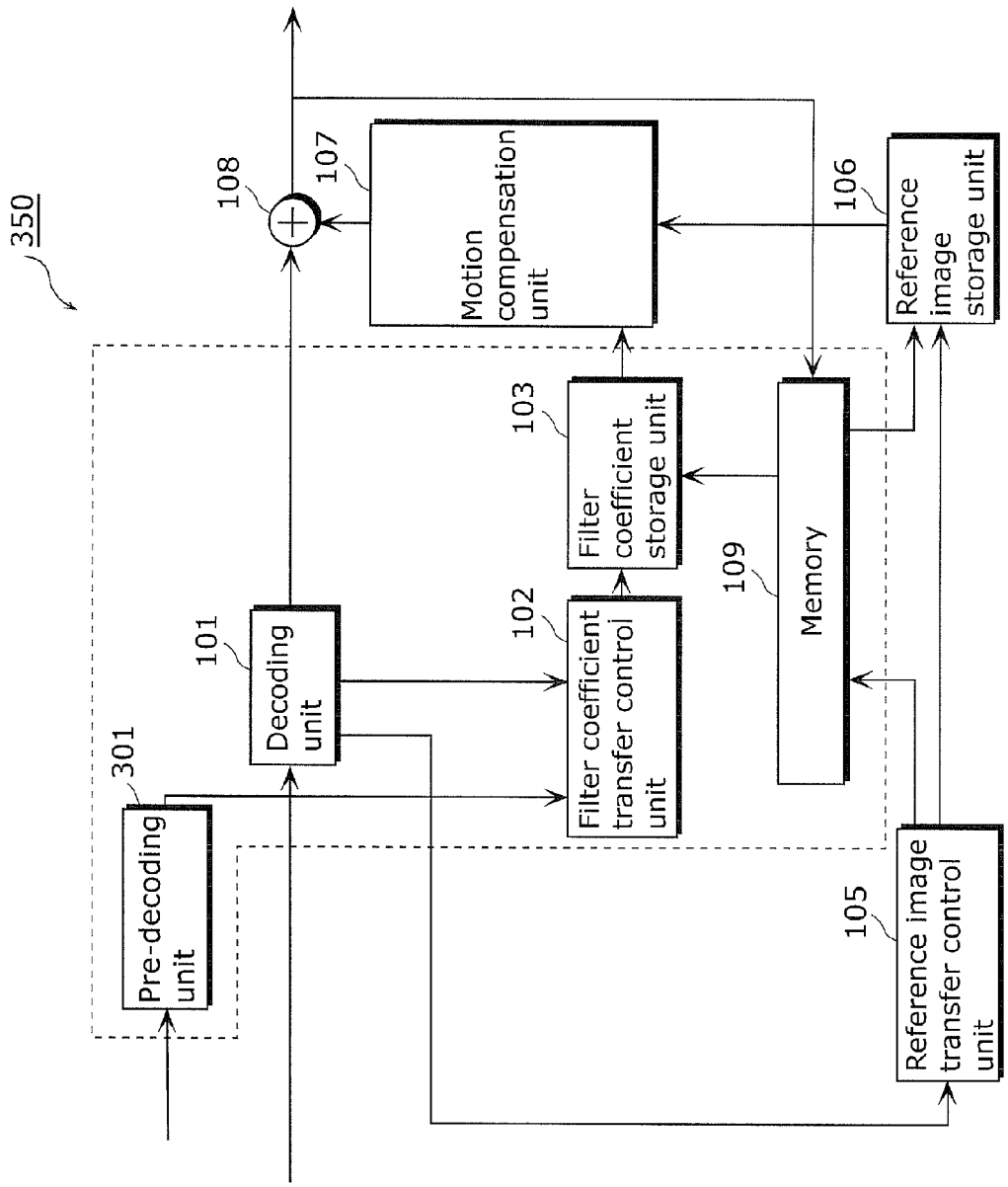
FIG. 15 is a block diagram showing essential structural elements of a decoding apparatus according to Embodiment 3 of the present invention.

In the above description, the decoding apparatus 300 includes the decoding unit 101, the filter coefficient transfer control unit 102, the filter coefficient storage unit 103, the management table for storage states of filter coefficients 104, the reference image transfer control unit 105, the reference image storage unit 106, the motion compensation unit 107, the adder 108, the memory 109, the pre-decoding unit 301, and the management table for statistical information of filter coefficients 302. However, the structure of the decoding apparatus 300 is not limited thereto. As shown in FIG. 15, it is only necessary that the decoding apparatus 300 includes a decoding apparatus unit 350 as its essential element. More specifically, it is only necessary for the decoding apparatus 300 to include the decoding apparatus unit 350 including the decoding unit 101, the filter coefficient transfer control unit 102, the filter coefficient storage unit 103, the memory 109, and the pre-decoding unit 301. FIG. 15 is a block diagram showing essential structural elements of a decoding apparatus according to Embodiment 3 of the present invention.

More specifically, the decoding apparatus unit 350 may include: a decoding unit 101 which decodes, from the coded stream, a plurality of motion compensation filter coefficients for use in the motion-compensation decoding; a pre-decoding unit 301 which decodes, from the coded stream, a plurality of motion compensation filter coefficients, prior to the decoding by the decoding unit 101; a memory 109 for holding the motion compensation filter coefficients decoded by the pre-decoding unit 301; a filter coefficient storage unit 103 for holding at least one motion compensation filter coefficient required for the motion compensation from among the motion compensation filter coefficients decoded by the decoding unit 101; and a filter coefficient transfer control unit 102 which stores, in the filter coefficient storage unit 103, the at least one motion compensation filter coefficient, based on the motion compensation filter coefficients decoded by the pre-decoding unit 301.

The decoding apparatus unit 350 including at least the decoding apparatus unit 10 as its essential element performs pre-reading and pre-analysis of the stream using the motion compensation filter coefficients decoded by the pre-decoding unit 301, and stores at least one motion compensation filter coefficient for use in the motion-compensation decoding into the filter coefficient storage unit 103. Accordingly, the following advantageous effect is provided: when the at least one motion compensation filter coefficient is held in the filter coefficient storage unit 103, it is possible to reduce the number of times of direct access to the memory 109 by using the motion compensation filter coefficient held in the filter coefficient storage unit 103.

Embodiment 4

Figure 16:
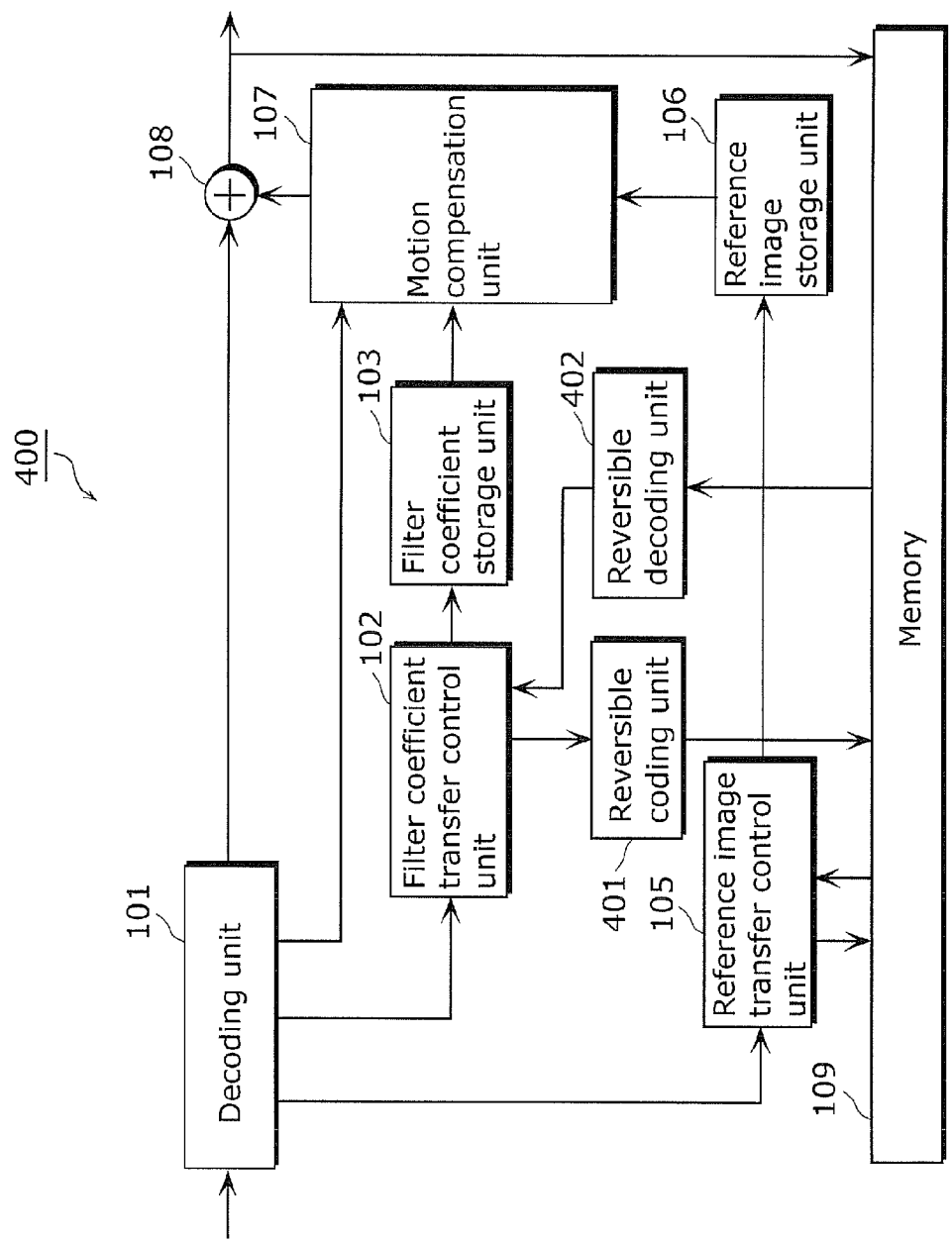
FIG. 16 is a block diagram showing a structure of a decoding apparatus according to Embodiment 4 of the present invention.

FIG. 16 is a block diagram showing a structure of a decoding apparatus according to Embodiment 4 of the present invention. In FIG. 15, the same structural elements as those in FIG. 1 are assigned with the same reference signs, and the same descriptions thereof are not repeated.

A decoding apparatus 400 as shown in FIG. 16 includes a decoding unit 101, a filter coefficient transfer control unit 102, a filter coefficient storage unit 103, a reference image transfer control unit 105, a reference image storage unit 106, a motion compensation unit 107, an adder 108, a memory 109, a reversible coding unit 401, and a reversible decoding unit 402. Here, unlike the decoding apparatus 100 according to Embodiment 1, the decoding apparatus 400 as shown in FIG. 16 includes the reversible coding unit 401 and the reversible decoding unit 402, and does not include the management table for storage states of filter coefficients 104.

The reversible coding unit 401 reversibly codes the motion compensation filter coefficients included in the coded stream. More specifically, the reversible coding unit 401 has a function of reversibly coding the motion compensation filter coefficients decoded by the decoding unit 101, and writing the reversibly-coded motion compensation filter coefficients to the memory 109.

The reversible decoding unit 402 reversibly decodes the at least one motion compensation filter coefficient for use in the decoding from among the plurality of motion compensation filter coefficients reversibly coded by the reversible coding unit 401, and writes the reversibly decoded motion compensation filter coefficient to the filter coefficient storage unit 103 via the filter coefficient transfer control unit 102. More specifically, the reversible decoding unit 402 has a function of reading out the motion compensation filter coefficients stored in the memory 109, reversibly decoding the read-out motion compensation filter coefficients, and writing the reversibly-decoded motion compensation filter coefficients to the filter coefficient storage unit 103 via the filter coefficient transfer control unit 102. It is to be noted that, the reversible decoding unit 402 may write the motion compensation filter coefficients to the filter coefficient storage unit 103 without the control by the filter coefficient transfer control unit 102.

Figure 17:
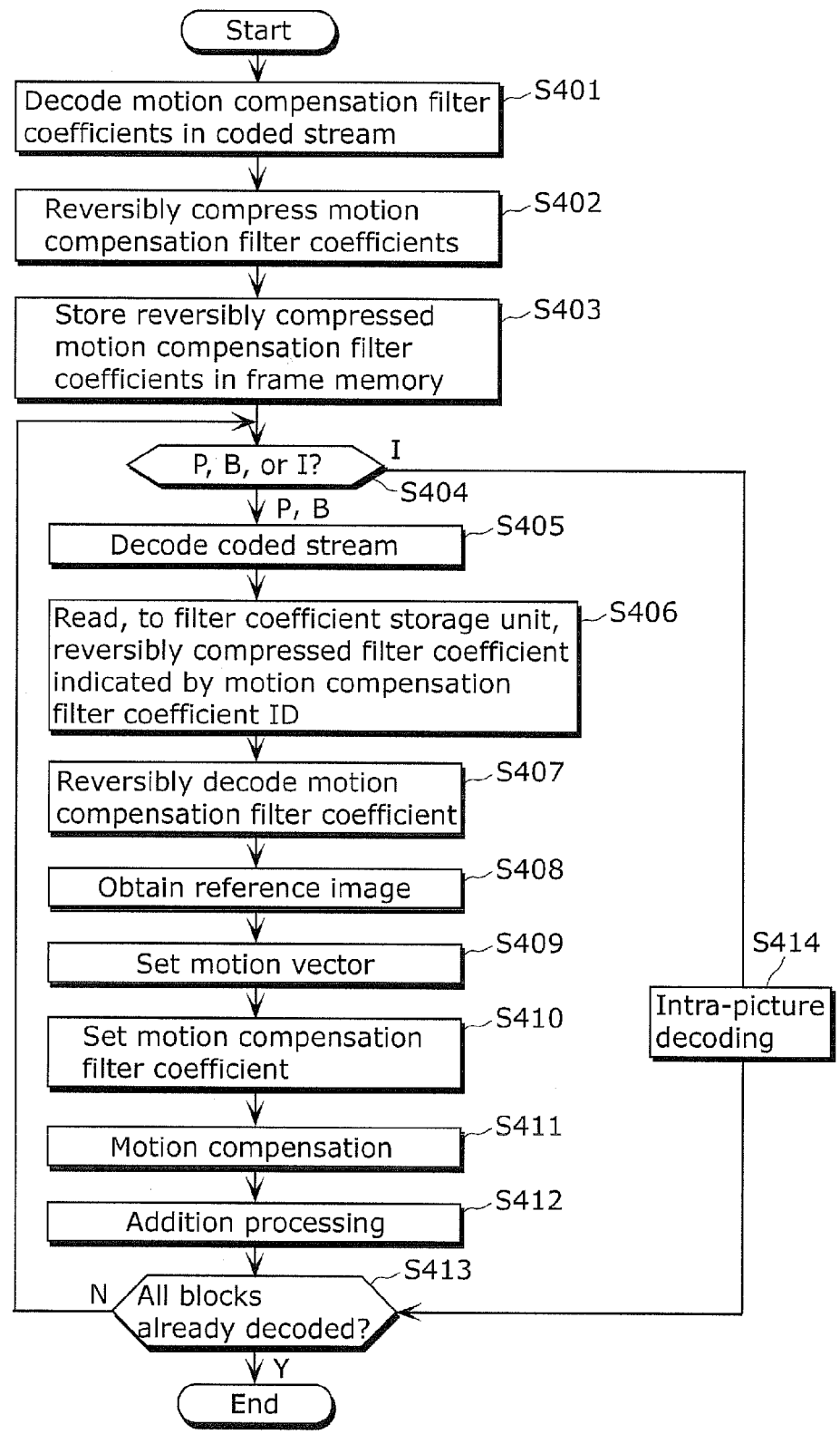
FIG. 17 is a flowchart of decoding operations performed by a decoding apparatus according to Embodiment 4 of the present invention.

Next, a description is given of decoding operations performed by the decoding apparatus 400 configured as mentioned above. FIG. 17 is a flowchart of the decoding operations performed by the decoding apparatus according to Embodiment 4 of the present invention.

As shown in FIG. 17, in the decoding apparatus 400, the decoding unit 101 decodes the header information in an input coded stream (S401), and outputs, as header information, at least one motion compensation filter coefficient. Next, the reversible coding unit 401 reversibly codes the motion compensation filter coefficient decoded by the decoding unit 101 (S402). Next, the filter coefficient transfer control unit 102 writes, to the memory 109, the motion compensation filter coefficient reversibly coded by the reversible coding unit 401 (S403).

Next, the decoding unit 101 determines whether a current image to be decoded has a picture type of P, B or I (S404). When the current image has a picture type of P or B (the case of P or B in S404), the decoding unit 101 determines that motion compensation is required, decodes the header information in the coded stream and a prediction residual signal (S405), and outputs, as header information, at least the motion compensation filter coefficient ID, the motion vector information, and the prediction residual signal. On the other hand, when the current image has a picture type of I (the case of I in S404), the decoding unit 101 determines that motion compensation is not required, proceeds to S414 and performs intra-picture decoding, and then proceeds to S413.

Next, the filter coefficient transfer control unit 102 reads out, from the memory 109, the reversibly-coded motion compensation filter coefficient indicated by the motion compensation filter coefficient ID (S406). Next, the reversible decoding unit 402 reversibly decodes the reversibly-coded motion compensation filter coefficient, and writes the reversibly-decoded motion compensation filter coefficient to the filter coefficient storage unit 103 (S407).

The processes from S408 to S413 are the same as the processes from S108 to S112, and thus the same descriptions thereof are not repeated.

In this way, the decoding apparatus 400 performs the decoding operations.

As described above, according to Embodiment 4, the reversible coding unit 401 compresses the motion compensation filter coefficient, and thus it is possible to reduce the data size of the motion compensation filter coefficient to be stored in the memory 109. In this way, it is possible to reduce the memory capacity related to the motion compensation filter coefficient.

It is to be noted that the decoding apparatus 400 as shown in FIG. 16 may include at least the aforementioned management table for storage states of filter coefficients 104. Alternatively, the decoding apparatus 400 may additionally include one of the management table for reference history of filter coefficients 201 and the management table for statistical information of filter coefficients 302. The latter option is preferable because it is possible to reduce the memory bandwidth and the memory access latency as described earlier, in addition to reduction in the memory capacity related to the motion compensation filter coefficient.

In addition, in the above, the decoding unit 101 decodes the motion compensation filter coefficient once, the reversible coding unit 401 re-codes the motion compensation filter coefficient and then stores the coefficient to the memory 109, and the reversible decoding unit 402 decodes the coefficient. However, this case is an example. For example, it is also good that the motion compensation filter coefficient part of the coded stream is stored into the memory 109 without decoding of the motion compensation filter coefficients by the decoding unit 101, and that the reversible decoding unit 402 decodes these coefficients.

In addition, the coding algorithm for use in the reversible coding unit 401 may be any coding scheme as long as the coding scheme makes the output size of the motion compensation filter coefficient smaller than the input size thereof.

In addition, although the above description is given of a case where the motion compensation filter coefficient ID is header information different from a motion vector, the motion compensation filter coefficient ID is not limited thereto. For example, the motion vector may be the motion compensation filter coefficient ID. Alternatively, information including the motion vector not only the header information different from the motion vector may be the motion compensation filter coefficient ID.

The above description is given of a case where the motion vector is set in the motion compensation unit 107, but the decimal part of the motion vector may be set.

Embodiment 5

Figure 18:
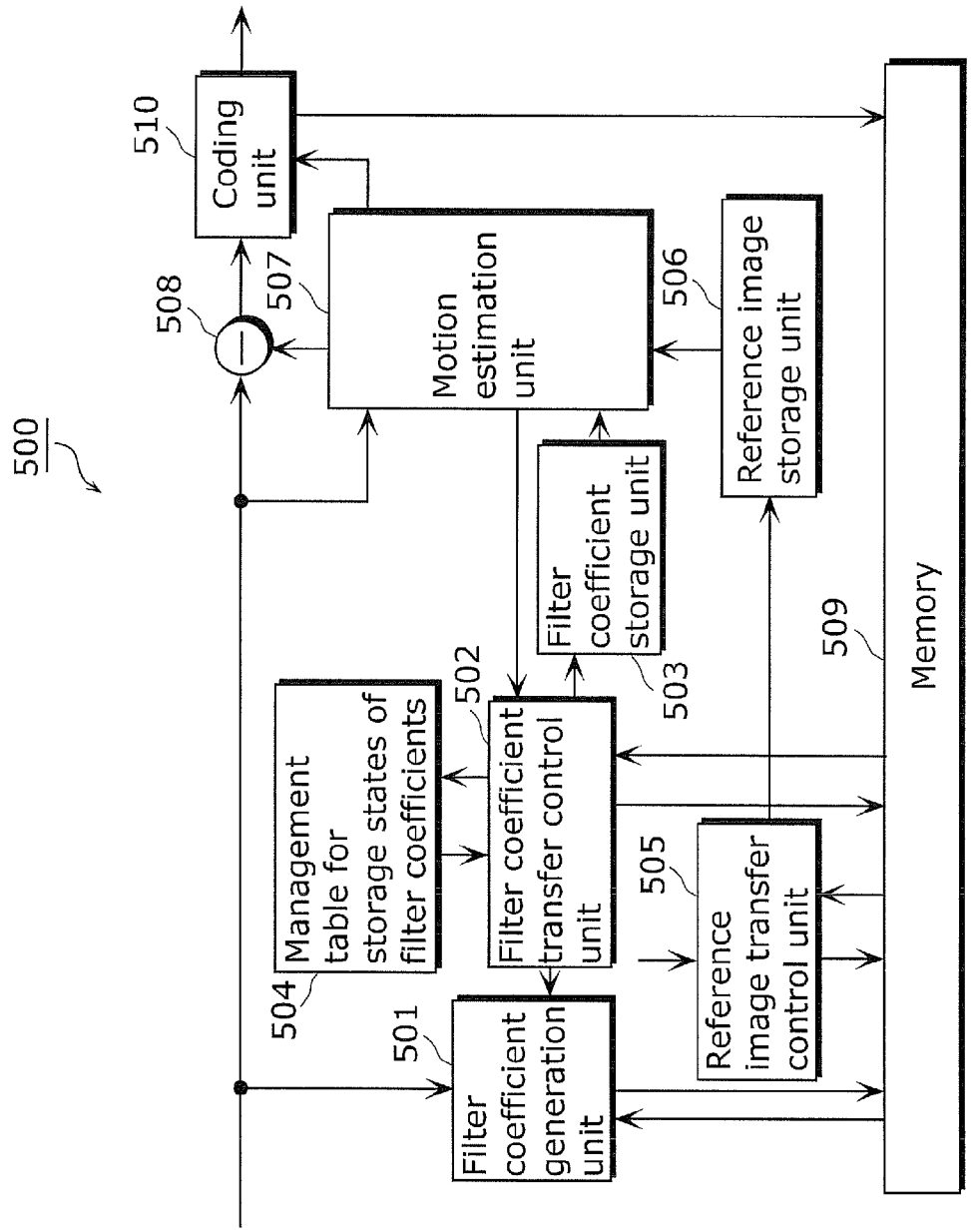
FIG. 18 is a block diagram showing a structure of a coding apparatus according to Embodiment 5 of the present invention.

FIG. 18 is a block diagram showing a structure of a coding apparatus according to Embodiment 5 of the present invention.

A coding apparatus 500 as shown in FIG. 18 is a coding apparatus which performs motion-compensation coding using a current image to be coded and a reference image. The coding apparatus 500 includes a filter coefficient generation unit 501, a filter coefficient transfer control unit 502, a filter coefficient storage unit 503, a management table for storage states of filter coefficients 504, a reference image transfer control unit 505, a reference image storage unit 506, a motion estimation unit 507, a subtractor 508, a memory 509, and a coding unit 510.

The filter coefficient generation unit 501 corresponds to a generation unit in the CLAIMS of the present application. The filter coefficient generation unit 501 generates a plurality of motion compensation filter coefficients for use in the motion-compensation coding. More specifically, the filter coefficient generation unit 501 has a function of receiving a current image to be coded as an input or receiving a current image to be coded and a reference image as inputs, and outputting motion compensation filter coefficients for motion compensation using variable coefficients. Typically, the filter coefficient generation unit 501 generates filter coefficients (motion compensation filter coefficients) for use in the motion compensation using the variable coefficients to be included in the header information of, for example, a GOP or a unit of pictures in the sequence in the coded stream to be coded by the coding unit 510. Here, the motion compensation filter coefficients may be generated in units of the GOP or the sequence, not only in the unit of a picture, or may be generated in units of a slice or a macroblock. Alternatively, these units may be arbitrarily combined.

The filter coefficient transfer control unit 502 writes, to the memory 509, the plurality of motion compensation filter coefficients generated by the filter coefficient generation unit 501, and transfers the required motion compensation filter coefficient from the memory 509 to the filter coefficient storage unit 503, only when the filter coefficient storage unit 503 does not hold the required motion compensation filter coefficient for the motion compensation. More specifically, the filter coefficient transfer control unit 502 has a function of writing, to the memory 509, the motion compensation filter coefficients generated by the filter coefficient generation unit 501. In addition, the filter coefficient transfer control unit 502 has a function of referring to the information in the management table for storage states of filter coefficients 504, based on the information indicating the motion compensation filter coefficient for use in the motion compensation determined by the motion estimation unit 507 (the latter information is the motion compensation filter coefficient ID). The filter coefficient transfer control unit 502 checks whether or not the motion compensation filter coefficient indicated by the motion compensation filter coefficient ID is held in the filter coefficient storage unit 503, based on the information in the management table for storage states of filter coefficients 504.

For example, when the filter coefficient transfer control unit 502 finds out that the motion compensation filter coefficient indicated by the motion compensation filter coefficient ID is not held in the filter coefficient storage unit 503, the filter coefficient transfer control unit 102 reads out, from the memory 509, the motion compensation filter coefficient indicted by the motion compensation filter coefficient ID, and writes the read-out motion compensation filter coefficient in the filter coefficient storage unit 503 (transfers the coefficient thereto). On the other hand, when the filter coefficient transfer control unit 502 finds out that the motion compensation filter coefficient indicated by the motion compensation filter coefficient ID is held (stored) in the filter coefficient storage unit 503, the filter coefficient transfer control unit 102 does not read out, from the memory 509, the motion compensation filter coefficient (does not transfer the coefficient thereto).

It is to be noted that the filter coefficient transfer control unit 502 may issue a write instruction to the filter coefficient generation unit 501 so that the filter coefficient generation unit 501 writes the motion compensation filter coefficient to the memory 509. Likewise, the filter coefficient transfer control unit 502 may issue a read instruction to the filter coefficient storage unit 503 so that the filter coefficient storage unit 503 reads out, from the memory 509, the motion compensation filter coefficient indicated by the motion compensation filter coefficient ID, and holds the read out motion compensation filter coefficient.

The filter coefficient storage unit is for holding the required motion compensation filter coefficients for use in the motion compensation among the plurality of motion compensation filter coefficients held in the memory 509. More specifically, the filter coefficient storage unit 503 has a function of holding at least two kinds of motion compensation filter coefficients transferred from the memory 509, and a function of setting, in the motion estimation unit 507, the motion compensation filter coefficient indicated by the motion compensation filter coefficients ID.

The management table for storage states of filter coefficients 504 manages information indicating whether or not the filter coefficient storage unit 503 holds the motion compensation filter coefficient identified by the motion compensation filter coefficient ID. More specifically, the management table for storage states of filter coefficients 504 has a function of receiving, as an input, the motion compensation filter coefficient ID, and outputting, to the filter coefficient transfer control unit 502, information indicating whether or not the filter coefficient storage unit 503 holds the motion compensation filter coefficient identified by the motion compensation filter coefficient ID. For example, as shown in FIG. 3 mentioned earlier, the management table for storage states of filter coefficients 504 holds, as a table (information), the storage states indicating whether or not the motion compensation filter coefficient identified by the motion compensation filter coefficient ID is stored in the filter coefficient storage unit 503.

The reference image transfer control unit 505 has a function of reading out, from the memory 509, the required reference pixels for use in motion estimation, based on the position information of a search area which is within a reference image and is to be used in the motion estimation, and writing the reference pixels to the reference image storage unit 506.

It is to be noted that the reference image transfer control unit 505 may issue a read instruction to the reference image storage unit 506 based on the position information of the search area in the reference image and used for the motion estimation, so that the reference image storage unit 506 reads out the reference pixels required for the motion estimation and holds the read-out reference pixels.

The reference image storage unit 506 has a function of holding the reference images transferred from the memory 509.

The motion estimation unit 507 generates a prediction image from the current image to be coded and the reference image by performing motion compensation using the motion compensation filter coefficient which is held in the filter coefficient storage unit 503 and required for the motion compensation. More specifically, the motion estimation unit 507 has a function of receiving, as inputs, the current image to be coded and the reference image, and determining the motion vector and the motion compensation filter coefficient ID indicating the type of the motion compensation filter coefficient for use in the motion compensation, and outputting the determined motion vector and motion compensation filter coefficient to the coding unit 510. Furthermore, the motion estimation unit 507 has a function of outputting the determined motion compensation filter coefficient ID to the filter coefficient transfer control unit 502. In addition, the motion estimation unit 507 has a function of obtaining the reference pixels indicated, as being required for the motion compensation, by the motion vector held in the reference image storage unit 506 and the motion compensation filter coefficient indicated by the motion compensation filter coefficient ID held in the filter coefficient storage unit 503, generating a prediction image by performing motion compensation using these pieces of information, and outputting the generated prediction image to the subtractor 508.

Figure 20:
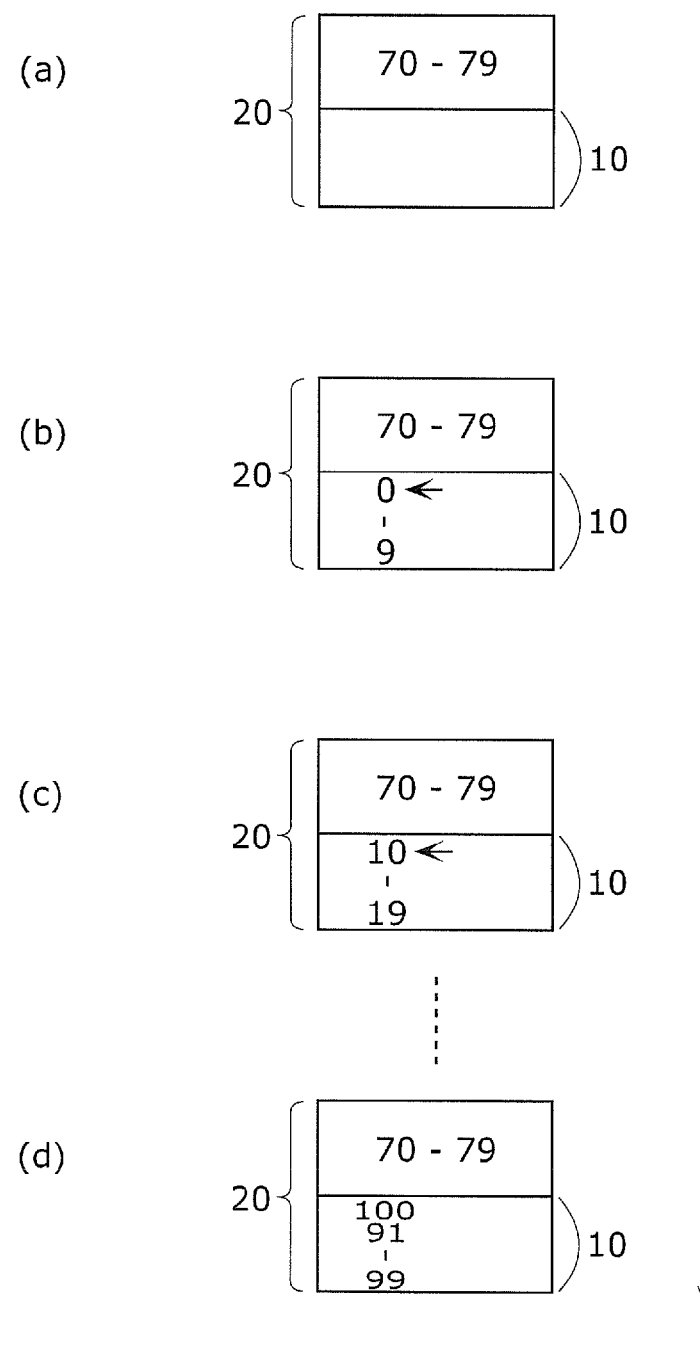
FIG. 20 is illustrations for explaining a method performed by a motion estimation unit to determine motion compensation filter coefficient ID.

Here, a method performed by the motion estimation unit 507 to determine the motion compensation filter coefficient ID is explained taking an example. FIG. 19 is an example of information held in a management table for storage states of filter coefficients. FIG. 20 is illustrations for explaining a method performed by the motion estimation unit 507 to determine the motion compensation filter coefficient ID.

As shown in FIG. 19, it is assumed here that the management table for storage states of filter coefficients holds pieces of motion compensation filter coefficient ID ranging from 0 to 100 and the storage states of the corresponding motion compensation filter coefficients in the filter coefficient storage unit 503. In addition, it is assumed that the filter coefficient storage unit 503 stores motion compensation filter coefficients corresponding to pieces of motion compensation filter coefficient ID ranging from 70 to 79. Furthermore, it is assumed that the filter coefficient storage unit 503 can hold only twenty motion compensation filter coefficients. Accordingly, as shown in (a) in FIG. 20, the filter coefficient storage unit 503 stores the ten motion compensation filter coefficients corresponding to the motion compensation filter coefficient ID ranging from 70 to 79, and has an area available for holding ten more motion compensation filter coefficients.

In this case, the motion estimation unit 507 determines the motion compensation filter coefficient ID indicating the type of the motion compensation filter coefficient used for the motion compensation in the manner indicated below.

First, as shown in (b) in FIG. 20, the motion estimation unit 507 causes the filter coefficient transfer control unit 502 to write the motion compensation filter coefficients corresponding to the pieces of motion compensation filter coefficient ID ranging from 0 to 9 into the filter coefficient storage unit 503, and checks whether or not the pieces of written motion compensation filter coefficient ID are the pieces of motion compensation filter coefficient ID for use in the motion compensation.

Next, as shown in (c) in FIG. 20, the motion estimation unit 507 causes the filter coefficient transfer control unit 502 to write the motion compensation filter coefficients corresponding to the pieces of motion compensation filter coefficient ID ranging from 10 to 19 into the filter coefficient storage unit 503, and checks whether or not the pieces of written motion compensation filter coefficient ID are the pieces of motion compensation filter coefficient ID for use in the motion compensation.

In this way, the motion estimation unit 507 causes the filter coefficient transfer control unit 502 to write the motion compensation filter coefficients corresponding to the pieces of motion compensation filter coefficient ID ranging from 0 to 69 and 80 to 100 into the filter coefficient storage unit 503, and checks whether or not the pieces of written motion compensation filter coefficient ID are the pieces of motion compensation filter coefficient ID for use in the motion compensation.

On the other hand, the motion compensation filter coefficients corresponding to the pieces of motion compensation filter coefficients ID ranging from 70 to 79 are stored in the filter coefficient storage unit 503 in advance. Accordingly, the filter coefficient transfer control unit 502 does not transfer the motion compensation filter coefficients corresponding to the pieces of motion compensation filter coefficient ID ranging from 70 to 79. In this way, it is possible to reduce the memory bandwidth and the memory access latency related to the motion compensation filter coefficients.

The above-described method performed by the motion estimation unit 507 to determine the pieces of motion compensation filter coefficient ID is a mere example, and other methods are possible as a matter of course.

The subtractor 508 has a function of performing subtraction between the input current image to be coded and the prediction error signal output by the motion estimation unit 507, and outputting, as a prediction error signal, the current image and the prediction error signal to the coding unit 510.

The memory 509 has a function of holding the motion compensation filter coefficients and reference pictures that are referred to by the motion estimation unit 507. It is to be noted that the memory 509 may hold only the motion compensation filter coefficients. In such a case, it is only necessary that the decoding apparatus 500 additionally includes a frame memory for holding the reference images that are referred to by the motion estimation unit 507.

The coding unit 510 has a function of receiving, as inputs, at least the prediction error signal output by the subtractor 508, the motion vector output by the motion estimation unit 507, and the motion compensation filter coefficient ID, coding these inputs according to the standard of the video compression technique, and outputting the coded stream.

The decoding apparatus 500 is structured as described above.

Figure 21:
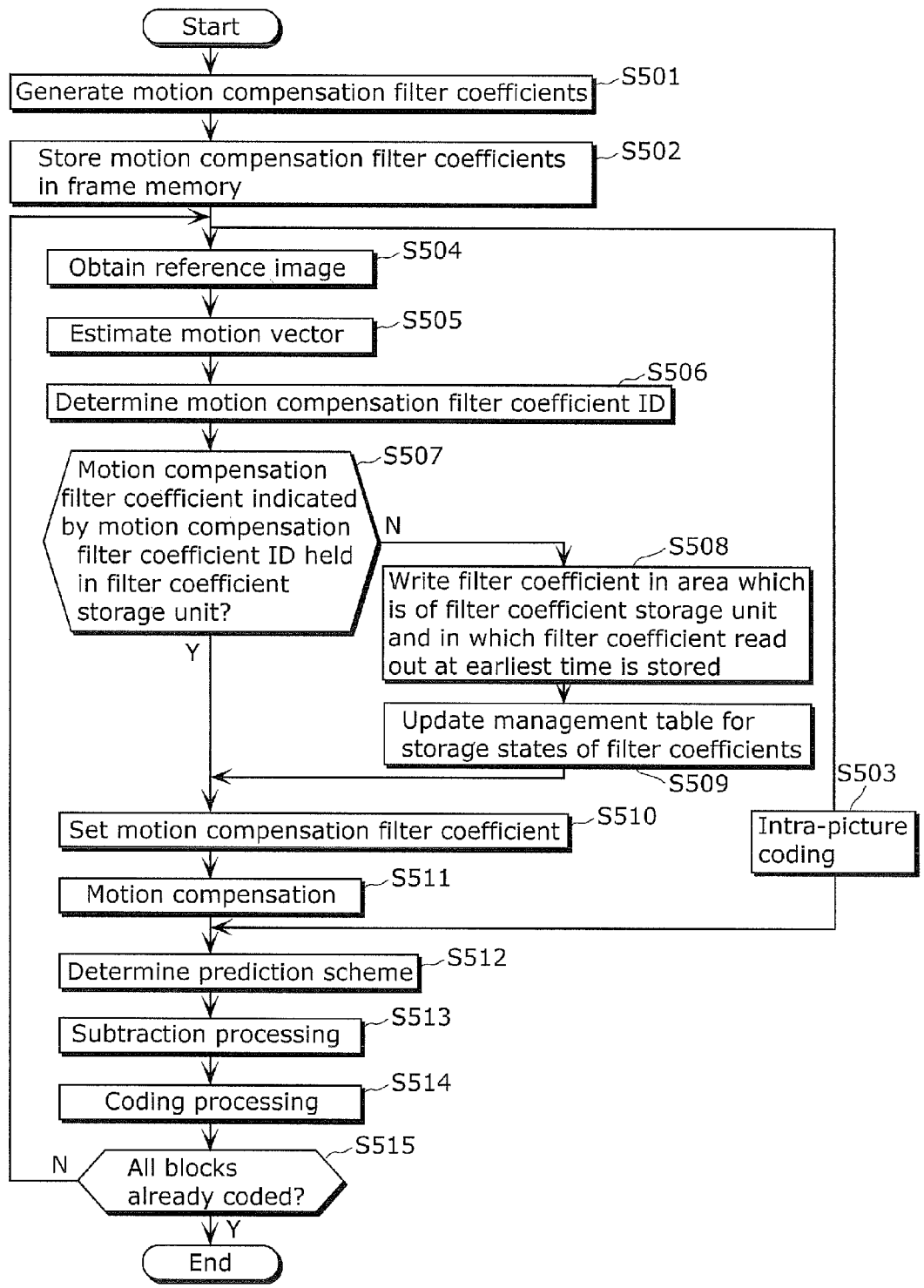
FIG. 21 is a flowchart of coding operations performed by a coding apparatus according to Embodiment 5 of the present invention.

Next, a description is given of coding operations performed by the coding apparatus 500. FIG. 21 is a flowchart of the decoding operations performed by the decoding apparatus according to Embodiment 5 of the present invention.

As shown in FIG. 21, first in the coding apparatus 500, the filter coefficient generation unit 501 receives a current image to be coded, generates motion compensation filter coefficients for use in the following coding, and outputs the generated motion compensation filter coefficients (S501). Next, the filter coefficient transfer control unit 502 writes, to memory 509, all of motion compensation filter coefficients generated by the filter coefficient generation unit 501 in S501.

Next, the coding apparatus 500 performs, on the current image (blocks) both of intra-picture prediction in S503 and inter-picture prediction in S504 to S511. As for the intra-picture prediction, a conventional scheme is applicable, and thus no description thereof is given here. The following describes how the inter-picture prediction in S504 to S511 is performed.

In S504, the reference image transfer control unit 505 reads out, from the memory 509, the reference pixels required for motion estimation, based on the position information of a search area which is within a reference image and is to be used in the motion estimation, and writes the reference pixels to the reference image storage unit 506.

Next, the motion estimation unit 507 receives, as inputs, the current image to be coded and the reference image, outputs, as a motion vector, information at the pixel position that is in the reference image and has a high correlation with the current image to be coded (S505), identifies a motion compensation filter coefficient that yields a smaller prediction error, and outputs motion compensation filter coefficient ID indicating the identified motion compensation filter coefficient.

Next, the filter coefficient transfer control unit 502 checks whether or not the filter coefficient storage unit 503 holds the motion compensation filter coefficient indicated by the motion compensation filter coefficient ID decoded in S506, with reference to the management table for storage states of filter coefficients 504 (S507).

Next, when the filter coefficient storage unit 503 does not hold the motion compensation filter coefficient indicated by the motion compensation filter coefficient ID (the case of No in S507), the filter coefficient transfer control unit 502 reads out, from the memory 509, the motion compensation filter coefficient indicated by the motion compensation filter coefficient ID. Next, the filter coefficient transfer control unit 502 writes the motion compensation filter coefficient in an area which is of the filter coefficient storage unit 503 and holds the motion compensation filter coefficient read out from the memory 509 at earliest time (S508). Next, the filter coefficient transfer control unit 502 updates the management table for storage states of filter coefficients 504 (S509). More specifically, the filter coefficient transfer control unit 502 updates, to "held", the storage state which is of the read out motion compensation filter coefficient and is indicated in the management table for storage states of filter coefficients 504, and updates the storage state of the erased motion compensation filter coefficient to "not held".

On the other hand, when the filter coefficient storage unit 503 holds the motion compensation filter coefficient indicated by the motion compensation filter coefficient IDs (the case of Yes in S507), the filter coefficient transfer control unit 502 proceeds to S510 without reading out the motion compensation filter coefficient from the memory 509 (without transferring it to the memory 109).

Next, the motion estimation unit 507 reads out the motion compensation filter coefficient for use in the motion compensation from the filter coefficient storage unit 503, based on the determined motion vector and the identified motion compensation filter coefficient ID, and sets the motion compensation filter coefficient (S510). Next, the motion estimation unit 507 reads out the reference image held in the reference image storage unit 506, performs motion compensation on the reference image to generate a prediction image (S511), and outputs the generated prediction image to the subtractor 508.

In this way, the coding apparatus 500 performs intra-picture prediction of the current image (blocks) to be coded in S503, and performs inter-picture prediction thereof in S504 to S511. Next, the coding unit 510 compares the coding efficiency in the case of the inter-picture prediction coding and the coding efficiency in the case of the intra-picture prediction coding, and thereby determines one of the coding modes which provides a higher coding efficiency. The coding unit 510 determines the coding mode which provides the higher coding efficiency as the coding mode (macroblock type) of the current image (blocks) to be coded (S512).

Next, the subtractor 508 performs subtraction according to the coding mode of the current image (blocks) to be coded determined in S512. More specifically, when the coding mode of the current image (blocks) to be coded is determined to be inter-picture prediction (S512), the subtractor 508 performs subtraction between the prediction image output by the motion estimation unit 507 in S511 and the current image (blocks) to be coded (S513), and outputs a prediction residual (prediction error) signal. On the other hand, when the coding mode of the current image (blocks) to be coded is determined to be intra-picture prediction (S512), the subtractor 508 performs subtraction between the prediction image output in S503 and the current image (blocks) to be coded (S513) to obtain a prediction residual (error) signal, and outputs the prediction residual (error) signal.

Next, the coding unit 510 receives, as inputs, at least (i) the prediction residual (error) signal output by the subtractor 508 and (ii) the motion vector and the motion compensation filter coefficient ID output by the motion estimation unit 507, codes the prediction residual (error) signal, the motion vector, and the motion compensation filter coefficient ID according to the standard of the video compression technique, and outputs the resulting coded stream (S514).

Next, the coding unit 510 determines whether or not all of the motion compensation blocks that need to be motion-compensation using the motion compensation filter coefficients are already coded (S515). When the answer is positive (in the case of Y in S515), the coding unit 510 completes the coding. On the other hand, when there remains any motion compensation block that is not yet decoded (N in S515), the coding unit 510 returns to both S503 and S504, and repeats the following processing.

As described above, the coding apparatus 500 performs the coding operations.

According to Embodiment 5, when it is found out, with reference to the management table for storage states of filter coefficients 504, that the filter coefficient storage unit 503 stores the motion compensation filter coefficient indicated by the motion compensation filter coefficient ID, the motion compensation filter coefficient is not read out from the memory 509 (is not transferred). For this reason, it is possible to reduce the number of times of access to the memory 509. For this reason, it is possible to reduce the memory bandwidth and the memory access latency related to the motion compensation filter coefficient.

In the above case, when the filter coefficient storage unit 503 does not hold the motion compensation filter coefficient indicated by the motion compensation filter coefficient ID, the filter coefficient transfer control unit 502 reads out from the memory 509 (transfers) the motion compensation filter coefficient indicated by the motion compensation filter coefficient ID. The above description is given of a case of writing the motion compensation filter coefficient to an area which is of the filter coefficient storage unit 503 and stores the motion compensation filter coefficient read out from the frame memory 509 at the earliest time. However, the area to which the motion compensation filter coefficient is written is not limited thereto. For example, the motion compensation filter coefficient may be written to an area which stores the motion compensation filter coefficient read out from the memory 509 most recently. Alternatively, the motion compensation filter coefficient may be written to an area which stores another filter coefficient and is selected at random. Any other area selection method is possible as long as the method enables reduction in the access to the memory 509 and reduction in the capacity of the filter coefficient storage unit 103.

The above description is given of a case where the motion compensation filter coefficient ID is header information different from a motion vector, but the motion compensation filter coefficient ID is not limited thereto. For example, the motion vector may be the motion compensation filter coefficient ID. Alternatively, not only the header information different from the motion vector but also the motion vector may be the motion compensation filter coefficient ID.

In addition, the coding apparatus 500 includes the filter coefficient generation unit 501, the filter coefficient transfer control unit 502, the filter coefficient storage unit 503, the management table for storage states of filter coefficients 504, the reference image transfer control unit 505, the reference image storage unit 506, the motion estimation unit 507, the subtractor 508, the memory 509, and the coding unit 510. However, the structure of the coding apparatus 500 is not limited to the above structure. The coding apparatus 500 may include, as essential elements, the filter coefficient generation unit 501, the filter coefficient transfer control unit 502, the filter coefficient storage unit 503, the motion estimation unit 507, and the memory 509.

More specifically, the coding apparatus 500 may be the moving image coding apparatus which performs motion-compensation coding using a current image to be coded and a reference image, and may include: a filter coefficient generation unit 501 which generates a plurality of motion compensation filter coefficients for use in the motion-compensation coding; a memory 509 for holding the motion compensation filter coefficients generated by the filter coefficient generation unit 501; a filter coefficient storage unit 503 for holding at least one motion compensation filter coefficient required for the motion compensation, from among the motion compensation filter coefficients held in the memory 509; a motion estimation unit 507 which generates a prediction image by performing motion compensation between the current image to be coded and the reference image, using the required motion compensation filter coefficients held in the filter coefficient storage unit 503; and a filter coefficient transfer control unit 502 which writes, to the memory 509, the motion compensation filter coefficients generated by the filter coefficient generation unit 501, and transfers the required motion compensation filter coefficient from the memory 509 to the filter coefficient storage unit 503, only when the filter coefficient storage unit 503 does not hold the required motion compensation filter coefficient.

With these essential elements, the coding apparatus 500 is capable of skipping reading of the motion compensation filter coefficient from the memory 509 when the filter coefficient storage unit 503 holds the required motion compensation filter coefficient. For this reason, it is possible to reduce the number of times of access to the memory 509. For this reason, it is possible to reduce the memory bandwidth and the memory access latency related to the motion compensation filter coefficient.

Embodiment 6

Figure 22:
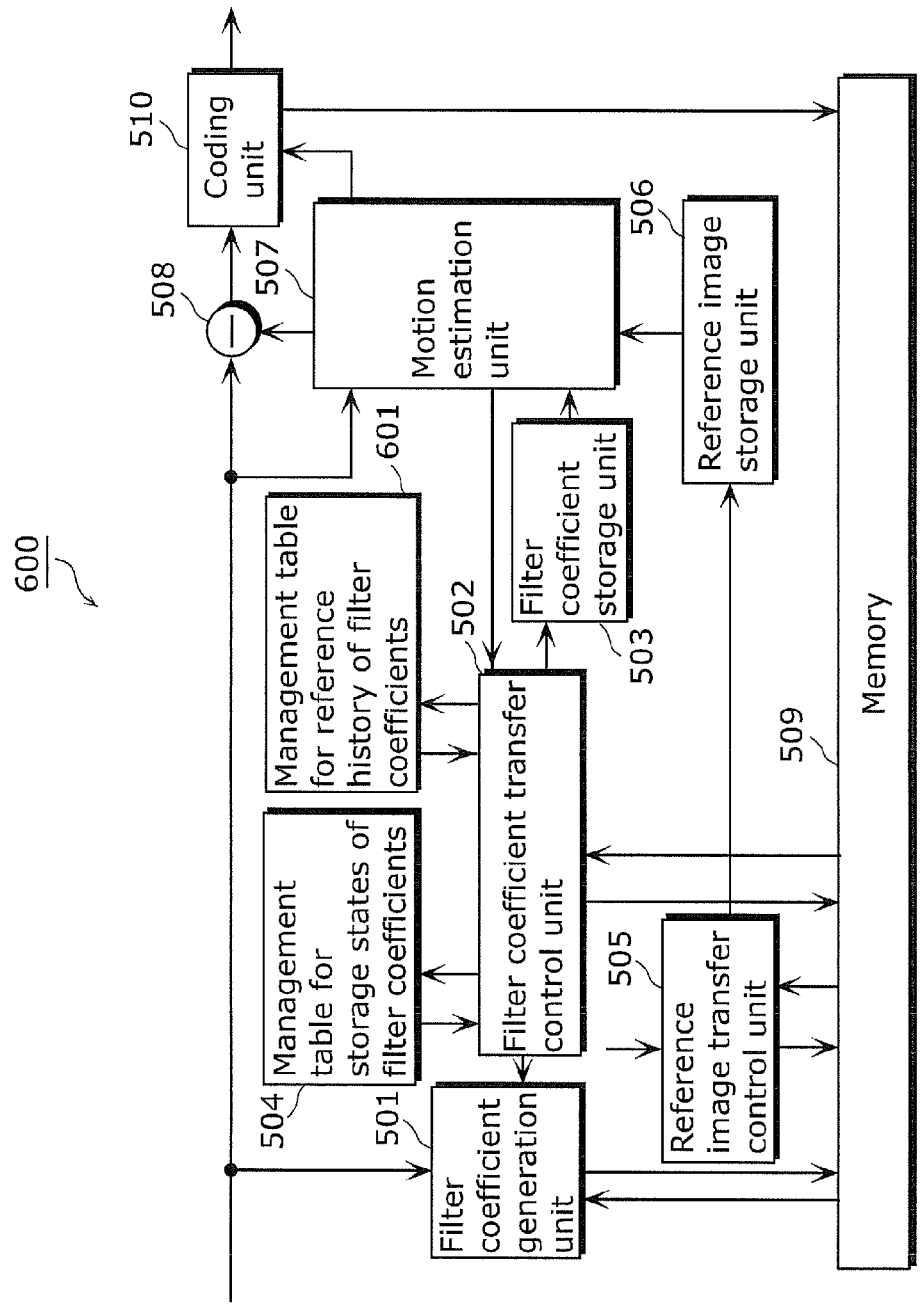
FIG. 22 is a block diagram showing a structure of a coding apparatus according to Embodiment 6 of the present invention.

FIG. 22 is a block diagram showing a structure of a coding apparatus according to Embodiment 6 of the present invention. In FIG. 22, the same structural elements as those in FIG. 18 are assigned with the same reference signs, and the same descriptions thereof are not repeated.

A coding apparatus 600 as shown in FIG. 22 includes a filter coefficient generation unit 501, a filter coefficient transfer control unit 502, a filter coefficient storage unit 503, a management table for storage states of filter coefficients 504, a reference image transfer control unit 505, a reference image storage unit 506, a motion estimation unit 507, a subtractor 508, a memory 509, a coding unit 510, and a management table for reference history of filter coefficients 601. Unlike the coding apparatus 500 according to Embodiment 5, the coding apparatus 600 as shown in FIG. 22 includes the management table for reference history of filter coefficients 601.

The management table for reference history of filter coefficients 601 manages use history which is of each of the motion compensation filter coefficients for use in motion compensation and indicates the number of times of reference to the motion compensation filter coefficient from the start of the motion compensation. More specifically, the management table for reference history of filter coefficients 601 has a function of receiving, as an input, the motion compensation filter coefficient ID, and outputs the number of times of reference to the motion compensation filter coefficient indicated by the motion compensation filter coefficient ID from the start of the coding. It is to be noted that the information held in the management table for reference history of filter coefficients 601 is the same as the contents as shown in FIG. 7A and FIG. 7B, and thus the description thereof is not repeated here.

Figure 23:
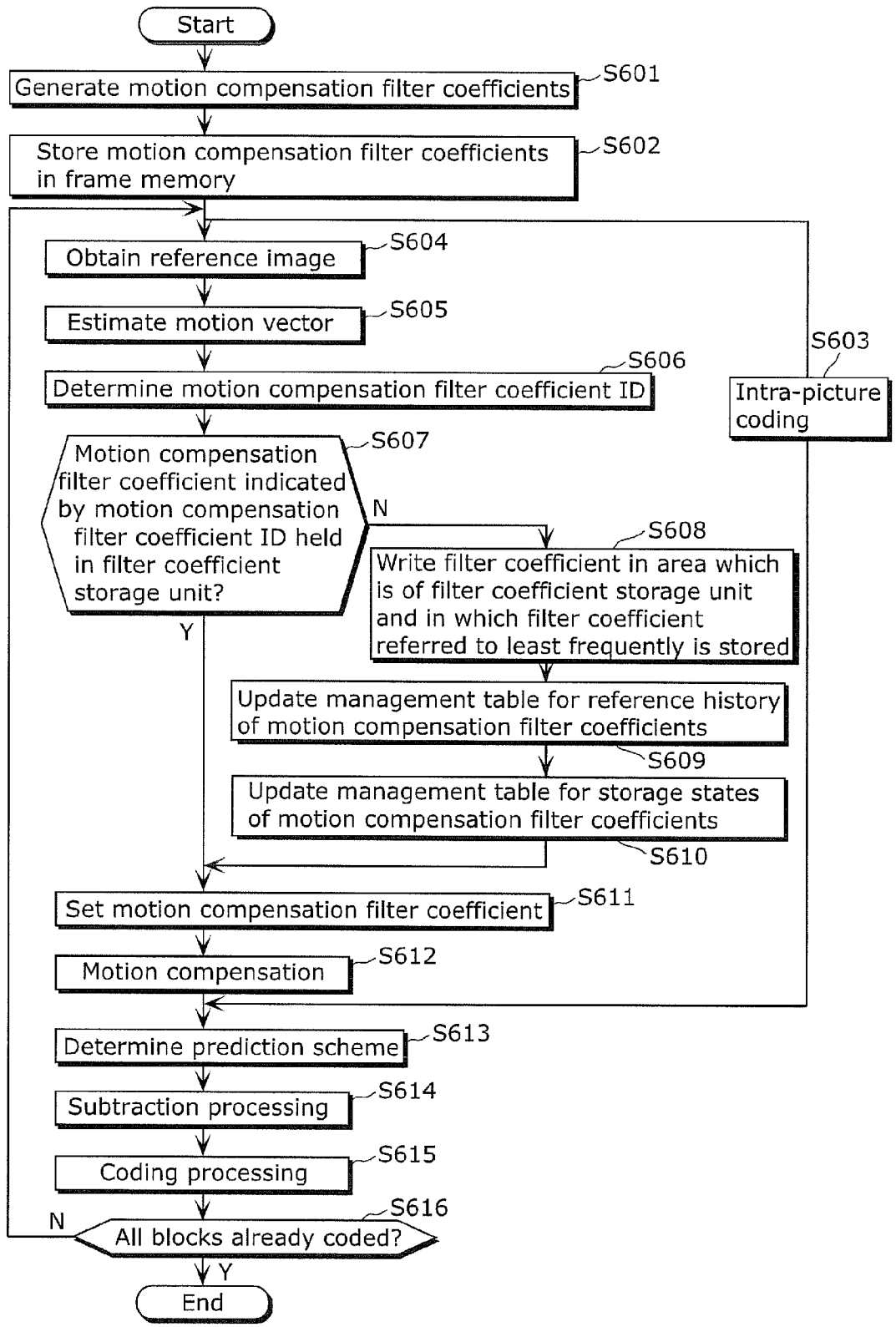
FIG. 23 is a flowchart of coding operations performed by the coding apparatus according to Embodiment 6 of the present invention.

Next, a description is given of coding operations performed by the coding apparatus 600 configured as mentioned above. FIG. 23 is a flowchart of the decoding operations performed by the decoding apparatus according to Embodiment 6 of the present invention.

As shown in FIG. 23, first in the coding apparatus 600, the filter coefficient generation unit 501 receives a current image to be coded, and generates and outputs motion compensation filter coefficients for use in the following coding (S601). The processes of S602 is the same as the process of S502, and thus the same description thereof is not repeated.

Next, the coding apparatus 600 performs, on the current image (blocks) to be coded, both of intra-picture prediction in S603 and inter-picture prediction in S604 to S612. As for the intra-picture prediction, a conventional scheme is applicable as in S503, and thus no description thereof is given here. The following describes how the inter-picture prediction in S604 to S612 is performed. Here, the processes of S604 to S606 are the same as the processes of S504 to S506, and thus the same descriptions thereof are not repeated.

Next, when the filter coefficient storage unit 503 does not hold the motion compensation filter coefficient indicated by the motion compensation filter coefficient ID (the case of No in S607), the filter coefficient transfer control unit 502 reads out, in S607, the motion compensation filter coefficient indicated by the motion compensation filter coefficient ID from the memory 509. In addition, the filter coefficient transfer control unit 502 writes the motion compensation filter coefficient to an area which is of the filter coefficient storage unit 503 and stores the motion compensation filter coefficient referred to least frequently so far (S608). Here, the filter coefficient transfer control unit 502 identifies the motion compensation filter coefficient referred to least frequently with reference to the management table for reference history of filter coefficients 601.

Next, the filter coefficient transfer control unit 502 updates the management table for reference history of filter coefficients 601 (S609). More specifically, the filter coefficient transfer control unit 502 increments the number of times of reference to the motion compensation filter coefficient in the management table for reference history of filter coefficients 601.

Next, the filter coefficient transfer control unit 502 updates the management table for storage states of filter coefficients 504 (S610). More specifically, the filter coefficient transfer control unit 502 updates, to "held", the storage state which is of the read out motion compensation filter coefficient and is indicated in the management table for storage states of filter coefficients 504, and updates the storage state of the erased motion compensation filter coefficient to "not held".

On the other hand, when the filter coefficient storage unit 503 holds the motion compensation filter coefficient indicated by the motion compensation filter coefficient ID (the case of Yes in S607), the filter coefficient transfer control unit 502 proceeds to S611 without reading out the motion compensation filter coefficient from the memory 509 (without transferring it).

Next, the motion estimation unit 507 reads out the motion compensation filter coefficient for use in the motion compensation from the filter coefficient storage unit 503, based on the determined motion vector and the identified motion compensation filter coefficient ID, and sets the motion compensation filter coefficient (S611). The process of S611 is the same as the process of S510, and thus the same description thereof is not repeated.

In this way, the coding apparatus 600 performs intra-picture prediction of the current image (blocks) to be coded in S603, and performs inter-picture prediction thereof in S604 to S612. Next, the coding unit 510 determines, based on the performed intra-picture prediction and inter-picture prediction, which one of the coding modes provides a higher coding efficiency from among the coding efficiency in the case of performing the inter-picture coding and the coding efficiency in the case of performing the intra-picture coding. The coding unit 510 determines the coding mode determined as providing the higher coding efficiency as the coding mode (macroblock type) of the current image (blocks) to be coded.

The following processes of S614 to S616 are the same as the processes of S513 to S515, and thus the same descriptions thereof are not repeated.

As described above, the coding apparatus 600 performs the coding operations.

As described above, according to Embodiment 6, the motion compensation filter coefficient referred to least frequently is identified with reference to the management table for reference history of filter coefficients 601. In addition, the filter coefficient transfer control unit 502 writes the motion compensation filter coefficients to an area which is of the filter coefficient storage unit 503 and stores the motion compensation filter coefficients referred to least frequently so far. Accordingly, the motion compensation filter coefficients unlikely to be referred to are not held in the filter coefficient storage unit 503. Thus, it is possible to hold the motion compensation filter coefficients highly likely to be referred to frequently in the filter coefficient storage unit 503. As a result, it is possible to reduce the number of times of access to the memory 509. In this way, it is possible to reduce the memory bandwidth and the memory access latency related to the motion compensation filter coefficients.

It is to be noted that, when the filter coefficient storage unit 503 does not hold the motion compensation filter coefficient indicated by the motion compensation filter coefficient ID, the motion compensation filter coefficient referred to least frequently is identified with reference to the management table for reference history of filter coefficients 601. In the above description, the filter coefficient transfer control unit 502 reads out, from the memory 509, the motion compensation filter coefficient indicated by the motion compensation filter coefficient ID, and writes the read-out motion compensation filter coefficient to an area which is of the filter coefficient storage unit 503 and stores the motion compensation filter coefficient referred to least frequently. However, the area to which the motion compensation filter coefficient is written is not limited thereto. For example, the motion compensation filter coefficient may be written to: an area that stores the motion compensation filter coefficient used least frequently recently (a predetermined past period); an area that stores the motion compensation filter coefficient used most frequently recently; or an area that stores the motion compensation filter coefficient referred to most frequently so far. Any area selection method is possible as long as the method enables reduction in the access to the memory 109 and reduction in the capacity of the filter coefficient storage unit 103.

The above description is given of a case where the motion compensation filter coefficient ID is header information different from a motion vector, but the motion compensation filter coefficient ID is not limited thereto. For example, the motion vector may be the motion compensation filter coefficient ID. Alternatively, not only the header information different from the motion vector but also the motion vector may be the motion compensation filter coefficient ID.

Embodiment 7

Figure 24:
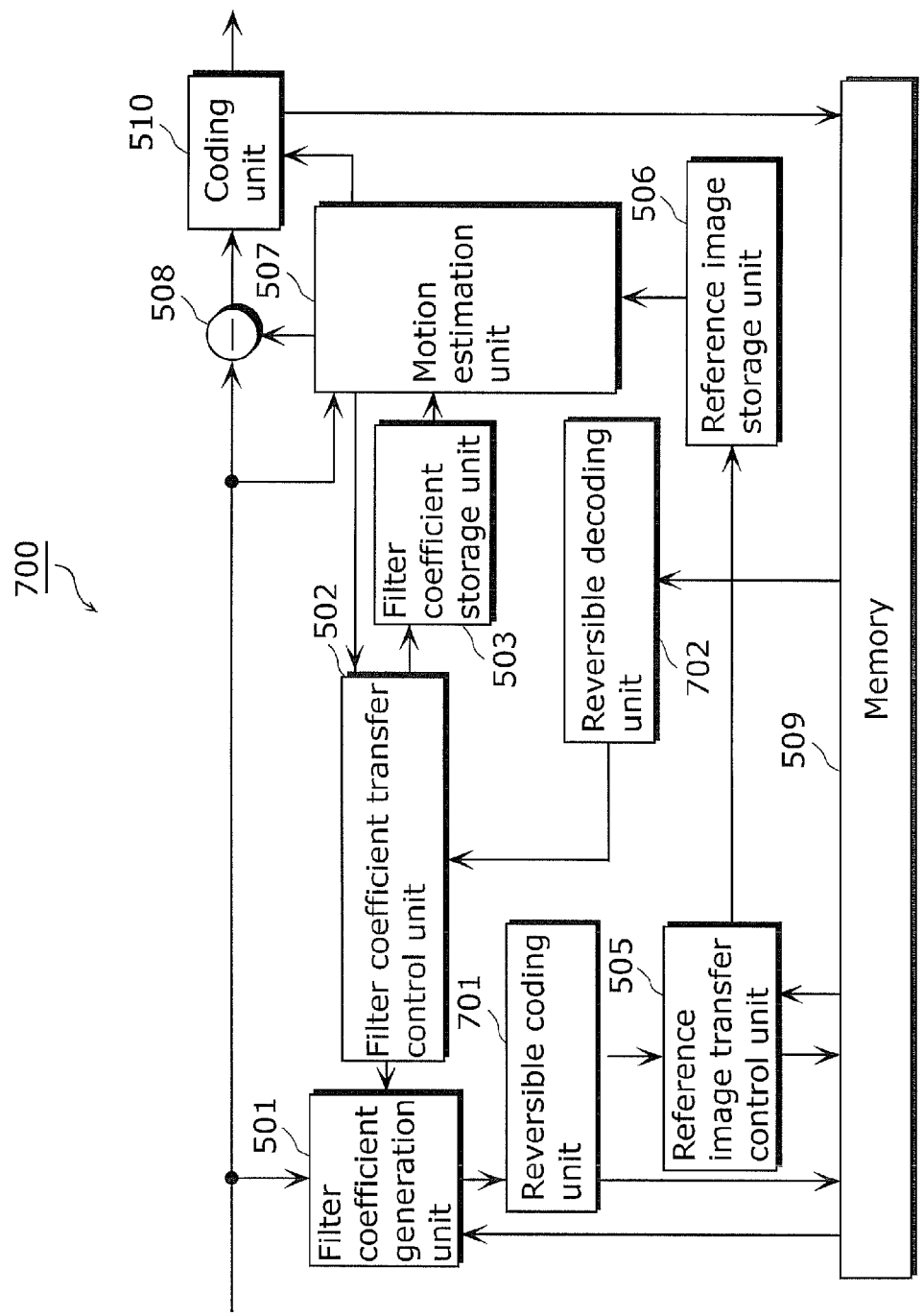
FIG. 24 is a block diagram showing a structure of a coding apparatus according to Embodiment 7 of the present invention.

FIG. 24 is a block diagram showing a structure of a coding apparatus according to Embodiment 7 of the present invention. In FIG. 24, the same structural elements as those in FIG. 18 are assigned with the same reference signs, and the same descriptions thereof are not repeated.

A coding apparatus 700 as shown in FIG. 24 includes a filter coefficient generation unit 501, a filter coefficient transfer control unit 502, a filter coefficient storage unit 503, a reference image transfer control unit 505, a reference image storage unit 506, a motion estimation unit 507, a subtractor 508, a memory 509, a coding unit 510, a reversible coding unit 701, and a reversible decoding unit 702. Unlike the coding apparatus 500 according to Embodiment 5, the coding apparatus 700 as shown in FIG. 24 includes the reversible coding unit 701 and the reversible decoding unit 702, and does not include the management table for storage states of filter coefficients 504.

The reversible coding unit 701 reversibly codes the motion compensation filter coefficients included in the coded stream. More specifically, the reversible coding unit 701 has a function of reversibly coding the motion compensation filter coefficients generated by the filter coefficient generation unit 501, and writing the reversibly-coded motion compensation filter coefficients to the memory 509.

The reversible decoding unit 702 reversibly decodes at least one motion compensation filter coefficient required for the decoding from among the motion compensation filter coefficients reversibly coded by the reversible coding unit 701, and writes the reversibly decoded motion compensation filter coefficient to the filter coefficient storage unit 503 via the filter coefficient transfer control unit 502. More specifically, the reversible decoding unit 702 has a function of reading out the motion compensation filter coefficients stored in the memory 509, reversibly decoding the read-out motion compensation filter coefficients, and writing the reversibly-decoded motion compensation filter coefficients to the filter coefficient storage unit 503 via the filter coefficient transfer control unit 502. It is to be noted that, the reversible decoding unit 702 may write the at least one motion compensation filter coefficient to the filter coefficient storage unit 503 without the control by the filter coefficient transfer control unit 502.

Figure 25:
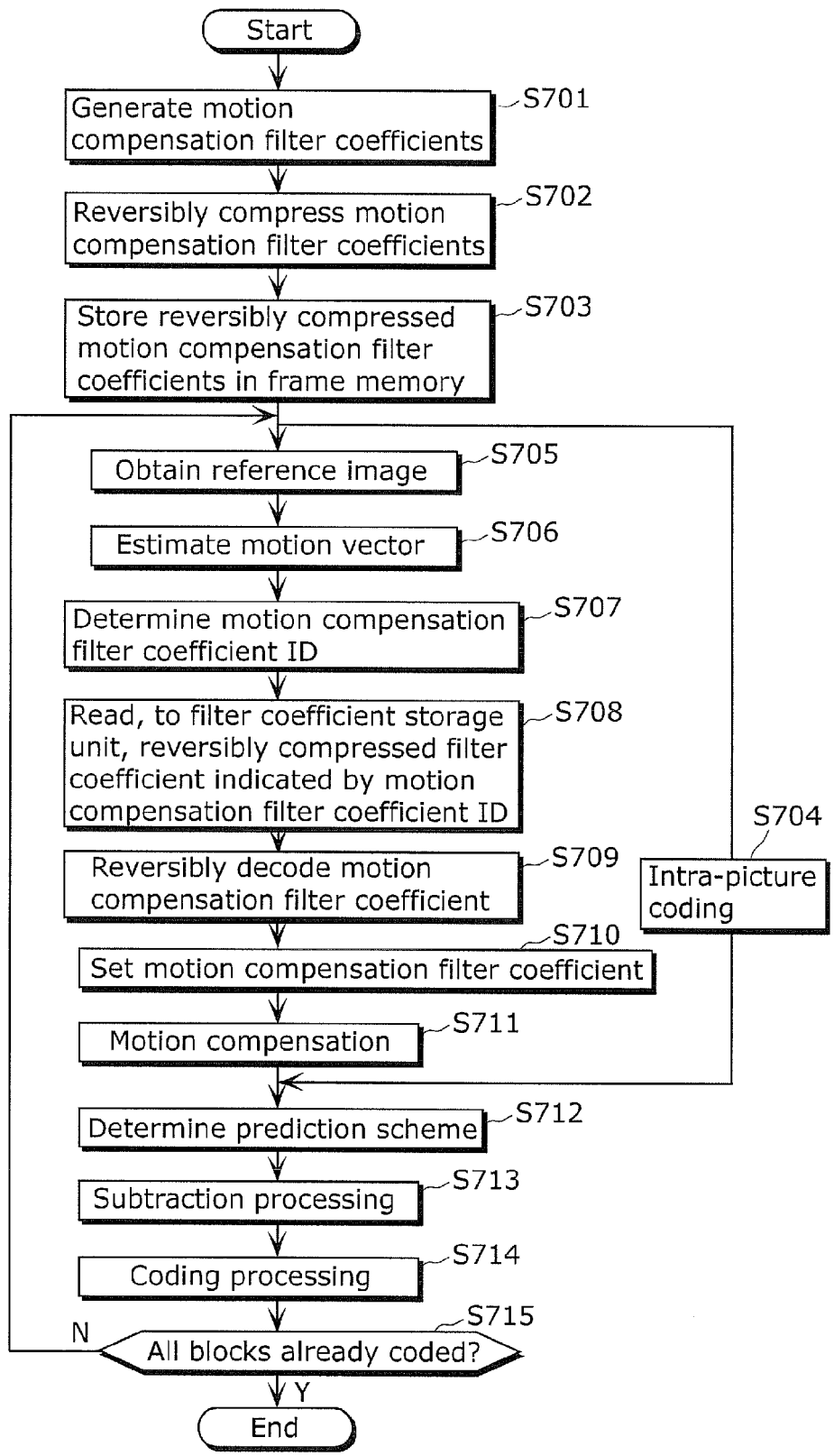
FIG. 25 is a flowchart of coding operations performed by the coding apparatus according to Embodiment 7 of the present invention.

Next, a description is given of coding operations performed by the coding apparatus 700 configured as mentioned above. FIG. 25 is a flowchart of the decoding operations performed by the decoding apparatus according to Embodiment 7 of the present invention.

As shown in FIG. 25, first in the coding apparatus 700, the filter coefficient generation unit 501 receives a current image to be coded, and generates and outputs the at least one motion compensation filter coefficient for use in the following coding (S701).

Next, the reversible coding unit 701 reversibly codes the motion compensation filter coefficient generated by the filter coefficient generation unit 501 (S702).

Next, the filter coefficient transfer control unit 502 writes, to the memory 509, the motion compensation filter coefficient reversibly coded, in S702, by the reversible coding unit 701 (S703).

Next, the coding apparatus 700 performs, on the current image (blocks) to be coded both of intra-picture prediction in S704 and inter-picture prediction in S705 to S711. As for the intra-picture prediction, a conventional scheme is applicable as in S503, and thus no description thereof is given here. The following describes how the inter-picture prediction in S705 to S711 is performed. Here, the processes of S705 to S707 are the same as the processes of S504 to S506, and thus the same descriptions thereof are not repeated.

Next, the filter coefficient transfer control unit 502 reads out, in S707, the reversibly-coded motion compensation filter coefficient indicated by the motion compensation filter coefficient ID from the memory 509 (S708). Next, the reversible decoding unit 702 reversibly decodes the reversibly-coded motion compensation filter coefficient, and writes the reversibly-decoded motion compensation filter coefficient to the filter coefficient storage unit 503 (S709).

Next, the motion estimation unit 507 reads out the motion compensation filter coefficient for use in the motion compensation from the filter coefficient storage unit 503, based on the identified motion compensation filter coefficient ID and the determined motion vector, and sets the motion compensation filter coefficient (S710). Next, the motion estimation unit 507 reads out the reference image held in the reference image storage unit 506, performs motion compensation on the reference image to generate a prediction image (S711), and outputs the generated prediction image to the subtractor 508.

In this way, the coding apparatus 700 performs intra-picture prediction of the current image (blocks) to be coded in S704, and performs inter-picture prediction thereof in S705 to S711. Next, the coding unit 510 determines, based on the performed intra-picture prediction and inter-picture prediction, which one of the coding modes provides a higher coding efficiency from among the coding efficiency in the case of performing the inter-picture coding and the coding efficiency in the case of performing the intra-picture coding. The coding unit 510 determines the coding mode determined as providing the higher coding efficiency as the coding mode (macroblock type) of the current image (blocks) to be coded.

Here, the processes of S713 to S715 are the same as the processes of S513 to S515, and thus the same descriptions thereof are not repeated.

As described above, the coding apparatus 700 performs the coding operations.

As described above, according to Embodiment 7, the reversible coding unit 701 compresses the motion compensation filter coefficient, and thus it is possible to reduce the data size of the motion compensation filter coefficients to be stored in the memory 509. In this way, it is possible to reduce the memory capacity related to the motion compensation filter coefficient.

It is to be noted that the decoding apparatus 700 as shown in FIG. 23 may include at least the aforementioned management table for storage states of filter coefficients 504, and may additionally include the management table for reference history of filter coefficients 601. The latter option is preferable because it is possible to reduce the memory bandwidth and the memory access latency as described earlier, in addition to reduction in the memory capacity related to the motion compensation filter coefficients.

In addition, in the above, the decoding unit 101 decodes the motion compensation filter coefficients once, the reversible coding unit 401 re-codes the motion compensation filter coefficients and then stores these coefficients to the memory 109, and the reversible decoding unit 402 decodes these coefficients. However, this case is an example. For example, the coding unit 510 may store, in the memory 509, the motion compensation filter coefficient part coded into the coded stream, and the reversible decoding unit 702 may decode the motion compensation filter coefficient part.

In addition, the coding algorithm for use in the reversible coding unit 701 may be any coding scheme as long as the coding scheme makes the output size of the motion compensation filter coefficients smaller than the input size thereof.

In addition, although the above description is given of a case where the motion compensation filter coefficient ID is header information different from a motion vector, the motion compensation filter coefficient ID is not limited thereto. For example, the motion vector may be the motion compensation filter coefficient ID. Alternatively, not only the header information different from the motion vector but also the motion vector may be the motion compensation filter coefficient ID.

According to the present invention, it is possible to implement an image decoding apparatus, image coding apparatus, image decoding circuit, and image decoding method for enabling reduction in the memory bandwidth and reduction in the memory access latency for filter coefficients used to perform inter-picture prediction with motion compensation using variable coefficients.

In Embodiment 1 to 7, each of the memory 109, the memory 509, the filter coefficient storage unit 103, and the filter coefficient storage unit 503 is typically configured in the form of a DDR. However, it is to be noted that each element need not to be always configured in the form of the DDR, and may be configured in the form of an SRAM or a flip-flop. In short, any recordable devices are possible. Preferably, each of the memory 109 and the memory 509 be configured using a low-speed storage device, and each of the filter coefficient storage unit 103 and the filter coefficient storage unit 503 be configured using a high-speed storage device.

Embodiment 8

The moving image coding apparatus, moving image decoding apparatus, moving image coding method and/or moving image decoding method as described in the above embodiments are applicable as applications.

For example, the processing described in each of the embodiments can be simply implemented by an independent computer system, by recording, in a recording medium, a program for implementing the moving image coding method and/or the moving image decoding method as described in the above embodiments. Here, the recording medium may be any recording medium as long as the program can be recorded, such as a magnetic disk, an optical disk, a magnetic optical disk, an IC card, and a semiconductor memory.

Hereinafter, applications to the moving picture coding methods and moving picture decoding methods described in the embodiments and systems using the same will be described.

Figure 26:
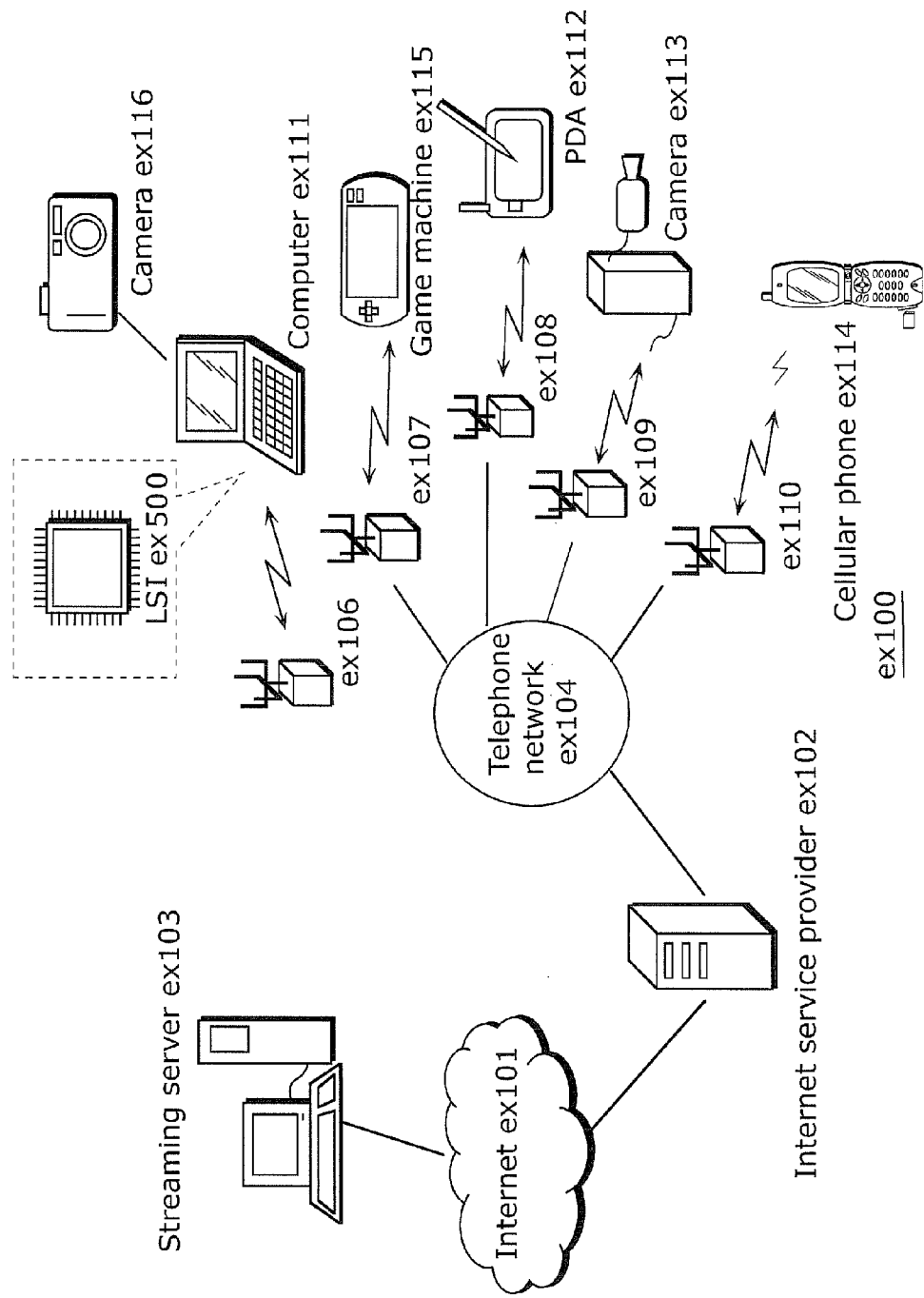
FIG. 26 is a diagram showing an overall configuration of a content providing system for achieving content distribution services.

FIG. 26 is a diagram showing an overall configuration of a content providing system ex100 for achieving content distribution services. In the content providing system ex100 as shown in FIG. 26, the area for providing communication services is divided into cells having a desired size, and each of base stations ex107 to ex110 which are fixed wireless stations is placed in a corresponding one of the cells.

In the content providing system ex100, devices such as a computer ex111, a personal digital assistant (PDA) ex112, a camera ex113, a cellular phone ex114, and a game machine ex115 are connected to the Internet ex101 via a telephone network ex104 as well as the base stations ex107 to ex110.

Here, the configuration of the content providing system ex100 is not limited to the configuration shown in FIG. 26, and a combination in which any of the elements are combined is acceptable. In addition, each of the devices in the content providing system ex100 may be directly connected to the telephone network ex104, rather than via the base stations ex107 to ex110 which are the fixed wireless stations. Furthermore, the devices may be interconnected to each other via a short distance wireless communication and others.

For example, the camera ex113, such as a digital video camera, is capable of capturing moving pictures. In addition, the camera ex116, such as a digital video camera, is capable of capturing still pictures and moving pictures.

The cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others.

More specifically, in such a live distribution, a content (for example, video of a music live show) captured by the user using the camera ex113 is subjected to the coding as described in the above embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103.

Furthermore, the data of the still pictures and moving pictures captured by not only the camera ex113 but also the camera ex116 may be transmitted to the streaming server ex103 through the computer ex111. The coding processes may be performed by the camera ex116, the computer ex111, or the streaming server ex103, or shared among them.

These coding and decoding processes are performed by an LSI ex500 generally included in each of the computer ex111 and each of the devices. Here, the LSI ex500 may be configured of a single chip or plural chips. It is to be noted that software for coding and decoding moving pictures may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may divide data into data portions, and process, record, and distribute the data portions.

As described above, the clients can receive and reproduce the coded data in the content providing system ex100.

In other words, the clients can receive and decode information transmitted by the user, and reproduce the decoded data in real time in the content providing system ex100, so that the user who does not have any particular right and equipment can implement personal broadcasting.

Figure 27:
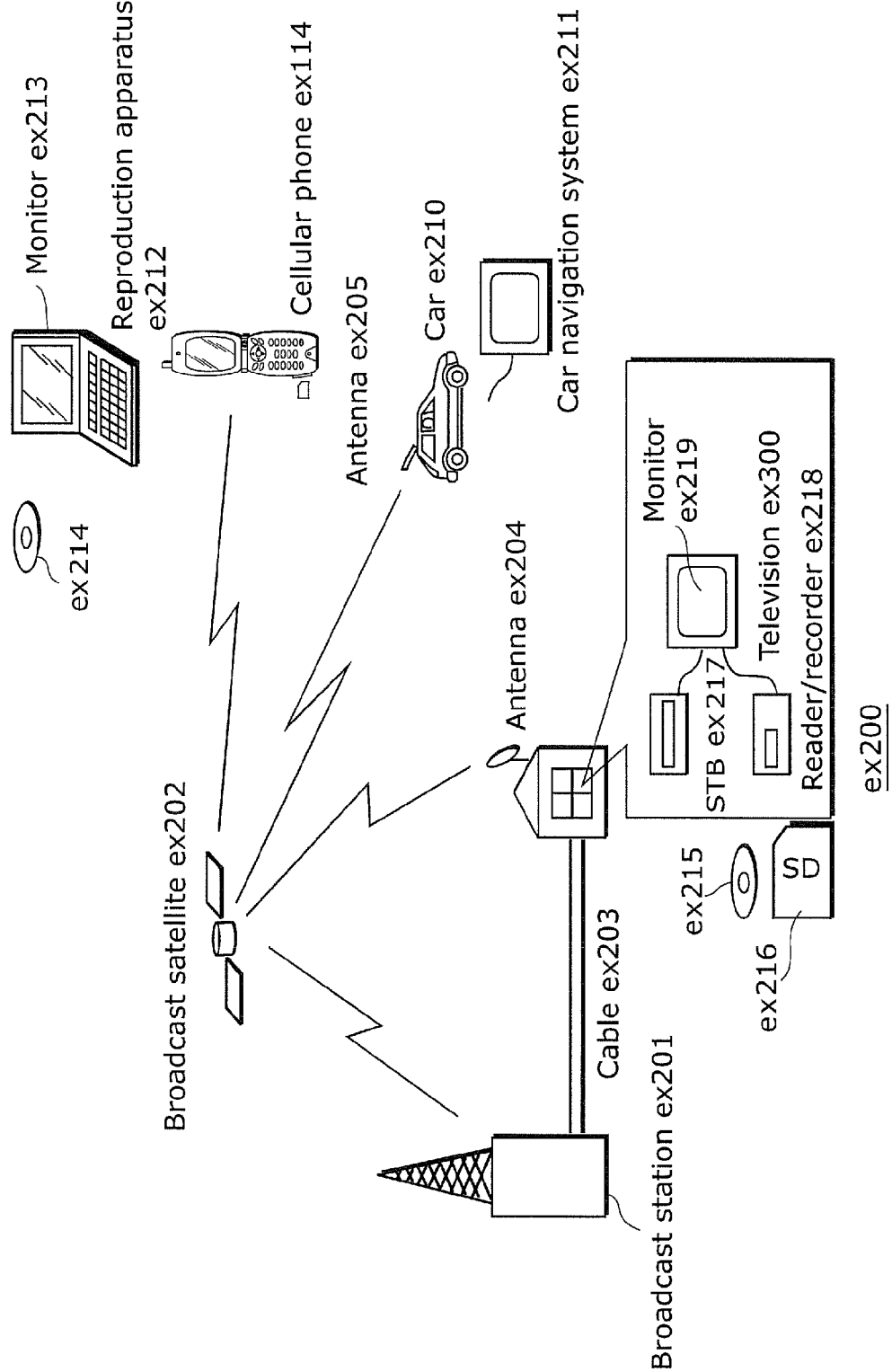
FIG. 27 is a diagram showing an overall configuration of a digital broadcasting system.

It is to be noted that the present invention is not limited to the example where at least one of the moving picture coding apparatuses and one of the moving picture decoding apparatuses in the respective embodiments are incorporated into the content providing system ex100. As shown in FIG. 27, one of the moving picture coding apparatuses and one of the moving picture decoding apparatuses may be incorporated into a digital broadcasting system ex200. The following descriptions are given taking an example of the digital broadcasting system ex200. FIG. 27 is a diagram showing an overall configuration of the digital broadcasting system ex200.

More specifically, a broadcast station ex201 communicates or transmits a bitstream of video information via radio waves to a broadcast satellite ex202. The bitstream is a coded bitstream obtained by the moving picture coding method according to each of the embodiments.

Upon receipt of the bitstream, the broadcast satellite ex202 generates radio waves for broadcasting.

The antenna ex204 is a home-use antenna having a function of receiving satellite broadcasts and receives the radio waves for broadcasting from the broadcast satellite ex202.

A device that is a television (receiver) ex300, a set top box (STB) ex217, or the like decodes and reproduces a bit stream included in the radio waves for broadcasting received from the antenna ex204.

A reader/recorder ex218 is capable of reading and decoding a coded bit stream recorded on a recording medium ex215 such as a DVD and a BD. In addition, the reader/recorder ex218 is capable of coding and writing a video signal onto the recording medium ex215. Here, the reader/recorder ex218 mounts one of the moving image decoding apparatus and/or one of the moving image coding apparatus as described in the embodiments. Here, the reproduced video signals reproduced by the reader/recorder ex218 are displayed on a monitor ex219, and can be reproduced by another device or system, using the recording medium ex215 on which the coded bit stream is recorded.

It is to be noted that the set top box ex217 may be connected to one of the cable ex203 for cable television and the antenna ex204 for satellite/terrestrial wave broadcasting, may mount the moving image decoding apparatus inside the device itself, and may display the video signals on the monitor ex219. In addition, the moving picture decoding apparatus may be incorporated not in the set top box ex217 but in the television ex300.

Figure 28:
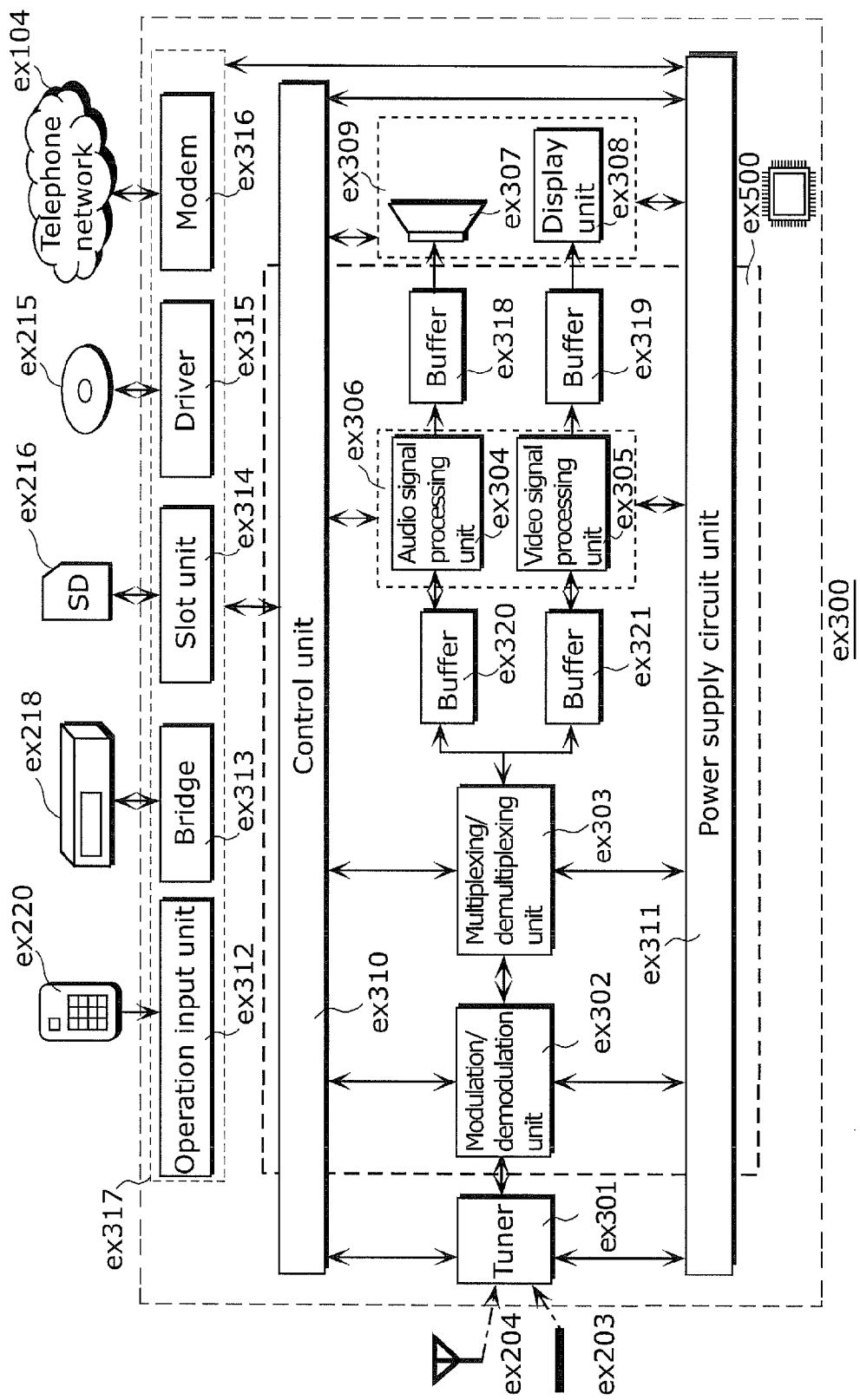
FIG. 28 is a block diagram showing an example of a structure of a television (receiver).

FIG. 28 is a block diagram showing an example of a structure of a television ex300.

The television ex300 uses one of the moving image decoding method and one of the moving image coding method as described in the embodiments. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that integrally controls all the constituent elements of the television ex300, and a power supply circuit unit ex311 that supplies power to each of the elements.

It is to be noted that the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a description is given of a configuration in which the television ex300 decodes data obtained from outside through the antenna ex204 and others and reproduces the decoded data.

In the television ex300, upon receipt of a user operation from a remote controller ex220 or the like, the multiplexing/demultiplexing unit ex303 demultiplexes the video data and audio data demodulated by the modulation/demodulation unit ex302, under control of the control unit ex310 including a CPU. Furthermore, in the television ex300, the audio signal processing unit ex304 decodes the demultiplexed audio data and the video signal processing unit ex305 decodes the demultiplexed video data, using the decoding method described in each of the embodiments. The output unit ex309 outputs each of the decoded video signal and audio signal. When the output unit ex309 outputs the video signal and the audio signal, the signals may be temporarily stored in buffers ex318 and ex319, or the like so that the signals are reproduced in synchronization with each other.

It is to be noted that the television ex300 may read a coded bitstream not through a broadcast or the like but from the recording media ex215 and ex216, such as a magnetic disk, an optical disk, and a SD card.

Next, a description is given of a configuration in which the television ex300 codes an audio signal and a video signal, and transmits the data outside or writes the data on a recording medium. In the television ex300, upon receipt of a user operation from the remote controller ex220 or the like, the audio signal processing unit ex304 codes an audio signal, and the video signal processing unit ex305 codes a video signal using the coding method corresponding to the moving picture coding method as described in each of the embodiments, under control of the control unit ex310. The multiplexing/demultiplexing unit ex303 multiplexes the coded video signal and audio signal, and outputs the resulting signal outside. When the multiplexing/demultiplexing unit ex303 multiplexes the video signal and the audio signal, the signals may be temporarily stored in buffers ex320 and ex321, or the like so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include an element for receiving an AV input from a microphone or a camera in addition to the element for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 29:
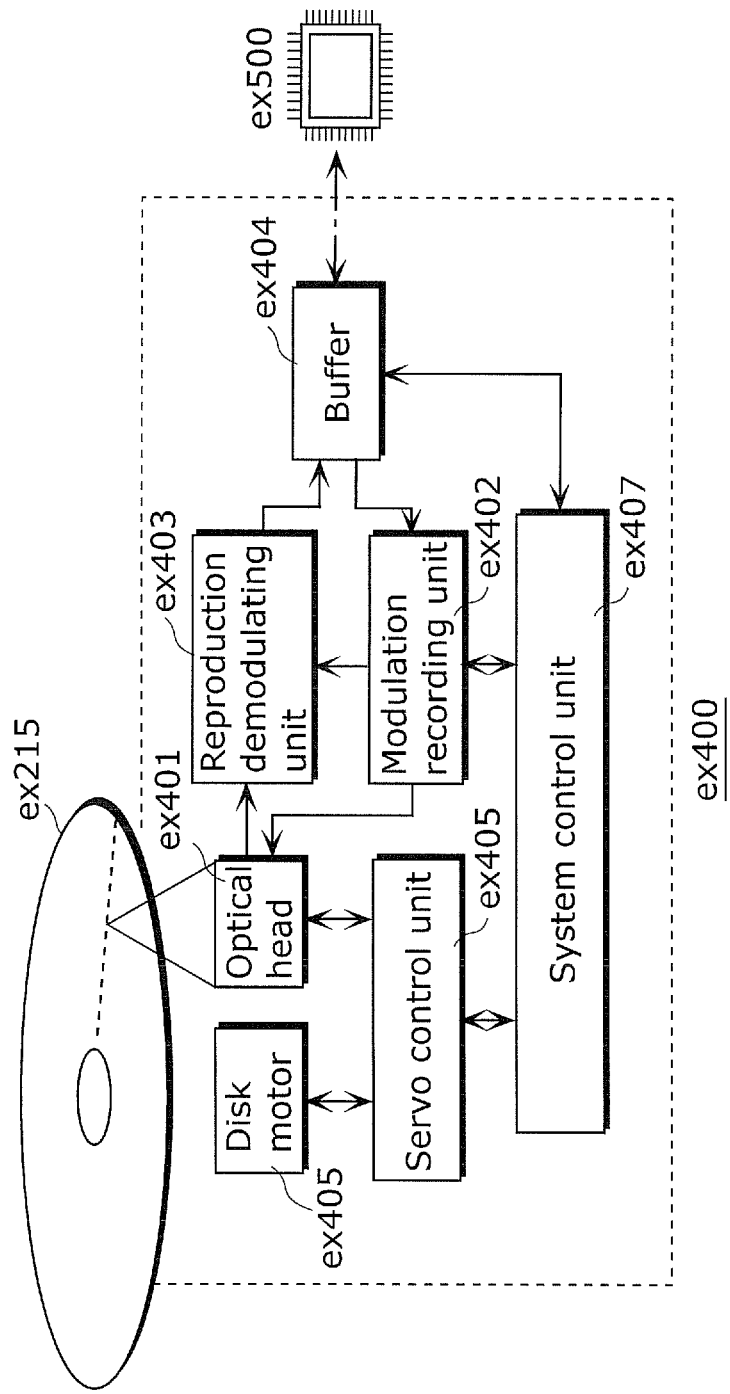
FIG. 29 is a block diagram showing an example of a structure of an information reproducing and recording unit that reads and writes information from and on a recording medium that is an optical disk.

As an example, FIG. 29 illustrates a configuration of an information reproducing/recording unit ex400 when data is read or written from or in an optical disk. FIG. 29 is a block diagram showing an example of a structure of an information reproducing and recording unit that reads and writes information from and on a recording medium that is an optical disk. The information reproducing/recording unit ex400 as shown in FIG. 29 includes constituent elements ex401 to ex407 to be described hereinafter.

The optical head ex401 irradiates a laser spot on a recording surface of the recording medium ex215 that is an optical disk to write information, and detects reflected light from the recording surface of the recording medium ex215 to read the information.

The modulation recording unit ex402 electrically drives a semiconductor laser included in the optical head ex401, and modulates the laser light according to recorded data.

The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information.

The buffer ex404 temporarily holds the information to be recorded on the recording medium ex215 and the information reproduced from the recording medium ex215.

A disk motor ex405 rotates the recording medium ex215.

A servo control unit ex406 moves the optical head ex401 to a predetermined information track while controlling the rotation drive of the disk motor ex405 so as to follow the laser spot.

The system control unit ex407 controls overall the information reproducing/recording unit ex400. The system control unit ex407 implements the reading and writing processes by (i) generating and adding new information as necessary, based on various information stored in the buffer ex404, and (ii) recording and reproducing information through the optical head ex401 while causing the modulation recording unit ex402, the reproduction demodulating unit ex403, and the servo control unit ex406 to operate in a coordinated manner. The system control unit ex407 includes, for example, a microprocessor, and executes processing by causing a computer to execute a program for read and write.

The optical head ex401 irradiates a laser spot in the above description. However, it is to be noted that the optical head ex401 may perform high-density recording using near field light.

Figure 30:
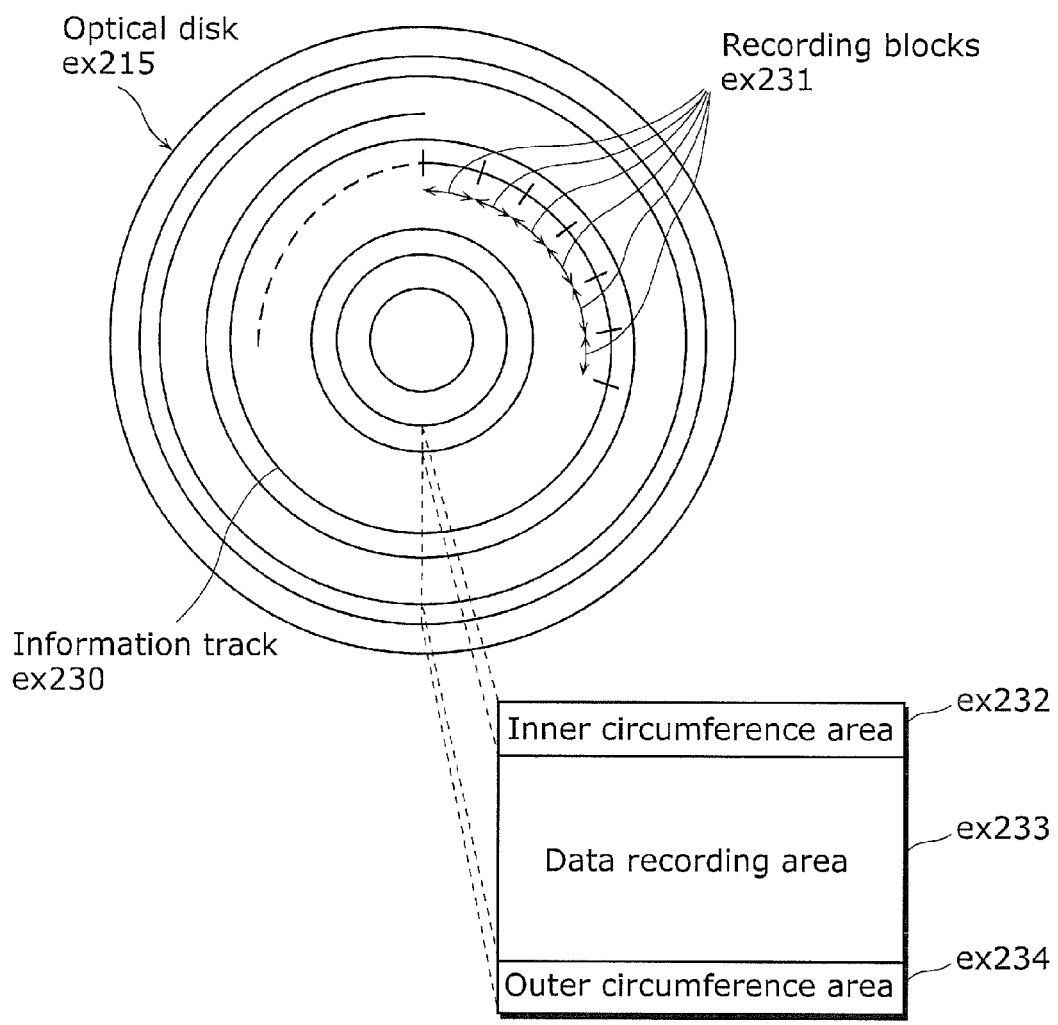
FIG. 30 shows an example of a structure of a recording medium that is an optical disk.

FIG. 30 shows an example of a structure of a recording medium that is an optical disk. FIG. 30 shows a schematic view of the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit of recording data. A device that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data.

The information reproducing/recording unit 400 reads and writes coded audio data, coded video data, or coded data obtained by multiplexing the coded audio data and the coded video data, from and on the data recording area ex233 of the recording medium ex215.

Although an optical disk having a single layer, such as a DVD and a BD is described as an example in the description, it is to be noted that the optical disk is not limited thereto, and may be an optical disk having a multilayer structure and capable of recording on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device that is, for example, the car navigation system ex211 set in the car ex210, in a digital broadcasting system ex200. Here, a configuration of the car navigation system ex211 will be a configuration, for example, including a GPS receiving unit from the configuration illustrated in FIG. 28. The same will be true for the configuration of the computer ex111, the cellular phone ex114, and others. Furthermore, similarly to the television ex300, a terminal such as the cellular phone ex114 may have three types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the moving picture coding method and moving picture decoding method in each of the embodiments can be used in any of the apparatuses, devices and systems described. Thus, the advantageous effects described in the embodiments can be obtained.

Furthermore, the present invention is not limited to the above-described embodiments, and various modifications and revisions are possible without departing from the scope of the present invention.

Embodiment 9

Figure 31:
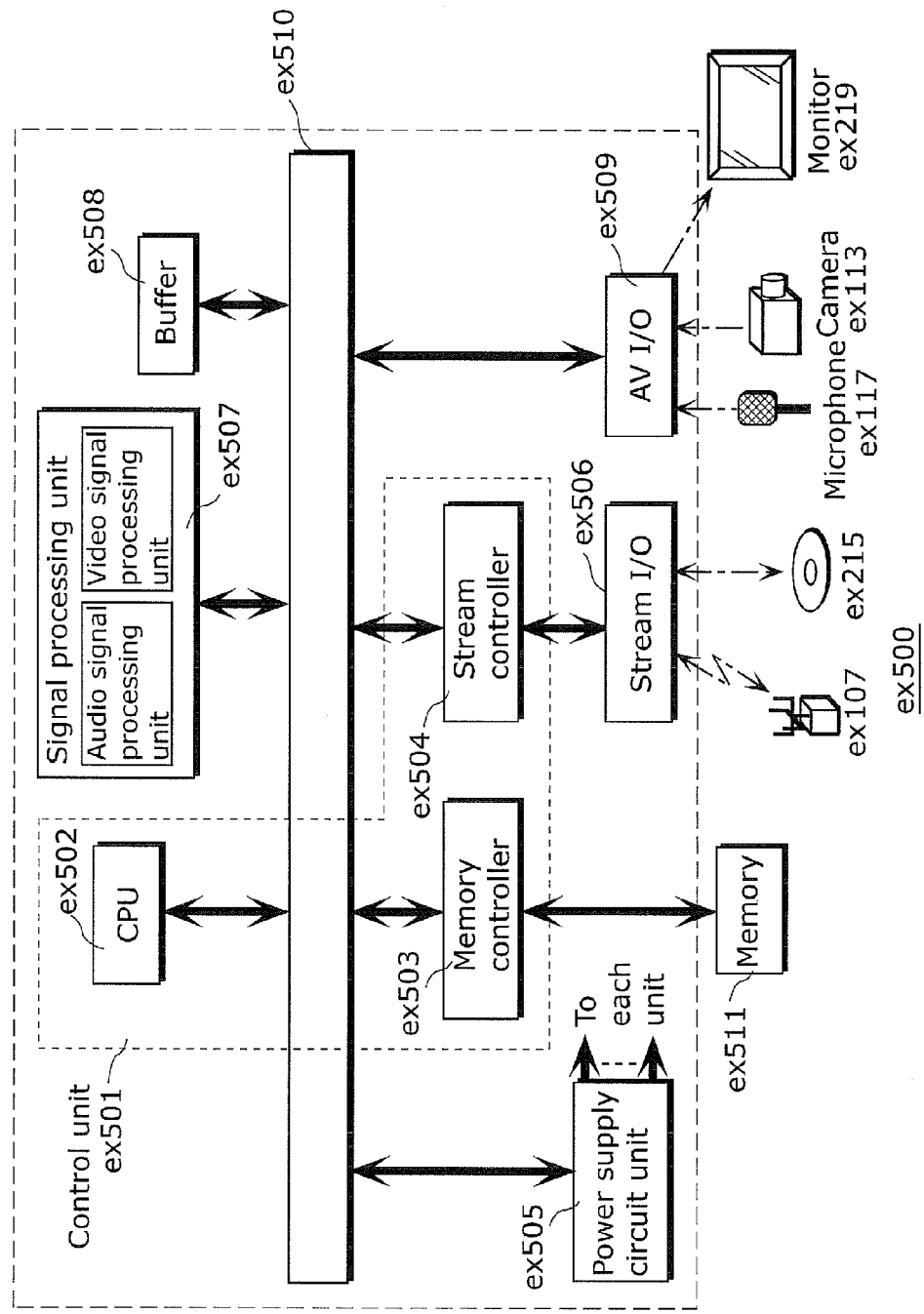
FIG. 31 is a block diagram showing an example of a structure of an integrated circuit for performing the image coding method and the image decoding method according to each of the embodiments of the present invention.

Each of the moving picture coding method and apparatus and moving picture decoding method and apparatus as shown in the embodiments is typically implemented as an LSI. As an example, FIG. 31 shows a structure of a single-chip LSI ex500. Here, FIG. 31 is a block diagram showing an example of a structure of an integrated circuit for performing the image coding method and the image decoding method according to each of the embodiments.

The LSI ex500 includes elements ex502 to ex509 to be described below, and the elements are connected to each other through a bus ex510. The power supply circuit unit ex505 is activated by supplying each of the elements with power when power is on.

For example, when coding is performed, the LSI ex500 receives an input of an AV signal from a microphone ex117, a camera ex113, and others through an AV I/O ex509, under control of the control unit ex501 including the CPU ex502, the memory controller ex503, the stream controller ex504. The received AV signal is temporarily stored in a memory ex511 such as an SDRAM outside the LSI ex500. The stored data is divided into data portions according to the processing amount and speed as necessary. Then, the data portions are transmitted to a signal processing unit ex507, under control of the control unit ex501. The signal processing unit ex507 codes an audio signal and/or a video signal. Here, the coding of the video signal is the coding as described in the above embodiments. Furthermore, depending on cases, the signal processing unit ex507 multiplexes the coded audio data and the coded video data, and a stream I/O ex504 provides the multiplexed data outside. The provided bit stream is transmitted to a base station ex107, or written into a recording medium ex215. Here, it is good to save the data into the buffer ex508 for synchronization at the time of multiplexing the data.

Figure 32:
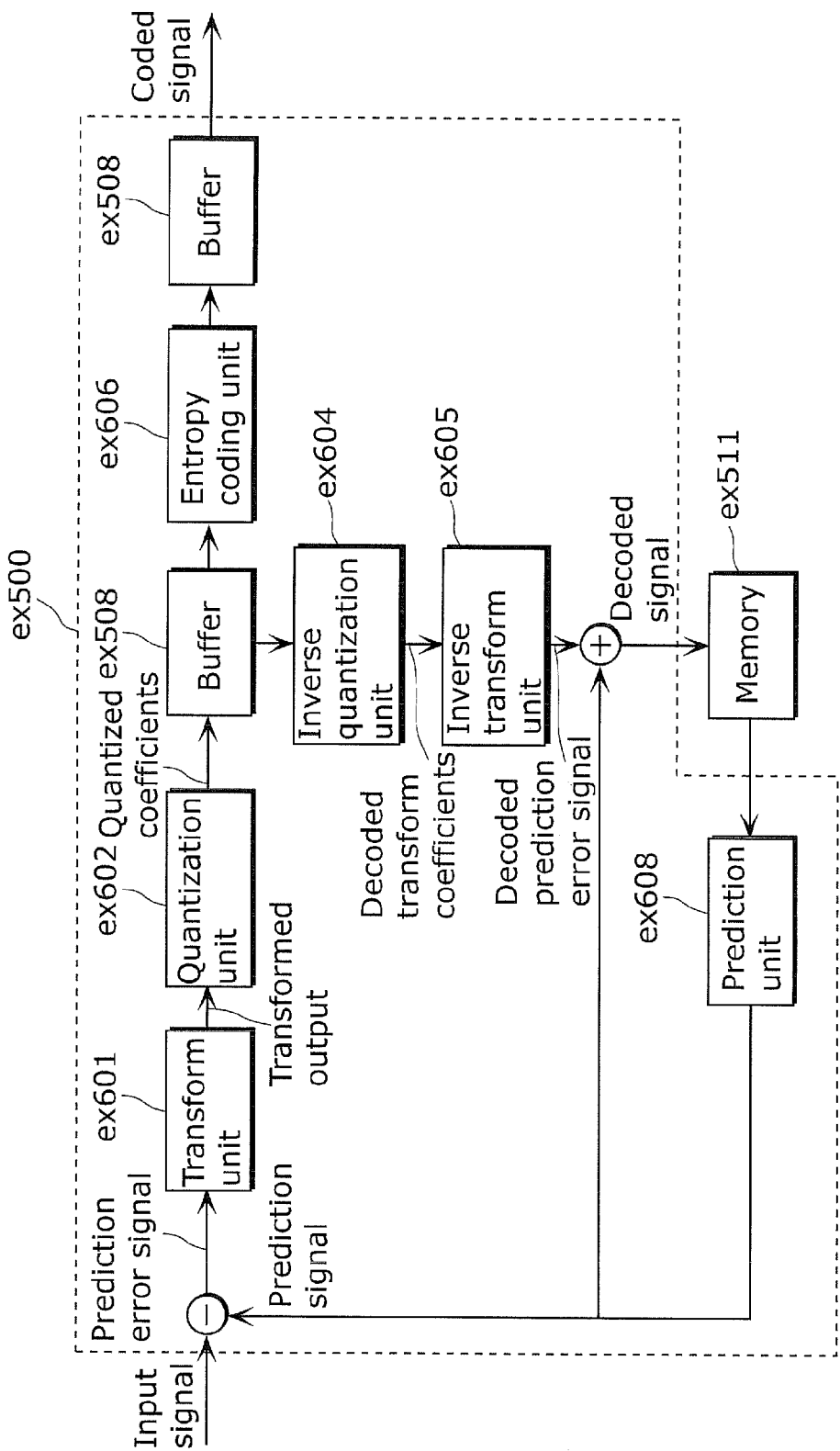
FIG. 32 is a block diagram showing the moving image coding according to each of the embodiments and performed by the integrated circuit.

FIG. 32 is a block diagram for simply explaining the coding performed here. In other words, FIG. 32 is a block diagram showing the moving image coding according to each of the embodiments and performed by the integrated circuit. As shown in FIG. 32, the prediction error signal that is a difference between an input signal and a prediction signal is transformed by the transform unit ex601, and then is quantized by the quantization unit ex602. The quantized coefficients are entropy coded by the entropy coding unit ex606 to generate a coded signal, and the coded signal is output. As described above taking an example of the television ex300 with reference to FIG. 28, this output may be saved in the buffer ex508 or a memory ex511 in order to be multiplexed with the coded audio data. The inverse quantization unit ex604, the inverse transform unit ex605, and the prediction unit ex608 function as a delay unit which enables comparison between a current signal and a prediction signal generated from the signal preceding the current signal.

It is good to perform adjustment for preventing an overflow and/or an underflow on the LSI ex500. Examples of such adjustment include saving quantized coefficients into a buffer, for example, the buffer ex508 or the memory ex511 provided inside the LSI ex500. Other than the above adjustment for the quantized coefficients, it is good to divide the data into data portions and process the data portions in parallel according to the processing amount and processing speed, and to adjust the processing while saving, as necessary, the data that is currently being processed in a recording unit such as an internal memory or an external storage.

The above-described processing is performed under control of the control unit ex501.

For example, in the case of decoding, the LSI ex500 saves, in the memory ex511 etc., the coded data obtained from the base station ex107 through the stream I/O ex506 or read out from the recording medium ex215, under control of the control unit ex501. Under control of the control unit ex501, the stored data is divided into data portions according to the processing amount and processing speed as necessary, is transmitted to the signal processing unit ex507, and then is decoded by the signal processing unit ex507 into audio data and/or video data. Here, the decoding of the video signal is the decoding as described in the above embodiments. Furthermore, depending on cases, it is good to save, in the buffer ex508, both the decoded audio signal and the decoded video signal so that these signals can be reproduced in synchronization with each other. The decoded output signals are provided from an output unit that is the cellular phone ex114, the game machine ex115, the television ex300, or the like, through the memory ex511 etc. as necessary.

Figure 33:
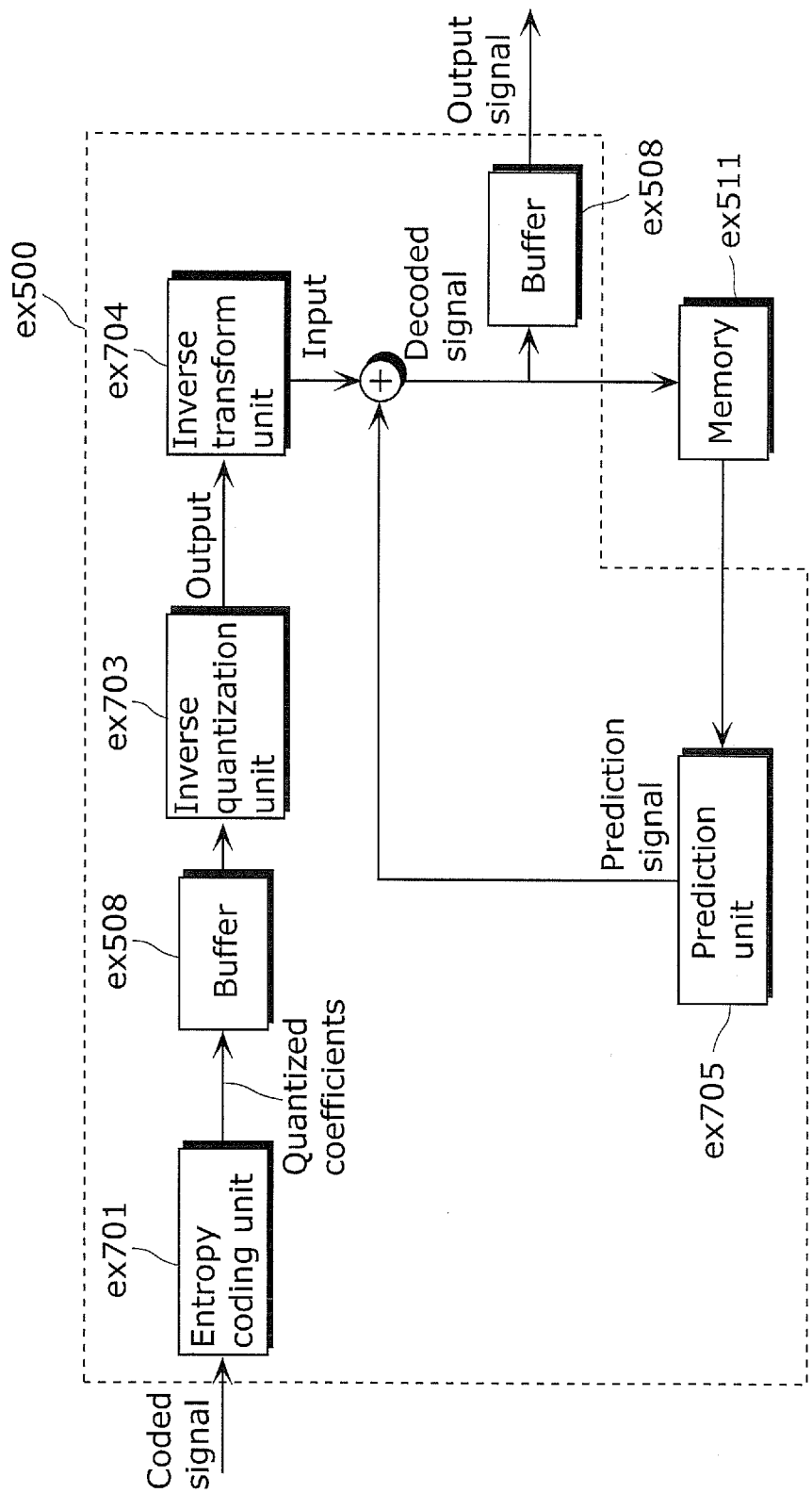
FIG. 33 is a block diagram showing the moving image decoding according to each of the embodiments and performed by the integrated circuit.

FIG. 33 is a block diagram for simply explaining the decoding performed here. FIG. 33 is a block diagram showing the moving image decoding according to each of the embodiments and performed by the integrated circuit.

As shown in FIG. 33, the input coded signal is entropy-decoded by the entropy decoding unit ex701. The quantized coefficients obtained through the entropy decoding are inversely quantized by the inverse quantization unit ex703, and then inversely transformed by the inverse transform unit ex704. The inverse transform here means transform in decoding, and is not always limited to the inverse of the transform in the coding. To the output, a prediction signal is added. Then, the output including the prediction signal is output as a decoded signal to outside. The memory ex511 stores decoded signals, and functions as a delay unit which enables reference in the decoding of the succeeding coded signals. The prediction unit ex705 generates a prediction signal based on the decoded signal stored in the memory ex511. As the description of output to outside given above taking an example of the television ex300 with reference to FIG. 28, the decoded signals may be saved in the buffer ex508 or in the external memory ex511 so that the output decoded signal can be displayed in synchronization with the decoded audio signals. It is good to divide the quantized coefficients into predetermined units of processing, and processes the units of quantized coefficients in parallel, so as to prevent an overflow and/or underflow in the processing. In this case, for example, the quantized coefficients may be stored in the buffer ex508 or the memory ex511. The above-described processing is performed under control of the control unit ex501.

Although the above memory ex511 is described as a device outside the LSI ex500, the memory ex511 may be configured inside the LSI ex500. The number of buffers ex508 is not limited to one, and a plurality of buffers may be provided. All of the elements of LSI ex500 may be integrated into a single chip or each of the elements may be configured as a chip.

The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

As described above, the moving image coding apparatus, the moving image decoding apparatus, the moving image coding method and/or the moving image decoding method as described in the above embodiments are applicable as applications.

It is to be noted that each of the functional blocks making up the decoding apparatus 100 as shown in FIG. 1 in Embodiment 1 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 200 as shown in FIG. 6 in Embodiment 2 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 300 as shown in FIG. 9 in Embodiment 3 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 400 as shown in FIG. 16 in Embodiment 4 is typically implemented in the form of an LSI that is an integrated circuit. Each of the functional blocks may be implemented as a separate chip such as a decoding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 500 as shown in FIG. 18 in Embodiment 5 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 600 as shown in FIG. 22 in Embodiment 6 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

Likewise, each of the functional blocks making up the decoding apparatus 700 as shown in FIG. 24 in Embodiment 7 is typically implemented in the form of an LSI that is an integrated circuit. Each of the functional blocks may be implemented as a separate chip such as a coding circuit and an external memory. Alternatively, at least one or all of the functional blocks may be integrated into a single chip. In other words, these functional blocks may be implemented as an integrated system on a single LSI.

In addition, although reference images and filter coefficients for motion compensation are stored in the memory 109 or the memory 509 in Embodiments 1 to 7, the reference images and filter coefficients for motion compensation may not be always stored in the same memory.

As described above, in Embodiments 1 to 7, each of the memory 109 and the memory 509 is typically implemented in the form of a DDR. However, each memory is not necessarily implemented in the form of a DDR, and may be implemented in the form of an SRAM or a flip-flop. In short, any recordable devices are possible.

Up to this point, the moving image decoding apparatus, the moving image coding apparatus, the moving image decoding circuit, and the moving image decoding method according to the present invention have been described based on the embodiments. However, the present invention is not limited to these embodiments. Those skilled in the art will readily appreciate that many modifications are possible in the exemplary embodiments, and also other embodiments are obtainable by arbitrarily combining the structural elements in the embodiments without materially departing from the scope of the present invention. Accordingly, all such modifications and other embodiments are intended to be included within the scope of the present invention.

INDUSTRIAL APPLICABILITY

The present invention is applicable to a moving image decoding apparatus, a moving image coding apparatus, a moving image decoding circuit, and a moving image decoding method. The present invention is particularly useful in apparatuses which decode and/or display pictures that make up a video. Examples of such apparatuses include a cellular telephone, a DVD device, a BD device, a personal computer, a television telephone, a set top box, a digital television receiver, an automobile, a security system.

REFERENCE SIGNS LIST

101 Decoding unit
102, 502 Filter coefficient transfer control unit
103, 503 Filter coefficient storage unit
104, 504 Filter coefficient storage status management table
105, 505 Reference image transfer control unit
106, 506 Reference image storage unit
107 Motion compensation unit
108 Adder
109, 509 Memory
201, 601 Filter coefficient Reference history management table
301 Pre-decoding unit
302 Filter coefficient statistical information management table
401, 701 Reversible coding unit
402, 702 Reversible decoding unit
501 Filter coefficient generation unit
507 Motion estimation unit
508 Subtractor
510 Coding unit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113 Camera
ex114 Cellular telephone
ex115 Game machine
ex116 Camera
ex117 Microphone
ex200 Digital broadcasting system
ex201 Broadcast station
ex202 Broadcast satellite
ex203 Cable
ex204, ex205 Antenna
ex210 Car
ex211 Car navigation system
ex212 Reproduction apparatus
ex213 Monitor
ex215, ex216 Recording medium
ex217 Set top box
ex218 Reader/recorder
ex219 Monitor
ex230 Information track
ex231 Recording blocks
ex232 Inner circumference area
ex233 Data recording area
ex234 Outer circumference area
ex300 Television (receiver)
ex301 Tuner
ex302 Modulation/demodulation unit
ex303 Multiplexing/demultiplexing unit
ex304 Audio signal processing unit
ex305 Video signal processing unit
ex306 Signal processing unit
ex307 Speaker
ex308 Display unit
ex309 Output unit
ex310 Control unit
ex311 Power supply circuit unit
ex312 Operation input unit
ex313 Bridge
ex314 Slot unit
ex315 Driver
ex316 Modem 1
ex317 Interface unit
ex318, ex319 Buffer
ex400 Information reproducing/recording unit
ex401 Optical head
ex402 Modulation and recording unit
ex403 Reproduction and demodulation unit
ex404 Buffer
ex405 Disk motor
ex406 Servo control unit
ex407 System control unit
ex500 LSI
ex501 Control unit
ex502 CPU
ex503 Memory controller
ex504 Stream controller
ex505 Power circuit unit
ex506 Stream I/O
ex507 Signal processing unit
ex508 Buffer
ex509 AV I/O
ex510 Bus
ex511 Memory
ex601 Transform unit
ex602 Quantization unit
ex604 Inverse quantization unit
ex605 Inverse transform unit
ex606 Entropy coding unit
ex608 Prediction unit
ex701 Entropy decoding unit
ex703 Inverse quantization unit
ex704 Inverse Transform unit
ex705 Prediction unit

The invention claimed is:

1. A moving image decoding apparatus which performs motion-compensation decoding involving motion compensation of a stream of motion-compensation coded moving images, said moving image decoding apparatus comprising:
a decoding unit configured to decode, from the stream, identification information identifying at least one motion compensation filter coefficient among a plurality of motion compensation filter coefficients, the at least one motion compensation filter coefficient being required for the motion compensation;
a memory for holding the motion compensation filter coefficients for use in the motion compensation of the stream;
a storage unit configured to hold at least one motion compensation filter coefficient among the motion compensation filter coefficients held in said memory, the at least one motion compensation filter coefficient being required for the motion compensation;
a motion compensation unit configured to perform the motion-compensation decoding using the at least one motion compensation filter coefficient which is held in said storage unit and identified based on the identification information; and a transfer control unit configured to transfer the at least one motion compensation filter coefficient identified based on the identification information from said memory to said storage unit.

2. The moving image decoding apparatus according to claim 1,
wherein said transfer control unit is configured to transfer the at least one motion compensation filter coefficient identified based on the identification information from said memory to said storage unit, only when said storage unit does not hold the at least one motion compensation filter coefficient identified based on the identification information.

3. The moving image decoding apparatus according to claim 2,
wherein said memory previously holds the motion compensation filter coefficients for use in the motion compensation of the stream,
said moving image decoding apparatus further comprises
a storage state management unit configured to manage information indicating whether or not said storage unit holds the at least one motion compensation filter coefficient identified based on the identification information, and
said transfer control unit is configured to, only when it is found out, with reference to the information managed by said storage state management unit, that said storage unit does not hold the at least one motion compensation filter coefficient identified based on the identification information, transfer the at least one motion compensation filter coefficient from said memory to said storage unit.

4. The moving image decoding apparatus according to claim 2,
wherein said decoding unit is configured to decode, from the stream, at least the motion compensation filter coefficients for use in the motion compensation and the identification information identifying the at least one motion compensation filter coefficient that is required for the motion compensation, and
said moving image decoding apparatus further comprises:
a storage state management unit configured to manage information indicating whether or not said storage unit holds the at least one motion compensation filter coefficient identified based on the identification information; and
said transfer control unit is configured to transfer, only when it is found out, with reference to the information managed by said storage state management unit, that said storage unit does not hold the at least one motion compensation filter coefficient identified based on the identification information, the at least one motion compensation filter coefficient from said memory to said storage unit.

5. The moving image decoding apparatus according to claim 3,
wherein said transfer control unit is configured to transfer the at least one motion compensation filter coefficient identified based on the identification information from said memory to an area which is of said storage unit and holds a motion compensation filter coefficient transferred from said memory at an earliest time, only when it is found out, with reference to the information managed by said storage state management unit, that said storage unit does not hold the at least one motion compensation filter coefficient identified based on the identification information.

6. The moving image decoding apparatus according to claim 3,
wherein said transfer control unit is configured to transfer the at least one motion compensation filter coefficient identified based on the identification information from said memory to an area which is of said storage unit and holds a motion compensation filter coefficient transferred from said memory most recently, only when it is found out, with reference to the information managed by said storage state management unit, that said storage unit does not hold the at least one motion compensation filter coefficient identified based on the identification information.

7. The moving image decoding apparatus according to claim 3,
wherein, only when it is found out, with reference to the information managed by said storage state management unit, that said storage unit does not hold the at least one motion compensation filter coefficient identified based on the identification information, said transfer control unit is configured to arbitrarily select an area which is of said storage unit and holds a motion compensation filter coefficient, and transfer the at least one motion compensation filter coefficient identified based on the identification information from said memory to the selected area.

8. The moving image decoding apparatus according to claim 3, further comprising
a reference management unit configured to manage use history information indicating the number of times of reference from a start of the decoding for each of the motion compensation filter coefficients,
wherein said transfer control unit is configured to transfer the at least one motion compensation filter coefficient identified based on the identification information from said memory to said storage unit, based on the information managed by said storage state management unit and the use history information managed by said reference management unit.

9. The moving image decoding apparatus according to claim 8,
wherein said transfer control unit is configured to transfer the at least one motion compensation filter coefficient identified based on the identification information from said memory to an area which is determined, with reference to the use history information, to be of said storage unit and holds a motion compensation filter coefficient least frequently referred to, only when it is found out, with reference to the information managed by said storage state management unit, that said storage unit does not hold the at least one motion compensation filter coefficient identified based on the identification information.

10. The moving image decoding apparatus according to claim 8,
wherein said transfer control unit is configured to transfer the at least one motion compensation filter coefficient identified based on the identification information from said memory to an area which is determined, with reference to the use history information, to be of said storage unit and holds a motion compensation filter coefficient least frequently used in a predetermined period from a past time to a current time, only when it is found out, with reference to the information managed by said storage state management unit, that said storage unit does not hold the at least one motion compensation filter coefficient identified based on the identification information.

11. The moving image decoding apparatus according to claim 8,
wherein said transfer control unit is configured to transfer the at least one motion compensation filter coefficient identified based on the identification information from said memory to an area which is determined, with reference to the use history information, to be of said storage unit and holds a motion compensation filter coefficient most frequently used in a predetermined period from a past time to a current time, only when it is found out, with reference to the information managed by said storage state management unit, that said storage unit does not hold the at least one motion compensation filter coefficient identified based on the identification information.

12. The moving image decoding apparatus according to claim 8,
wherein said transfer control unit is configured to transfer the at least one motion compensation filter coefficient identified based on the identification information from said memory to an area which is determined, with reference to the use history information, to be of said storage unit and holds a motion compensation filter coefficient most frequently referred to, only when it is found out, with reference to the information managed by said storage state management unit, that said storage unit does not hold the at least one motion compensation filter coefficient identified based on the identification information.

13. The moving image decoding apparatus according to claim 3, further comprising:
a pre-decoding unit configured to decode at least part of the identification information from the stream prior to the decoding by said decoding unit; and
a statistical information management unit configured to manage a use state of each of the at least one motion compensation filter coefficient which is identified based on the identification information, has been decoded by said pre-decoding unit, and is to be decoded by said decoding unit,
wherein said transfer control unit is configured to transfer the at least one motion compensation filter coefficient identified based on the identification information from said memory to said storage unit, based on the information managed by said storage state management unit and the use state managed by said statistical information management unit.

14. The moving image decoding apparatus according to claim 13,
wherein said transfer control unit is configured to transfer the at least one motion compensation filter coefficient identified based on the identification information from said memory to an area which is determined, with reference to the use state, to be of said storage unit and holds a motion compensation filter coefficient to be referred to least frequently, only when it is found out, with reference to the information managed by said storage state management unit, that said storage unit does not hold the at least one motion compensation filter coefficient identified based on the identification information.

15. The moving image decoding apparatus according to claim 1, further comprising:

a reversible coding unit configured to reversibly code the motion compensation filter coefficients for use in the motion compensation; and
a reversible decoding unit configured to reversibly decode the at least one motion compensation filter coefficient identified based on the identification information among the motion compensation filter coefficients reversibly coded by said reversible coding unit, and write, under control of said transfer control unit, the reversibly decoded at least one motion compensation filter coefficient into said storage unit.

16. A moving image coding apparatus which generates a coded stream, said moving image coding apparatus comprising:
a generation unit configured to generate a plurality of motion compensation filter coefficients for use in motion compensation, and identification information identifying at least one motion compensation filter coefficient among the motion compensation filter coefficients;
a memory for holding the motion compensation filter coefficients generated by said generation unit;
a storage unit configured to hold at least one motion compensation filter coefficient among the motion compensation filter coefficients held in said memory, the at least one motion compensation filter coefficient being required for the motion compensation;
a motion estimation unit configured to perform the motion compensation using the at least one motion compensation filter coefficient which is held in said storage unit and identified based on the identification information; and
a transfer control unit configured to transfer the at least one motion compensation filter coefficient identified based on the identification information from said memory to said storage unit, only when said storage unit does not hold the at least one motion compensation filter coefficient identified based on the identification information.

17. The moving image coding apparatus according to claim 16, further comprising
a storage state management unit configured to manage information indicating whether or not said storage unit holds the at least one motion compensation filter coefficient identified based on the identification information,
wherein said transfer control unit is configured to transfer, based on the information managed by said storage state management unit, the at least one motion compensation filter coefficient identified based on the identification information from said memory to said storage unit.

18. The moving image coding apparatus according to claim 17, further comprising
a reference management unit configured to manage use history information indicating the number of times of reference from a start of the motion compensation for each of the motion compensation filter coefficients,
wherein said transfer control unit is configured to transfer, based on the use history information managed by said reference management unit and the information managed by said storage state management unit, the at least one motion compensation filter coefficient identified based on the identification information from said memory to said storage unit.

19. The moving image coding apparatus according to claim 16, further comprising:

a reversible coding unit configured to reversibly code the motion compensation filter coefficients for use in the motion compensation; and a reversible decoding unit configured to reversibly decode the at least one motion compensation filter coefficient identified based on the identification information among the motion compensation filter coefficients reversibly coded by said reversible coding unit, and write, under control of said transfer control unit, the reversibly decoded at least one motion compensation filter coefficient into said memory, wherein said transfer control unit is configured to read out, from said memory, the at least one motion compensation filter coefficient which is identified based on the identification information and has been coded, and transfer the read-out at least one motion compensation filter coefficient to said reversible decoding unit.

20. A moving image decoding circuit which decodes a coded stream, said moving image decoding circuit comprising:

a decoding unit configured to decode, from the coded stream, identification information identifying at least one motion compensation filter coefficient among a plurality of motion compensation filter coefficients, the at least one motion compensation filter coefficient having been used in motion compensation;

a memory for holding the motion compensation filter coefficients for use in the motion compensation of the coded stream;

a storage unit configured to hold at least one motion compensation filter coefficient among the motion compensation filter coefficients held in said memory, the at least one motion compensation filter coefficient being required for the motion compensation;

a motion compensation unit configured to perform the motion compensation using the at least one motion compensation filter coefficient which is held in said storage unit and identified based on the identification information; and a transfer control unit configured to transfer the at least one motion compensation filter coefficient identified based on the identification information from said memory to said storage unit, only when said storage unit does not hold the at least one motion compensation filter coefficient identified based on the identification information.

21. A moving image decoding method of decoding a coded stream, said moving image decoding method comprising:

decoding, from the coded stream, identification information identifying at least one motion compensation filter coefficient among a plurality of motion compensation filter coefficients, the at least one motion compensation filter coefficient being required for the motion compensation;

accumulating, in a memory, the motion compensation filter coefficients for use in the motion compensation of the coded stream;

holding, in a storage unit, at least one motion compensation filter coefficient among the motion compensation filter coefficients accumulated in said accumulating, the at least one motion compensation filter coefficient being required for the motion compensation;

performing the motion compensation using the at least one motion compensation filter coefficient which is held in the storage unit and identified based on the identification information; and transferring the at least one motion compensation filter coefficient identified based on the identification information from the memory to the storage unit, only when the storage unit does not hold the at least one motion compensation filter coefficient identified based on the identification information.

22. A moving image decoding apparatus comprising:

a decoding unit configured to decode, from a coded stream, identification information identifying at least one motion compensation filter coefficient among a plurality of motion compensation filter coefficients, the at least one motion compensation filter coefficient being required for the motion compensation;

a pre-decoding unit configured to decode the identification information from the coded stream prior to the decoding by said decoding unit;

a memory for holding the motion compensation filter coefficients for use in the motion compensation of the coded stream;

a storage unit configured to hold at least one motion compensation filter coefficient among the motion compensation filter coefficients held in said memory, the at least one motion compensation filter coefficient being required for the motion compensation; and a control unit configured to cause said storage unit to hold the at least one motion compensation filter coefficient, based on the identification information decoded by said pre-decoding unit.

23. A non-transitory computer-readable recording medium for use in a computer, the recording medium having a computer program recorded thereon for causing the computer to decode a coded stream, the computer program executing:

decoding, from the coded stream, identification information identifying at least one motion compensation filter coefficient among a plurality of motion compensation filter coefficients, the at least one motion compensation filter coefficient being required for the motion compensation;

accumulating, in a memory, the motion compensation filter coefficients for use in the motion compensation of the coded stream;

holding, in a storage unit, at least one motion compensation filter coefficient among the motion compensation filter coefficients accumulated in said accumulating, the at least one motion compensation filter coefficient being required for the motion compensation;

performing the motion compensation using the at least one motion compensation filter coefficient which is held in the storage unit and identified based on the identification information; and transferring the at least one motion compensation filter coefficient identified based on the identification information from the memory to the storage unit.

24. A moving image decoding apparatus which performs motion-compensation decoding involving motion compensation of a stream of motion-compensation coded moving images, said moving image decoding apparatus comprising:

a processor; and a non-transitory memory having stored thereon executable instructions, which when executed, cause the processor to perform:

decoding, from the stream, identification information identifying at least one motion compensation filter coefficient among a plurality of motion compensation filter coefficients, the at least one motion compensation filter coefficient being required for the motion compensation;

holding, in the non-transitory memory, the motion compensation filter coefficients for use in the motion compensation of the stream;

holding, in a non-transitory storage, at least one motion compensation filter coefficient among the motion compensation filter coefficients held in the non-transitory memory, the at least one motion compensation filter coefficient being required for the motion compensation;

performing the motion-compensation decoding using the at least one motion compensation filter coefficient which is held in the non-transitory storage and identified based on the identification information; and transferring the at least one motion compensation filter coefficient identified based on the identification information from the non-transitory memory to the non-transitory storage.

25. A moving image coding apparatus which generates a coded stream, said moving image coding apparatus comprising:

a processor; and a non-transitory memory having stored thereon executable instructions, which when executed, cause the processor to perform:

generating a plurality of motion compensation filter coefficients for use in motion compensation, and identification information identifying at least one motion compensation filter coefficient among the motion compensation filter coefficients;

holding, in the non-transitory memory, the generated motion compensation filter coefficients;

holding, in a non-transitory storage, at least one motion compensation filter coefficient among the motion compensation filter coefficients held in the non-transitory memory, the at least one motion compensation filter coefficient being required for the motion compensation;

performing the motion compensation using the at least one motion compensation filter coefficient which is held in the non-transitory storage and identified based on the identification information; and transferring the at least one motion compensation filter coefficient identified based on the identification information from the non-transitory memory to the non-transitory storage, only when the non-transitory storage does not hold the at least one motion compensation filter coefficient identified based on the identification information.

* * * * *